(12) United States Patent
Matsuoka et al.

(10) Patent No.: US 8,630,741 B1
(45) Date of Patent: *Jan. 14, 2014

(54) AUTOMATED PRESENCE DETECTION AND PRESENCE-RELATED CONTROL WITHIN AN INTELLIGENT CONTROLLER

(71) Applicant: Nest Labs, Inc., Palo Alto, CA (US)

(72) Inventors: Yoky Matsuoka, Palo Alto, CA (US);
Evan J. Fisher, Palo Alto, CA (US);
Mark Malhotra, San Mateo, CA (US);
Mark D. Stefanski, Palo Alto, CA (US);
Rangoli Sharan, Sunnyvale, CA (US);
Frank E. Astier, Mountain View, CA (US)

(73) Assignee: Nest Labs, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/632,070

(22) Filed: Sep. 30, 2012

(51) Int. Cl.
*G06F 19/00* (2011.01)

(52) U.S. Cl.
USPC .............................. 700/276; 700/12; 706/52

(58) Field of Classification Search
USPC .............. 700/12, 276, 299, 278, 277; 706/52; 709/223, 250; 707/809
See application file for complete search history.

(56) References Cited

U.S. PATENT DOCUMENTS

| | | | |
|---|---|---|---|
| 4,646,964 A | 3/1987 | Parker et al. | |
| 4,656,835 A | 4/1987 | Kidder et al. | |
| 4,657,179 A | 4/1987 | Aggers et al. | |
| 4,669,654 A * | 6/1987 | Levine et al. | 236/46 R |
| 4,742,475 A | 5/1988 | Kaiser et al. | |
| 4,948,040 A | 8/1990 | Kobayashi et al. | |
| 5,348,078 A | 9/1994 | Dushane et al. | |
| 5,395,042 A | 3/1995 | Riley et al. | |
| 5,533,668 A | 7/1996 | Erikson | |
| 5,544,036 A | 8/1996 | Brown, Jr. et al. | |
| 5,595,342 A | 1/1997 | McNair et al. | |
| 5,611,484 A | 3/1997 | Uhrich | |
| 5,635,896 A | 6/1997 | Tinsley et al. | |
| 5,644,173 A | 7/1997 | Elliason et al. | |
| 5,673,850 A * | 10/1997 | Uptegraph | 236/46 R |
| 5,761,083 A | 6/1998 | Brown, Jr. et al. | |

(Continued)

FOREIGN PATENT DOCUMENTS

JP     H10-23565 A     1/1998

OTHER PUBLICATIONS

Arens, Edward, et al., "Demand Response Enabling Technology Development", Phase I Report, Jun. 2003—Nov. 2005.

(Continued)

*Primary Examiner* — Kidest Bahta
(74) *Attorney, Agent, or Firm* — Olympic Patent Works PLLC

(57) ABSTRACT

The current application is directed to intelligent controllers that use sensor output and electronically stored information, including one or more of electronically stored rules, parameters, and instructions, to determine whether or not one or more types of entities are present within an area, volume, or environment monitored by the intelligent controllers. The intelligent controllers select operational modes and modify control schedules with respect to the presence and absence of the one or more entities. The intelligent controllers employ feedback information to continuously adjust the electronically stored parameters and rules in order to minimize the number of incorrect inferences with respect to the presence or absence of the one or more entities and in order to maximize the efficiency by which various types of systems controlled by the intelligent controllers carry out selected operational modes.

4 Claims, 64 Drawing Sheets

(56) References Cited

U.S. PATENT DOCUMENTS

| | | |
|---|---|---|
| 5,802,467 A | 9/1998 | Salazar et al. |
| 5,839,654 A | 11/1998 | Weber |
| 5,926,776 A | 7/1999 | Glorioso et al. |
| 6,116,512 A | 9/2000 | Dushane et al. |
| 6,385,510 B1 | 5/2002 | Hoog et al. |
| 6,453,687 B2 | 9/2002 | Sharood et al. |
| 6,574,581 B1 | 6/2003 | Bohrer et al. |
| 6,604,023 B1 | 8/2003 | Brown et al. |
| 6,619,055 B1 | 9/2003 | Addy |
| 6,619,555 B2 | 9/2003 | Rosen |
| 6,622,115 B1 | 9/2003 | Brown et al. |
| 6,622,925 B2 | 9/2003 | Carner et al. |
| 6,975,958 B2 | 12/2005 | Bohrer et al. |
| 6,983,889 B2 | 1/2006 | Alles |
| 6,997,390 B2 | 2/2006 | Alles |
| 7,135,965 B2 | 11/2006 | Chapman, Jr. et al. |
| 7,156,316 B2 | 1/2007 | Kates |
| 7,168,627 B2 | 1/2007 | Kates |
| 7,181,317 B2 * | 2/2007 | Amundson et al. ........... 700/276 |
| 7,289,887 B2 | 10/2007 | Rodgers |
| 7,537,171 B2 | 5/2009 | Mueller et al. |
| 7,605,714 B2 | 10/2009 | Thompson et al. |
| 7,667,163 B2 * | 2/2010 | Ashworth et al. ............ 219/502 |
| 7,832,465 B2 | 11/2010 | Zou et al. |
| 7,837,128 B2 | 11/2010 | Helt et al. |
| 7,847,681 B2 | 12/2010 | Singhal et al. |
| 8,219,250 B2 * | 7/2012 | Dempster et al. ............. 700/276 |
| 8,239,922 B2 * | 8/2012 | Sullivan et al. .................... 726/4 |
| 2004/0027271 A1 * | 2/2004 | Schuster et al. ................. 342/42 |
| 2005/0040247 A1 * | 2/2005 | Pouchak ...................... 236/44 C |
| 2005/0194456 A1 | 9/2005 | Tessier et al. |
| 2005/0270151 A1 | 12/2005 | Winick |
| 2006/0009863 A1 | 1/2006 | Lingemann |
| 2006/0105697 A1 | 5/2006 | Aronstam et al. |
| 2006/0149395 A1 | 7/2006 | Archacki et al. |
| 2006/0186214 A1 | 8/2006 | Simon et al. |
| 2006/0208099 A1 | 9/2006 | Chapman, Jr. et al. |
| 2007/0114295 A1 | 5/2007 | Jenkins |
| 2007/0131787 A1 | 6/2007 | Rossi et al. |
| 2007/0228183 A1 | 10/2007 | Kennedy et al. |
| 2008/0219227 A1 * | 9/2008 | Michaelis ..................... 370/338 |
| 2009/0045263 A1 | 2/2009 | Mueller et al. |
| 2009/0057424 A1 * | 3/2009 | Sullivan et al. .................. 236/51 |
| 2009/0236433 A1 | 9/2009 | Mueller et al. |
| 2009/0243842 A1 | 10/2009 | Mitchell et al. |
| 2010/0006660 A1 | 1/2010 | Leen et al. |
| 2010/0070089 A1 * | 3/2010 | Harrod et al. ................. 700/277 |
| 2010/0168924 A1 | 7/2010 | Tessier et al. |
| 2010/0198425 A1 * | 8/2010 | Donovan ...................... 700/299 |
| 2010/0261465 A1 | 10/2010 | Rhoads et al. |
| 2010/0305771 A1 | 12/2010 | Rodgers |
| 2011/0054699 A1 | 3/2011 | Imes et al. |
| 2011/0054710 A1 * | 3/2011 | Imes et al. .................... 700/286 |
| 2011/0173542 A1 * | 7/2011 | Imes et al. .................... 715/735 |
| 2011/0224838 A1 * | 9/2011 | Imes et al. .................... 700/295 |

OTHER PUBLICATIONS

Arens, Edward, et al., "New Thermostat, Demand Response enabling Technology,".

SYSTXCCUIZ01-V, Infinity Control, Carrier, Installation Instructions.

Ecobee, SMART Thermostat, User Manual, 2010.

Ecobee, SMART Thermostat, Installation Manual, 2011.

Honeywell User Guide, VisionPRO Wi-Fi Programmable Thermostat, Model TH8320WF.

Trane, User Guide, Trane Communicating Thermostats for Heat Pump Control, echelon version X1351154202, BACnet MS-TP version X13511542010, May 2011.

Honeywell, Automation and Control Systems, Internet Thermostat, Installation Guide, Aug. 2012.

\* cited by examiner

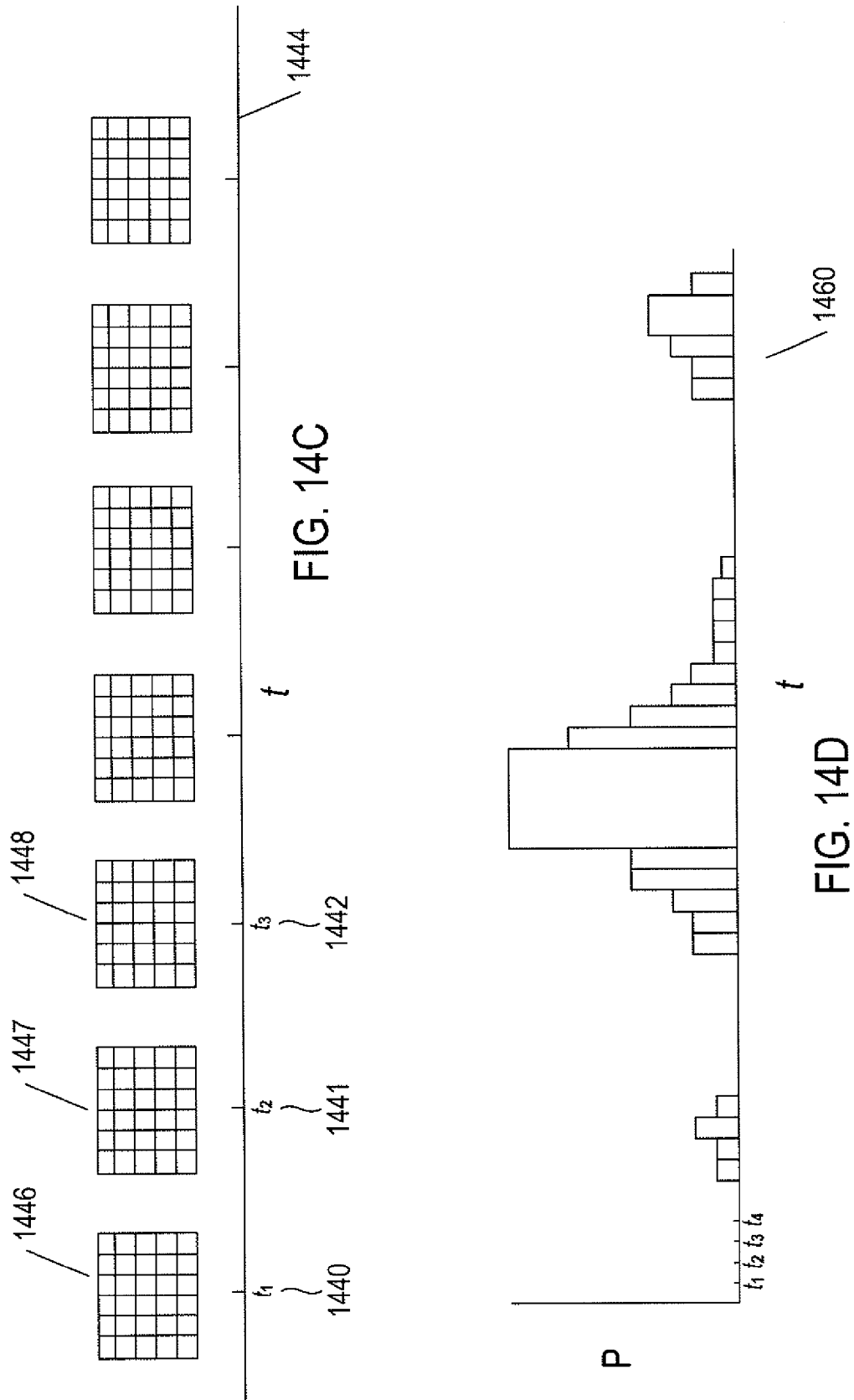

| | |
|---|---|
| a | user inputs command to schedule interface to begin schedule interaction |
| b | schedule interaction terminated by input or time out |
| c | same as (a) |
| d | user inputs control command to immediate-control interface |
| e | controller receives and carries out the command |
| f | same as (d) |
| g | scheduled control change executed |
| h | current time = = scheduled-control-change time |
| i | same as (h) |
| j | same as (g) |
| k | timer or sensor interrupt |
| l | sensor data recorded |
| m | same as (k) |
| n | same as (l) |
| o | timer |
| p | presence probabilities recomputed -- no change in presence/no-presence status |
| q | same as (o) |
| r | same as (p) |
| s | high probability of presence indicated by sensor event |
| t | presence probability now greater than or equal to threshold -- schedule adjusted |
| u | presence probability now less than threshold -- schedule adjusted |
| v | schedule change results in current time = = schedule-control-change time |

FIG. 18B

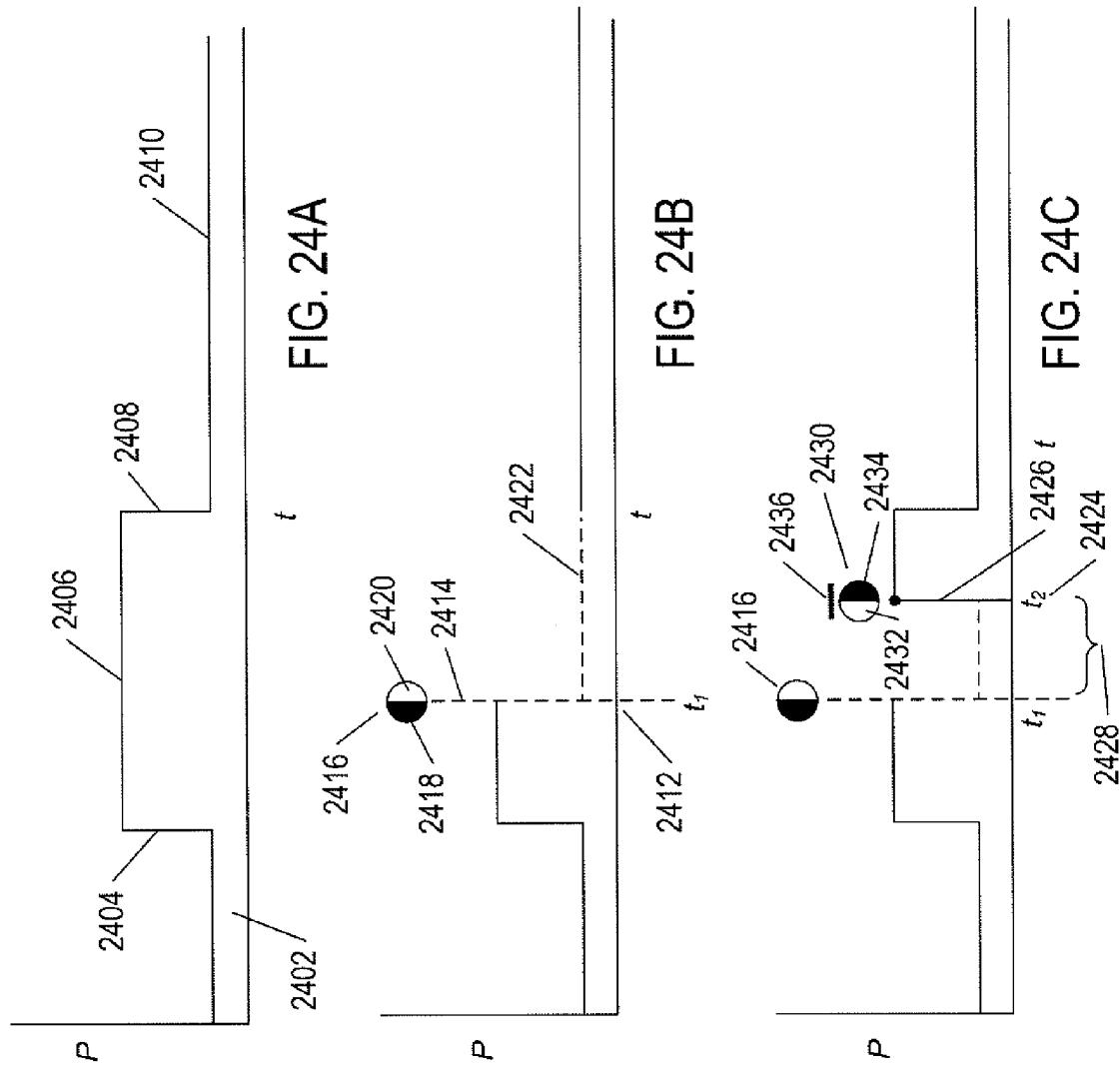

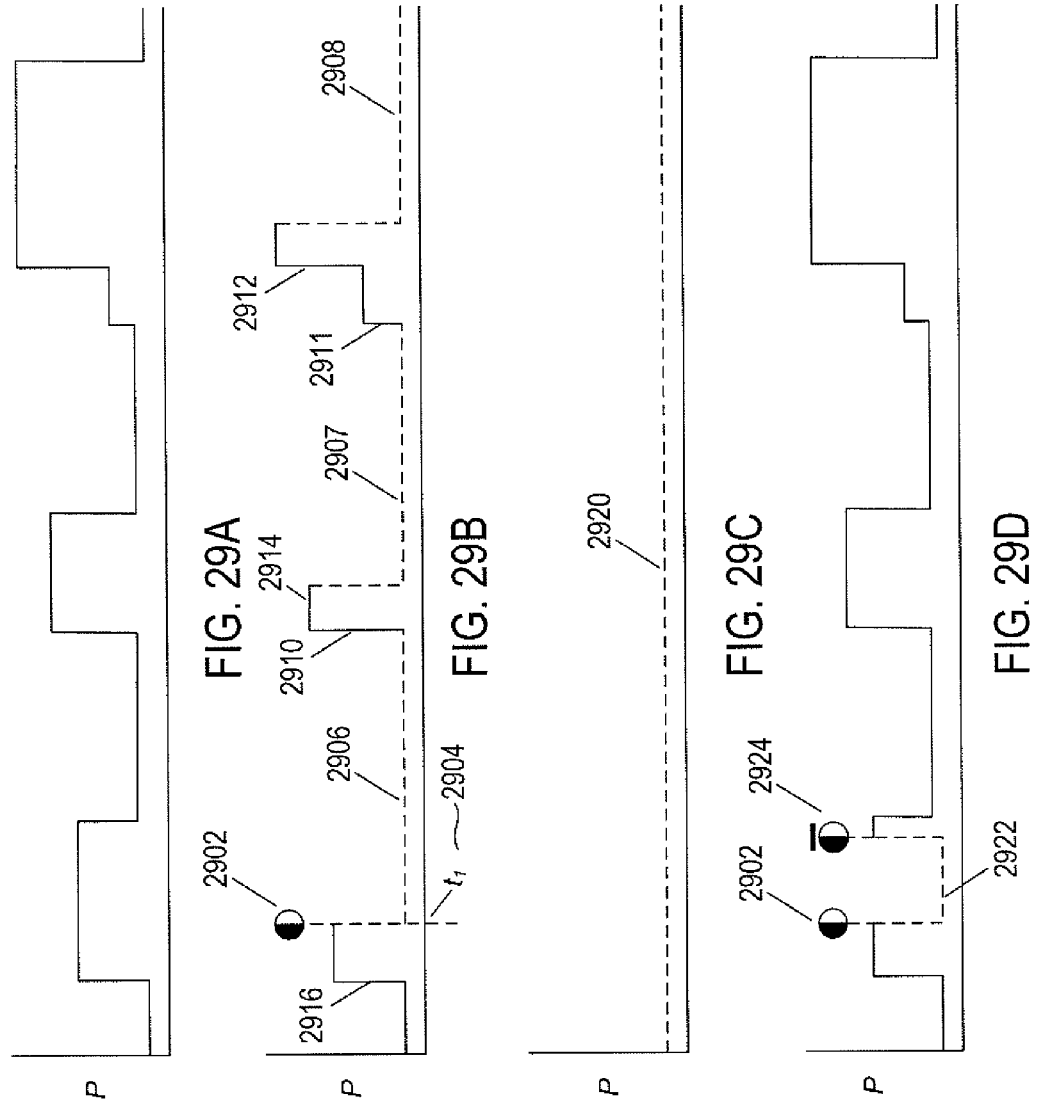

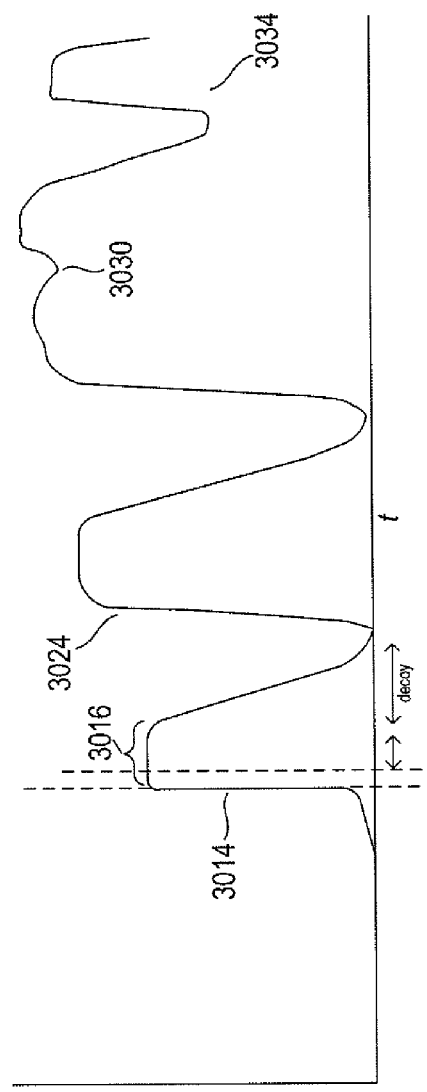
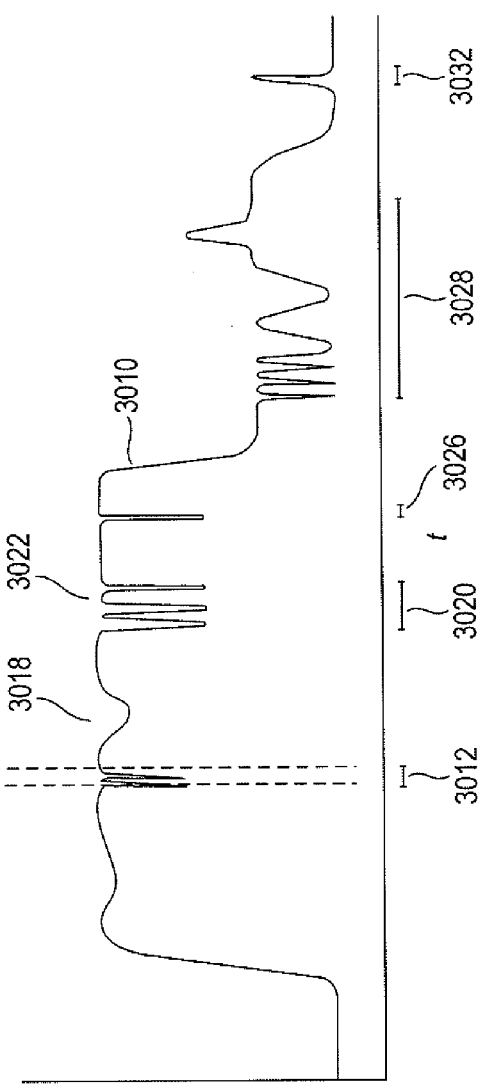
FIG. 30C
FIG. 30B

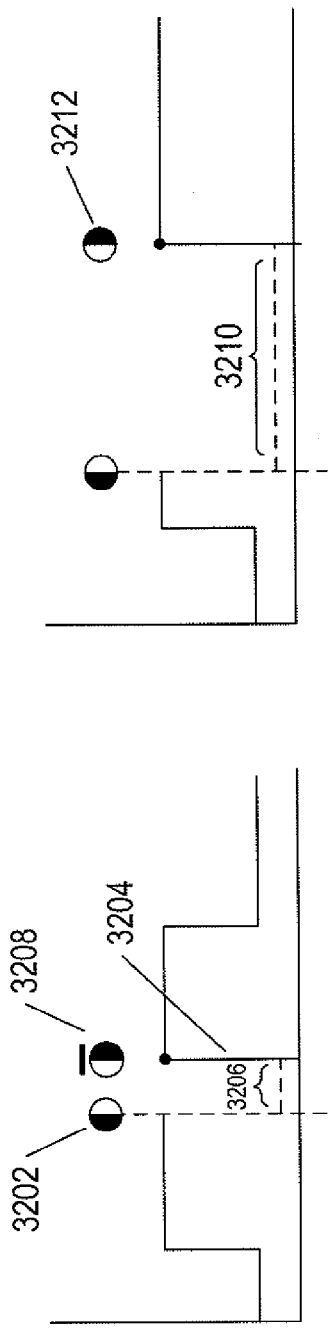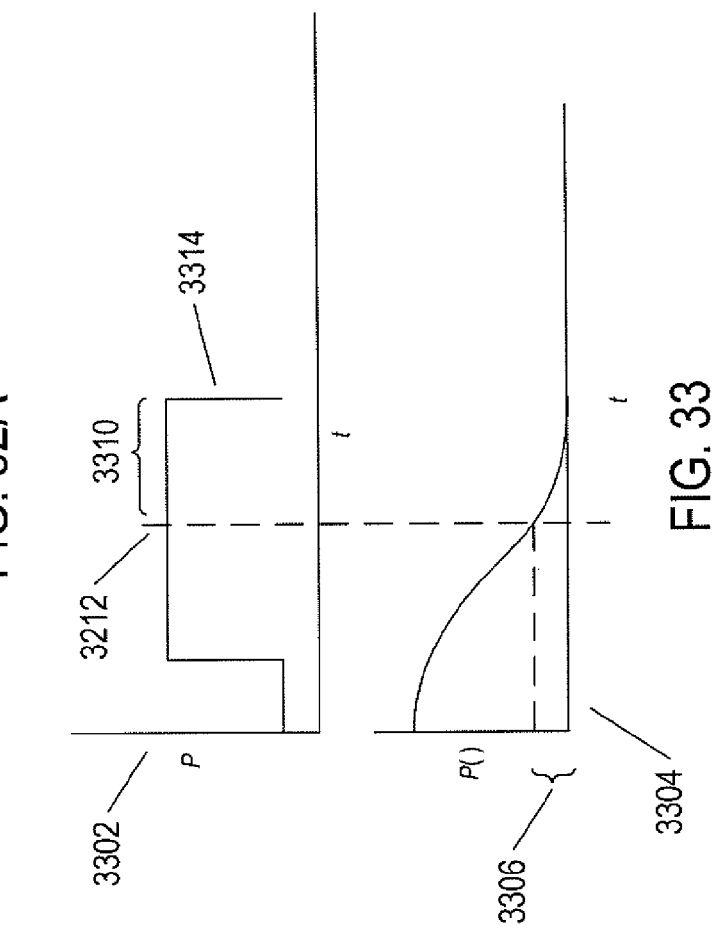

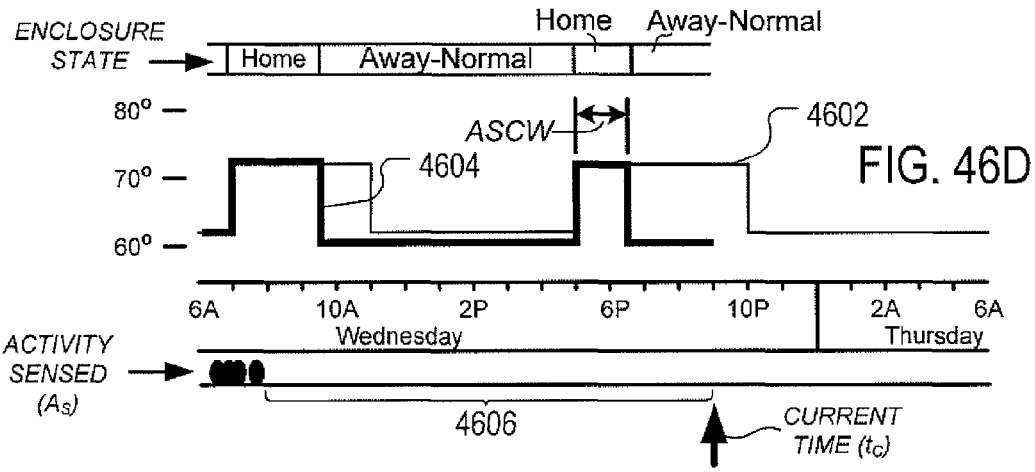
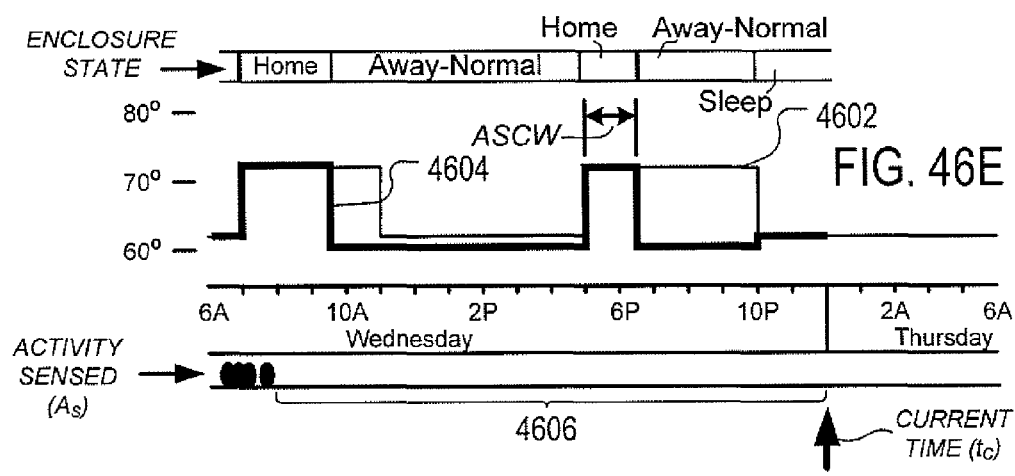
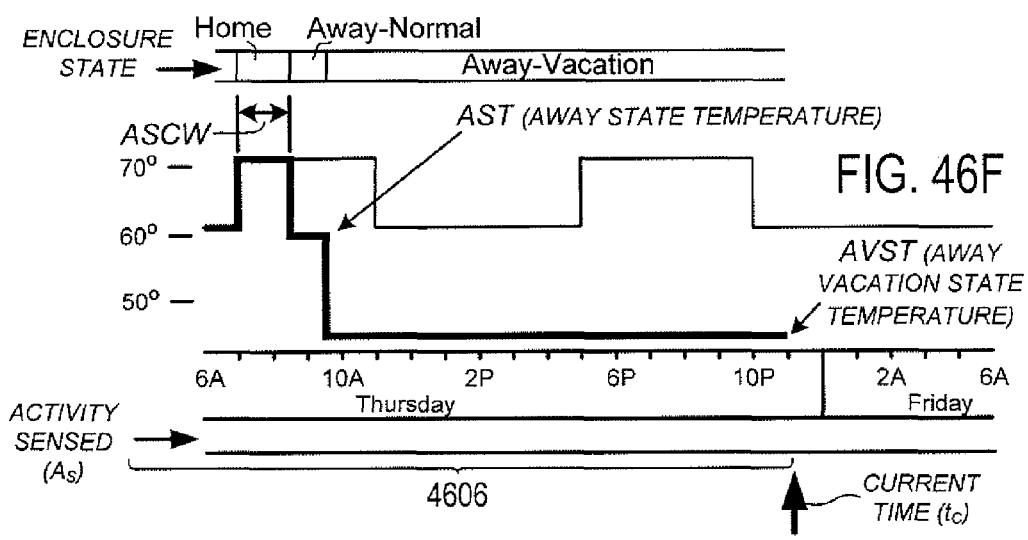

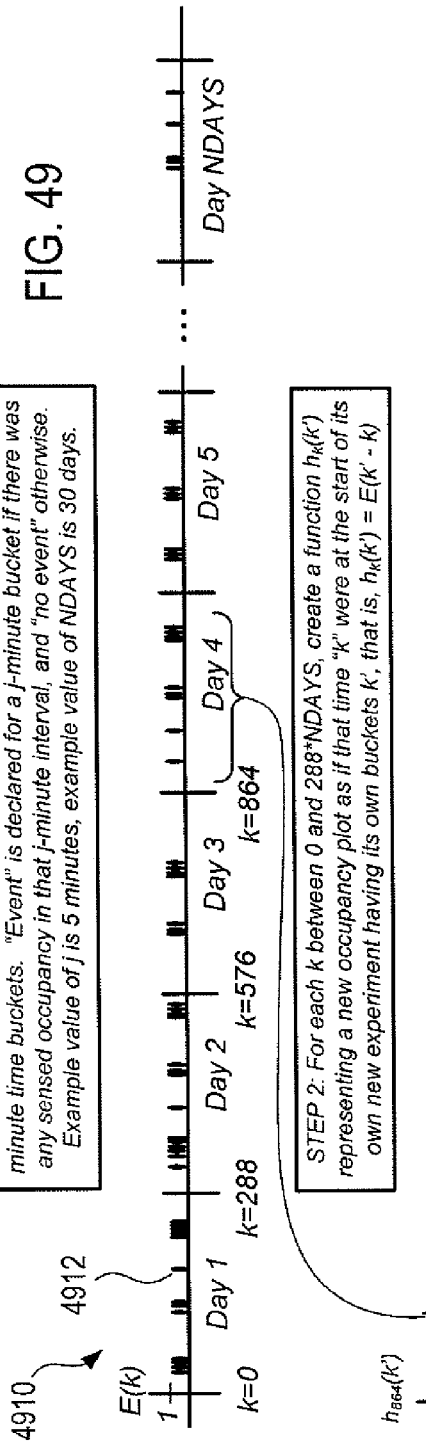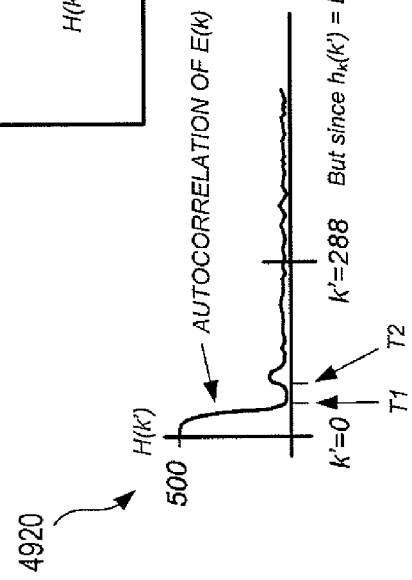
FIG. 49

AUTOMATED PRESENCE DETECTION AND PRESENCE-RELATED CONTROL WITHIN AN INTELLIGENT CONTROLLER

TECHNICAL FIELD

The current patent application is directed to machine learning and intelligent controllers and, in particular, to intelligent controllers, and machine-learning methods incorporated within intelligent controllers, that determine the presence of one or more types of entities within an area, volume, or environment controlled by the intelligent controller and that modify control operation with respect to presence or absence of the one or more entities.

BACKGROUND

Control systems and control theory are well-developed fields of research and development that have had a profound impact on the design and development of a large number of systems and technologies, from airplanes, spacecraft, and other vehicle and transportation systems to computer systems, industrial manufacturing and operations facilities, machine tools, process machinery, and consumer devices. Control theory encompasses a large body of practical, system-control-design principles, but is also an important branch of theoretical and applied mathematics. Various different types of controllers are commonly employed in many different application domains, from simple closed-loop feedback controllers to complex, adaptive, state-space and differential-equations-based processor-controlled control systems.

Many controllers are designed to output control signals to various dynamical components of a system based on a control model and sensor feedback from the system. Many systems are designed to exhibit a predetermined behavior or mode of operation, and the control components of such systems are therefore designed, by traditional design and optimization techniques, to ensure that the predetermined system behavior transpires under normal operational conditions. In certain cases, there may be various different modes of operation for a system, and the control components of the system therefore need to select a current mode of operation for the system and control the system to conform to the selected mode of operation. Theoreticians, researchers, and developers of many different types of controllers and automated systems continue to seek approaches to controller design to produce controllers with the flexibility and intelligence to control systems to select a current operational mode from among different possible operational modes and then provide control outputs to drive the controlled system to produce the selected mode of operation.

SUMMARY

The current application is directed to intelligent controllers that use sensor output and electronically stored information, including one or more of electronically stored rules, parameters, and instructions, to determine whether or not one or more types of entities are present within an area, volume, or environment monitored by the intelligent controllers. The intelligent controllers select operational modes and modify control schedules with respect to the presence and absence of the one or more entities. The intelligent controllers employ feedback information to continuously adjust the electronically stored parameters and rules in order to minimize the number of incorrect inferences with respect to the presence or absence of the one or more entities and in order to maximize the efficiency by which various types of systems controlled by the intelligent controllers carry out selected operational modes.

BRIEF DESCRIPTION OF THE DRAWINGS

FIGS. 14A-C illustrate various types of electronically stored presence-probability information within one or more intelligent controllers and/or remote computer systems accessible to the one or more intelligent controllers.

FIG. 14D illustrates a portion of a time line along which computed scalar presence-probability values are shown as columns above time intervals.

FIGS. 18A-B provide a state-transition diagram for an intelligent controller that operates according to the two-state transition diagram illustrated in FIG. 17A.

FIGS. 24A-D illustrate no-presence events and their effects on control schedules.

FIGS. 26A-28B provide control-flow diagrams for the sensor and presence routines called in step 1618 and 1622, respectively, of the control-flow diagram provided in FIG. 16.

FIGS. 28A-B illustrate example implementations of the schedule-adjustment routines FIGS. 29A-D illustrate various types of presence-related schedule adjustments.

FIGS. 30A-C illustrate certain of the various considerations in computing a presence probability from the output of a sensor.

FIGS. 32A-B illustrate the fact that the length of a time interval separating a presence-to-no-presence event and a no-presence-to-presence event may determine whether or not the latter event is deemed a corrective event.

FIG. 33 illustrates various alterations to presence-related schedule adjustments and presence-probability determinations that can be used by an intelligent controller to factor in corrective no-presence-to-presence events and other information into presence-probability determinations and schedule adjustments related to presence-probability determinations.

FIGS. 46A-F illustrate time plots of a normal control schedule versus an actual operating setpoint plot corresponding to operation of an auto-away/auto-arrival method.

FIG. 49 illustrates plots 4910 and 4920 that relate to the determination of optimal time thresholds for (1) triggering an auto-away state; and (2) temporarily inhibiting an auto-arrival state upon entry into an auto-away state, based on empirical data from a population of actual households.

DETAILED DESCRIPTION

Figure 1:
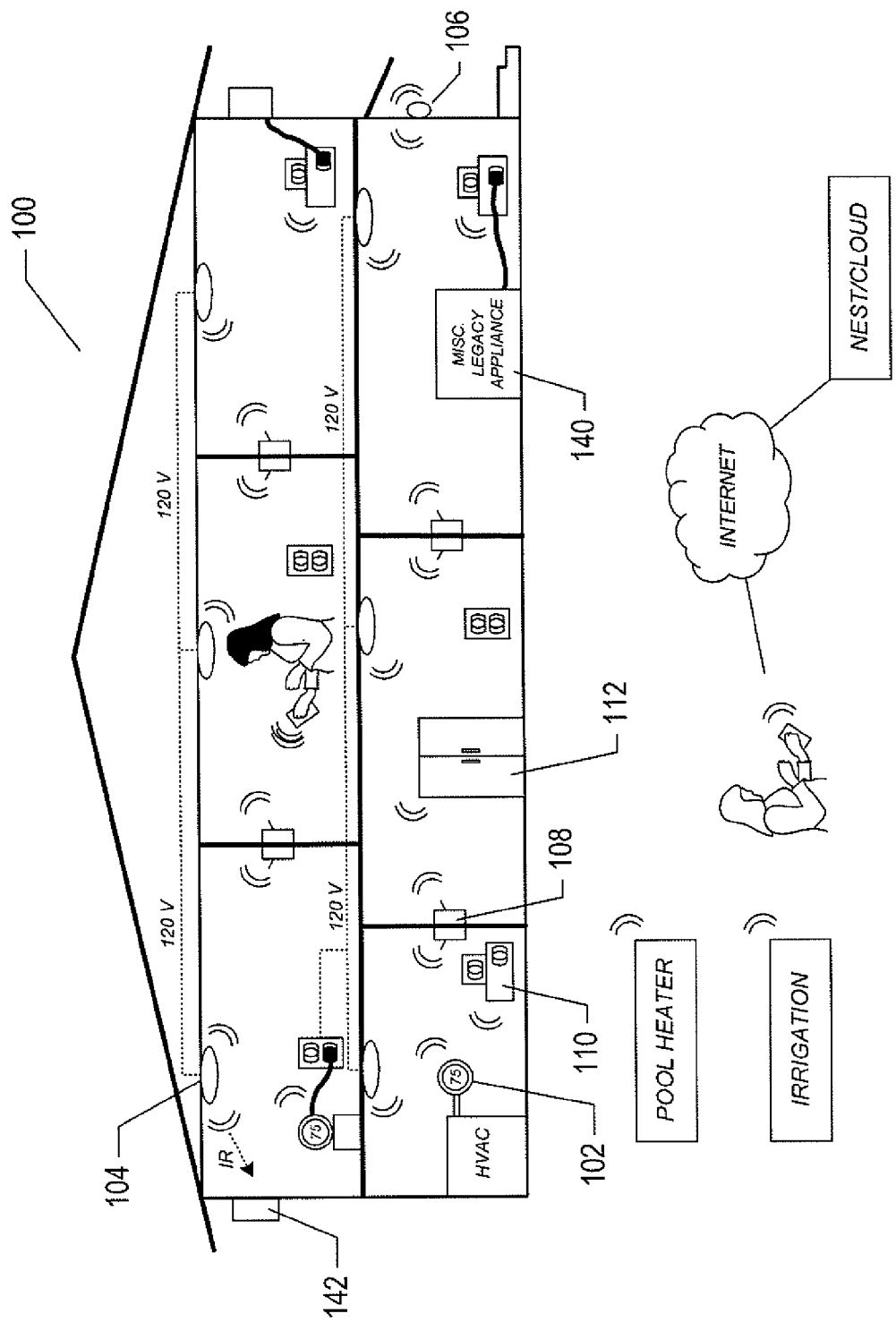
FIG. 1 illustrates a smart-home environment.

The current application is directed to a general class of intelligent controllers that determine the presence and absence of one or more types of entities within one or more areas, volumes, or environments affected by one or more systems controlled by the intelligent controllers and that includes many different specific types of intelligent controllers that can be applied to, and incorporated within, many different types of devices, machines, systems, and organizations. Intelligent controllers control the operation of devices, machines, systems, and organizations that, in turn, operate to affect any of various parameters within one or more areas, volumes, or environments. The general class of intelligent controllers to which the current application is directed include components that allow the intelligent controllers to directly sense the presence and/or absence of one or more entities using one or more outputs from one or more sensors, to infer the presence and/or absence of the one or more entities within areas, regions, volumes or at points within areas, regions, and volumes from the sensor-based determinations as well as various types of electronically stored data, rules, and parameters, and to adjust control schedules, based on the inferences related to the presence or absence of the one or more entities within the areas, regions, and volumes. The subject matter of this patent specification relates to the subject matter of the following commonly assigned applications, each of which is incorporated by reference herein: U.S. Ser. No. 13/269,501 filed Oct. 7, 2011; U.S. Prov. Ser. No. 61/550,345 filed Oct. 21, 2011; and U.S. Ser. No. 13/279,151 filed Oct. 17, 2011.

The current application discloses, in addition to methods and implementations for presence-and/or-absence detection and corresponding control adjustments, a specific example of an intelligent thermostat controller, or intelligent thermostat, and a specific example of presence-and/or-absence detection and corresponding control-schedule adjustments that serves as a detailed example of the presence-and/or-absence-detection and control-adjustment methods employed by the general class of intelligent controllers to which the current application is directed. The intelligent thermostat is an example of a smart-home device.

The detailed description includes three subsections: (1) an overview of the smart-home environment; (2) presence-and/or-absence detection and control adjustment by intelligent controllers; and (3) presence-and/or-absence detection and control adjustment in the context of an intelligent thermostat. The first subsection provides a description of one area of technology that offers many opportunities for application and incorporation of methods for detecting the presence and/or absence of one or more entities and for accordingly adjusting the control of one or more systems. The second subsection provides a detailed description of the general class of intelligent controllers which determine the presence and/or absence of one or more entities and that correspondingly adjust control of one or more systems based on the determined presence and/or absence of the one or more entities, including a first, general implementation. The third subsection provides a specific example of presence-and/or-absence detection and corresponding control-adjustment methods incorporated within an intelligent thermostat.

Overview of the Smart-Home Environment

FIG. 1 illustrates a smart-home environment. The smart-home environment 100 includes a number of intelligent, multi-sensing, network-connected devices. These smart-home devices intercommunicate and are integrated together within the smart-home environment. The smart-home devices may also communicate with cloud-based smart-home control and/or data-processing systems in order to distribute control functionality, to access higher-capacity and more reliable computational facilities, and to integrate a particular smart home into a larger, multi-home or geographical smart-home-device-based aggregation.

The smart-home devices may include one more intelligent thermostats 102, one or more intelligent hazard-detection units 104, one or more intelligent entryway-interface devices 106, smart switches, including smart wall-like switches 108, smart utilities interfaces and other services interfaces, such as smart wall-plug interfaces 110, and a wide variety of intelligent, multi-sensing, network-connected appliances 112, including refrigerators, televisions, washers, dryers, lights, audio systems, intercom systems, mechanical actuators, wall air conditioners, pool-heating units, irrigation systems, and many other types of intelligent appliances and systems.

In general, smart-home devices include one or more different types of sensors, one or more controllers and/or actuators, and one or more communications interfaces that connect the smart-home devices to other smart-home devices, routers, bridges, and hubs within a local smart-home environment, various different types of local computer systems, and to the Internet, through which a smart-home device may communicate with cloud-computing servers and other remote computing systems. Data communications are generally carried out using any of a large variety of different types of communications media and protocols, including wireless protocols, such as Wi-Fi, ZigBee, 6LoWPAN, various types of wired protocols, including CAT6 Ethernet, HomePlug, and other such wired protocols, and various other types of communications protocols and technologies. Smart-home devices may themselves operate as intermediate communications devices, such as repeaters, for other smart-home devices. The smart-home environment may additionally include a variety of different types of legacy appliances and devices 140 and 142 which lack communications interfaces and processor-based controllers.

Figure 2:
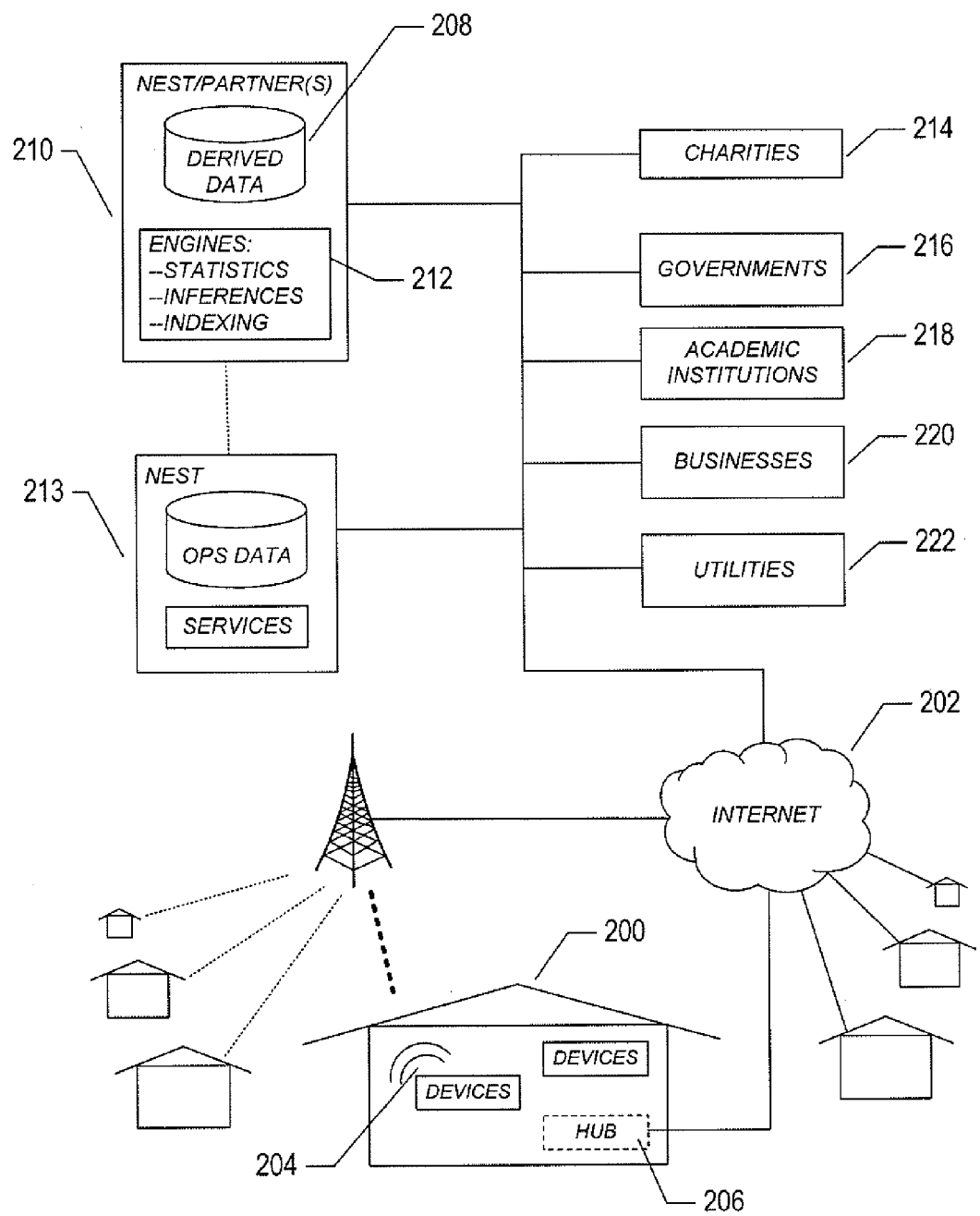
FIG. 2 illustrates integration of smart-home devices with remote devices and systems.

FIG. 2 illustrates integration of smart-home devices with remote devices and systems. Smart-home devices within a smart-home environment 200 can communicate through the Internet 202 via 3 G/4 G wireless communications 204, through a hubbed network 206, or by other communications interfaces and protocols. Many different types of smart-home-related data, and data derived from smart-home data 208, can be stored in, and retrieved from, a remote system 210, including a cloud-based remote system. The remote system may include various types of statistics, inference, and indexing engines 212 for data processing and derivation of additional information and rules related to the smart-home environment. The stored data can be exposed, via one or more communications media and protocols, in part or in whole, to various remote systems and organizations, including charities 214, governments 216, academic institutions 218, businesses 220, and utilities 222. In general, the remote data-processing system 210 is managed or operated by an organization or vendor related to smart-home devices or contracted for remote data-processing and other services by a homeowner, landlord, dweller, or other smart-home-associated user. The data may also be further processed by additional commercial-entity data-processing systems 213 on behalf of the smart-homeowner or manager and/or the commercial entity or vendor which operates the remote data-processing system 210. Thus, external entities may collect, process, and expose information collected by smart-home devices within a smart-home environment, may process the information to produce various types of derived results which may be communicated to, and shared with, other remote entities, and may participate in monitoring and control of smart-home devices within the smart-home environment as well as monitoring and control of the smart-home environment. Of course, in many cases, export of information from within the smart-home environment to remote entities may be strictly controlled and constrained, using encryption, access rights, authentication, and other well-known techniques, to ensure that information deemed confidential by the smart-home manager and/or by the remote data-processing system is not intentionally or unintentionally made available to additional external computing facilities, entities, organizations, and individuals.

Figure 3:
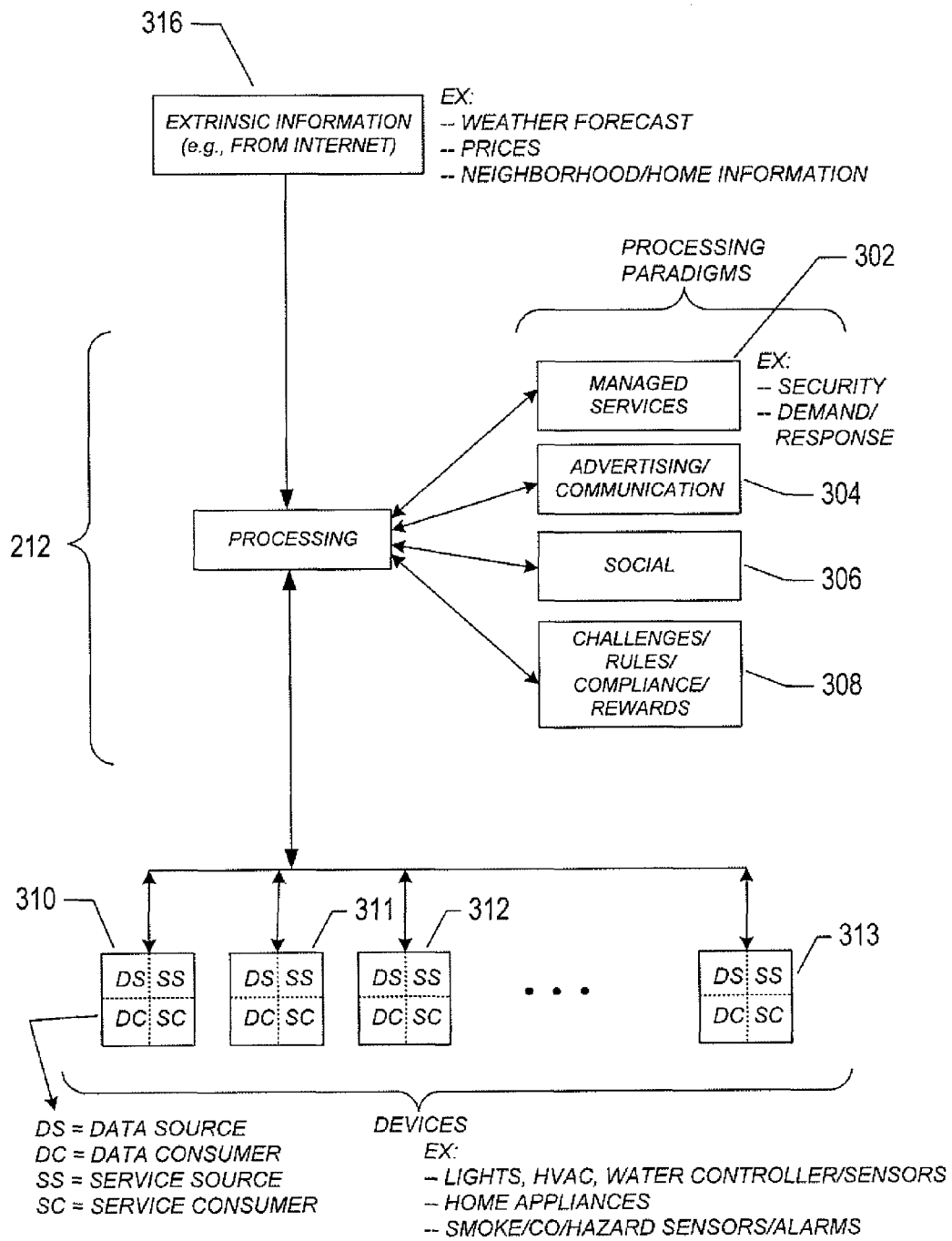
FIG. 3 illustrates information processing within the environment of intercommunicating entities illustrated in FIG. 2.

FIG. 3 illustrates information processing within the environment of intercommunicating entities illustrated in FIG. 2. The various processing engines 212 within the external data-processing system 210 can process data with respect to a variety of different goals, including provision of managed services 302, various types of advertizing and communications 304, social-networking exchanges and other electronic social communications 306, and for various types of monitoring and rule-generation activities 308. The various processing engines 212 communicate directly or indirectly with smart-home devices 310-313, each of which may have data-consumer ("DC"), data-source ("DS"), services-consumer ("SC"), and services-source ("SS") characteristics. In addition, the processing engines may access various other types of external information 316, including information obtained through the Internet, various remote information sources, and even remote sensor, audio, and video feeds and sources.

Figure 4:
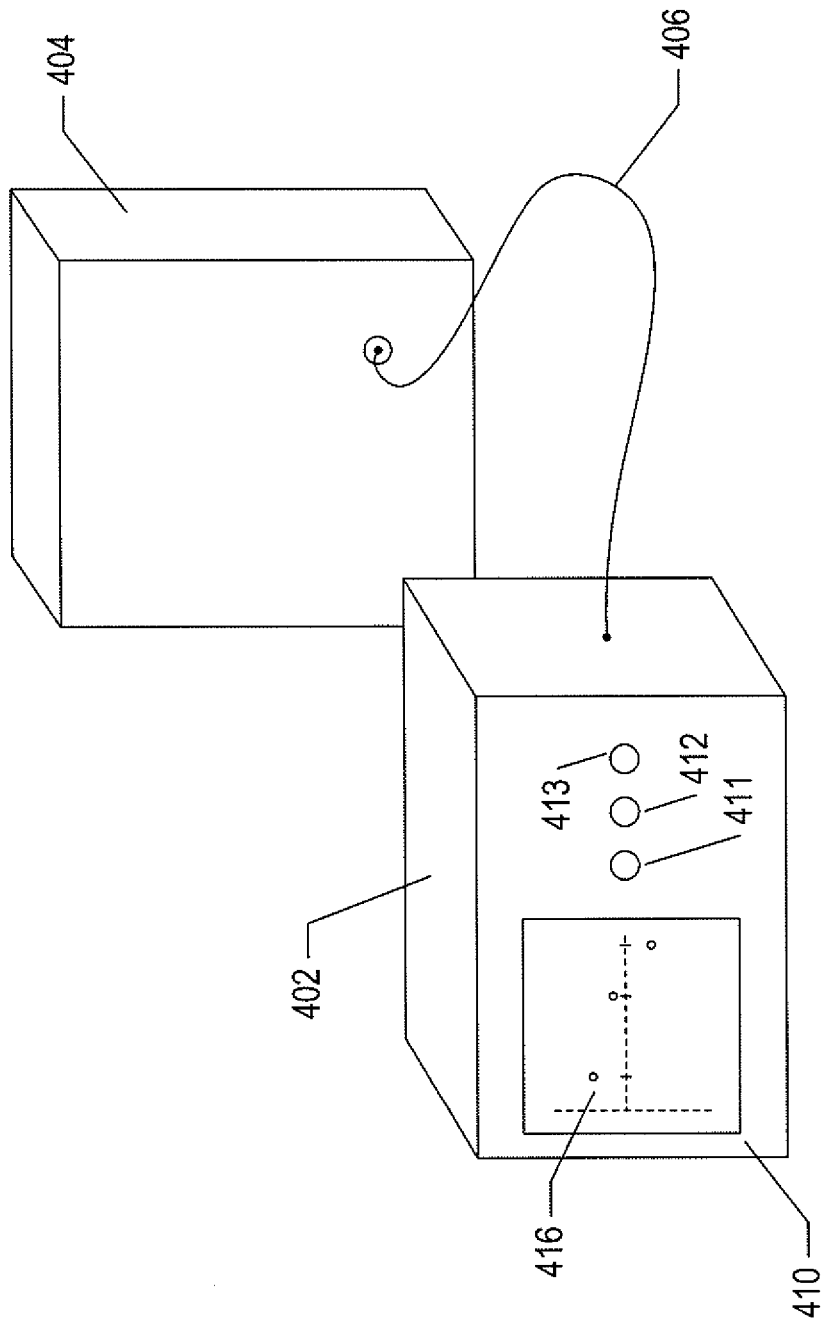
FIG. 4 illustrates a general class of intelligent controllers to which the current application is directed.

Presence-and/or-Absence Detection and Control Adjustment by Intelligent Controllers FIG. 4 illustrates a general class of intelligent controllers to which the current application is directed. The intelligent controller 402 controls a device, machine, system, or organization 404 via any of various different types of output control signals and receives information about the controlled entity and an environment from sensor output received by the intelligent controller from sensors embedded within the controlled entity 404, the intelligent controller 402, or in the environment. In FIG. 4, the intelligent controller is shown connected to the controlled entity 404 via a wire or fiber-based communications medium 406. However, the intelligent controller may be interconnected with the controlled entity by alternative types of communications media and communications protocols, including wireless communications. In many cases, the intelligent controller and controlled entity may be implemented and packaged together as a single system that includes both the intelligent controller and a machine, device, system, or organization controlled by the intelligent controller. The controlled entity may include multiple devices, machines, system, or organizations and the intelligent controller may itself be distributed among multiple components and discrete devices and systems. In addition to outputting control signals to controlled entities and receiving sensor input, the intelligent controller also provides a user interface 410-413 through which a human user can input immediate-control inputs to the intelligent controller as well as create and modify the various types of control schedules, and may also provide the immediate-control and schedule interfaces to remote entities, including a user-operated processing device or a remote automated control system. In FIG. 4, the intelligent controller provides a graphical-display component 410 that displays a control schedule 416 and includes a number of input components 411-413 that provide a user interface for input of immediate-control directives to the intelligent controller for controlling the controlled entity or entities and input of scheduling-interface commands that control display of one or more control schedules, creation of control schedules, and modification of control schedules.

To summarize, the general class of intelligent controllers to which the current is directed receive sensor input, output control signals to one or more controlled entities, and provide a user interface that allows users to input immediate-control command inputs to the intelligent controller for translation by the intelligent controller into output control signals as well as to create and modify one or more control schedules that specify desired controlled-entity operational behavior over one or more time periods. The user interface may be included within the intelligent controller as input and display devices, may be provided through remote devices, including mobile phones, or may be provided both through controller-resident components as well as through remote devices. These basic functionalities and features of the general class of intelligent controllers provide a basis upon which automated control-schedule learning, to which the current application is directed, can be implemented.

Figure 5:
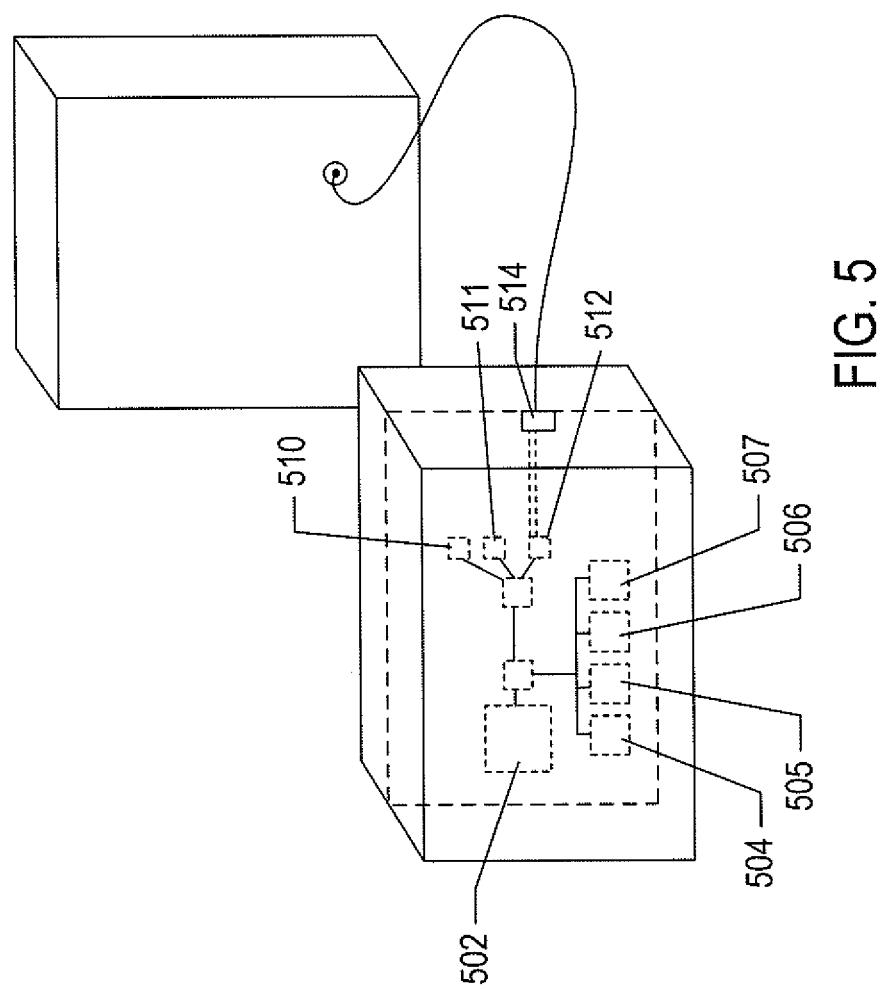
FIG. 5 illustrates additional internal features of an intelligent controller.

FIG. 5 illustrates additional internal features of an intelligent controller. An intelligent controller is generally implemented using one or more processors 502, electronic memory 504-507, and various types of microcontrollers 510-512, including a microcontroller 512 and transceiver 514 that together implement a communications port that allows the intelligent controller to exchange data and commands with one or more entities controlled by the intelligent controller, with other intelligent controllers, and with various remote computing facilities, including cloud-computing facilities through cloud-computing servers. Often, an intelligent controller includes multiple different communications ports and interfaces for communicating by various different protocols through different types of communications media. It is common for intelligent controllers, for example, to use wireless communications to communicate with other wireless-enabled intelligent controllers within an environment and with mobile-communications carriers as well as any of various wired communications protocols and media. In certain cases, an intelligent controller may use only a single type of communications protocol, particularly when packaged together with the controlled entities as a single system. Electronic memories within an intelligent controller may include both volatile and non-volatile memories, with low-latency, high-speed volatile memories facilitating execution of control routines by the one or more processors and slower, non-volatile memories storing control routines and data that need to survive power-on/power-off cycles. Certain types of intelligent controllers may additionally include mass-storage devices.

Figure 6:
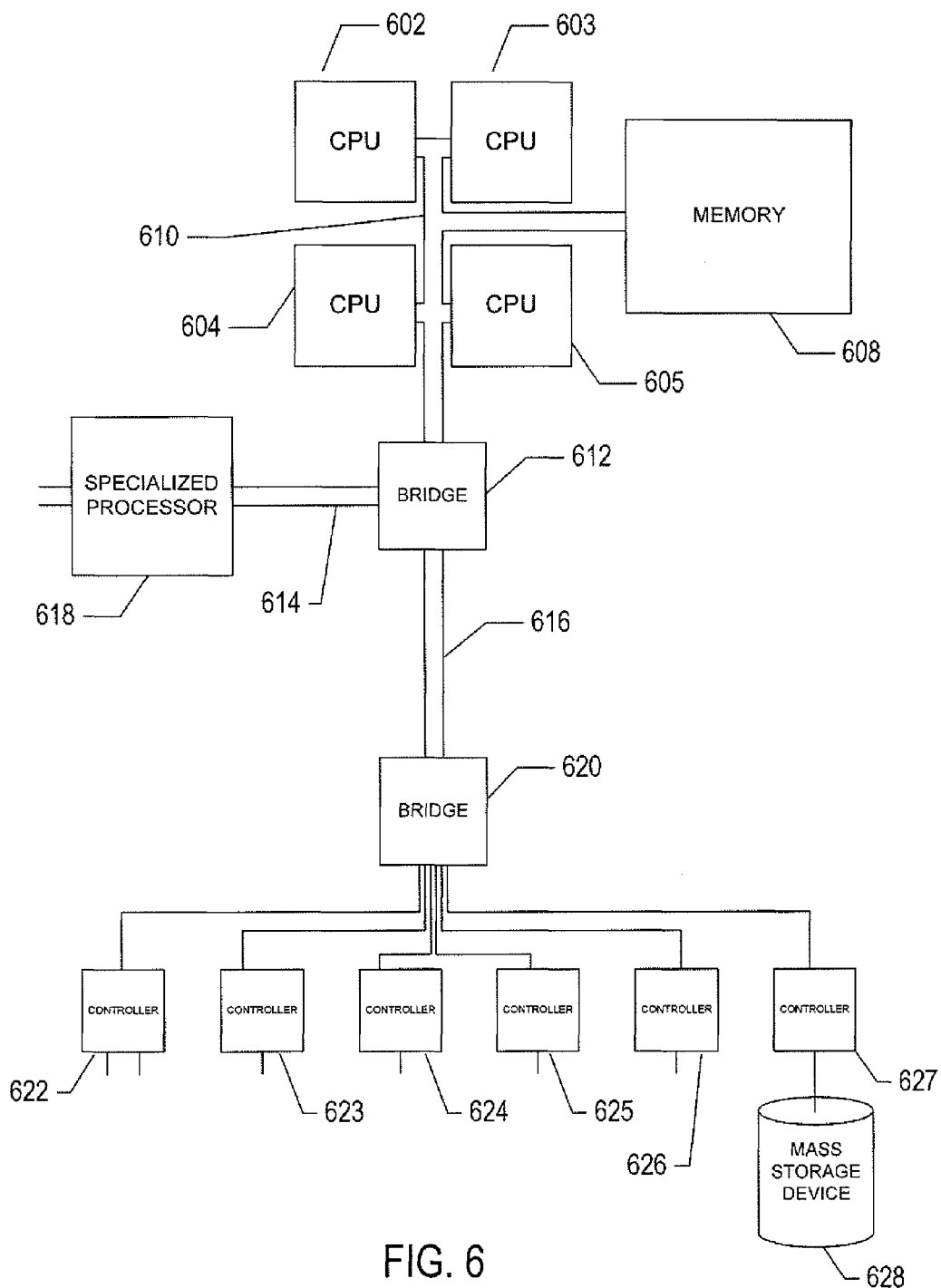
FIG. 6 illustrates a generalized computer architecture that represents an example of the type of computing machinery that may be included in an intelligent controller, server computer, and other processor-based intelligent devices and systems.

FIG. 6 illustrates a generalized computer architecture that represents an example of the type of computing machinery that may be included in an intelligent controller, server computer, and other processor-based intelligent devices and systems. The computing machinery includes one or multiple central processing units ("CPUs") 602-605, one or more electronic memories 608 interconnected with the CPUs by a CPU/memory-subsystem bus 610 or multiple busses, a first bridge 612 that interconnects the CPU/memory-subsystem bus 610 with additional busses 614 and 616 and/or other types of high-speed interconnection media, including multiple, high-speed serial interconnects. These busses and/or serial interconnections, in turn, connect the CPUs and memory with specialized processors, such as a graphics processor 618, and with one or more additional bridges 620, which are interconnected with high-speed serial links or with multiple controllers 622-627, such as controller 627, that provide access to various different types of mass-storage devices 628, electronic displays, input devices, and other such components, subcomponents, and computational resources.

Figure 7:
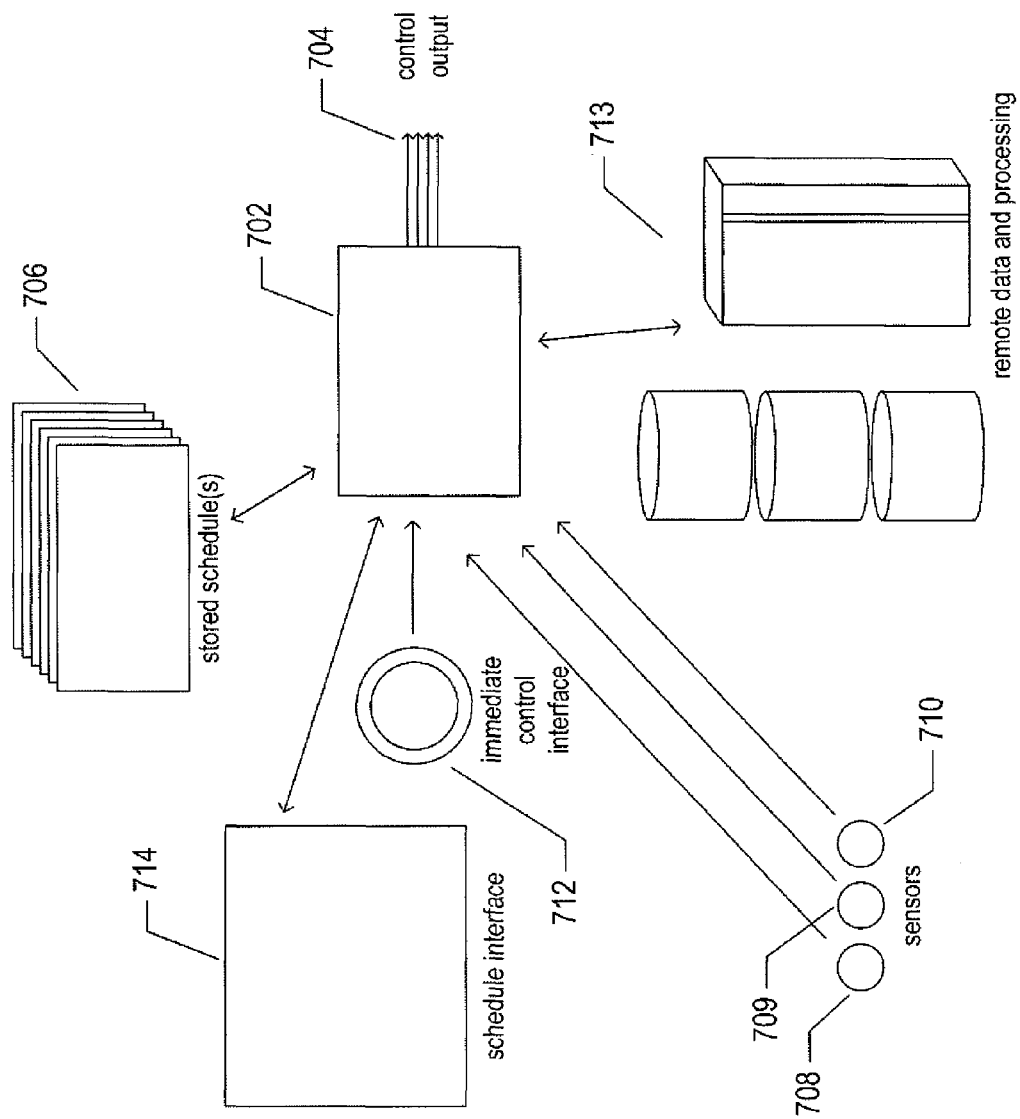
FIG. 7 illustrates features and characteristics of an intelligent controller of the general class of intelligent controllers to which the current application is directed.

FIG. 7 illustrates features and characteristics of an intelligent controller of the general class of intelligent controllers to which the current application is directed. An intelligent controller includes controller logic 702 generally implemented as electronic circuitry and processor-based computational components controlled by computer instructions stored in physical data-storage components, including various types of electronic memory and/or mass-storage devices. It should be noted, at the onset, that computer instructions stored in physical data-storage devices and executed within processors comprise the control components of a wide variety of modem devices, machines, and systems, and are as tangible, physical, and real as any other component of a device, machine, or system. Occasionally, statements are encountered that suggest that computer-instruction-implemented control logic is "merely software" or something abstract and less tangible than physical machine components. Those familiar with modem science and technology understand that this is not the case. Computer instructions executed by processors must be physical entities stored in physical devices. Otherwise, the processors would not be able to access and execute the instructions. The term "software" can be applied to a symbolic representation of a program or routine, such as a printout or displayed list of programming-language statements, but such symbolic representations of computer programs are not executed by processors. Instead, processors fetch and execute computer instructions stored in physical states within physical data-storage devices. Similarly, computer-readable media are physical data-storage media, such as disks, memories, and mass-storage devices that store data in a tangible, physical form that can be subsequently retrieved from the physical data-storage media.

The controller logic accesses and uses a variety of different types of stored information and inputs in order to generate output control signals 704 that control the operational behavior of one or more controlled entities. The information used by the controller logic may include one or more stored control schedules 706, received output from one or more sensors 708-710, immediate control inputs received through an immediate-control interface 712, and data, commands, and other information received from remote data-processing systems, including cloud-based data-processing systems 713. In addition to generating control output 704, the controller logic provides an interface 714 that allows users to create and modify control schedules and may also output data and information to remote entities, other intelligent controllers, and to users through an information-output interface.

Figure 8:
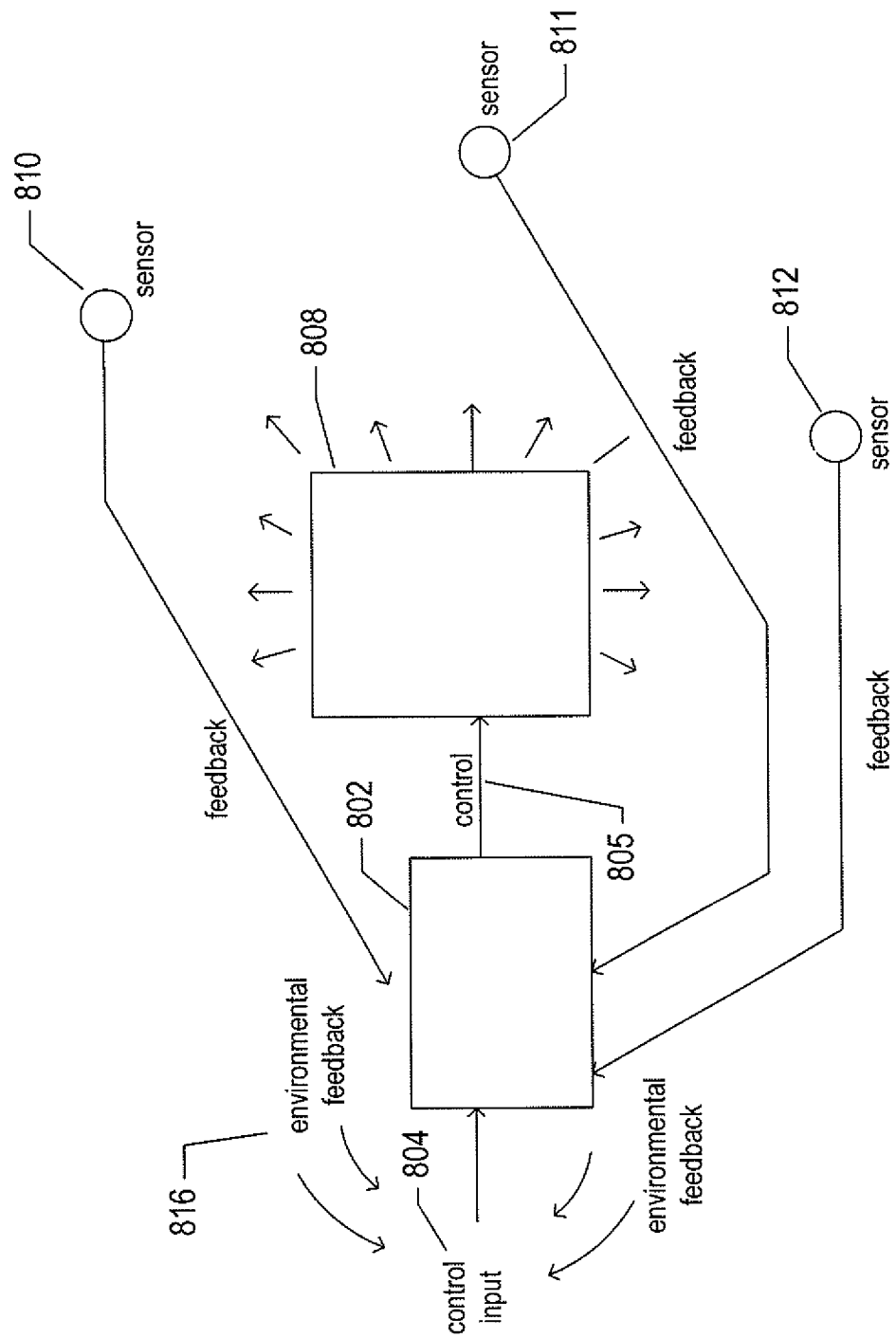
FIG. 8 illustrates a typical control environment within which an intelligent controller operates.

FIG. 8 illustrates a typical control environment within which an intelligent controller operates. As discussed above, an intelligent controller 802 receives control inputs from users or other entities 804 and uses the control inputs, along with stored control schedules and other information, to generate output control signals 805 that control operation of one or more controlled entities 808. Operation of the controlled entities may alter an environment within which sensors 810-812 are embedded. The sensors return sensor output, or feedback, to the intelligent controller 802. Based on this feedback, the intelligent controller modifies the output control signals in order to achieve a specified goal or goals for controlled-system operation. In essence, an intelligent controller modifies the output control signals according to two different feedback loops. The first, most direct feedback loop includes output from sensors that the controller can use to determine subsequent output control signals or control-output modification in order to achieve the desired goal for controlled-system operation. In many cases, a second feedback loop involves environmental or other feedback 816 to users which, in turn, elicits subsequent user control and scheduling inputs to the intelligent controller 802. In other words, users can either be viewed as another type of sensor that outputs immediate-control directives and control-schedule changes, rather than raw sensor output, or can be viewed as a component of a higher-level feedback loop.

Figure 9:
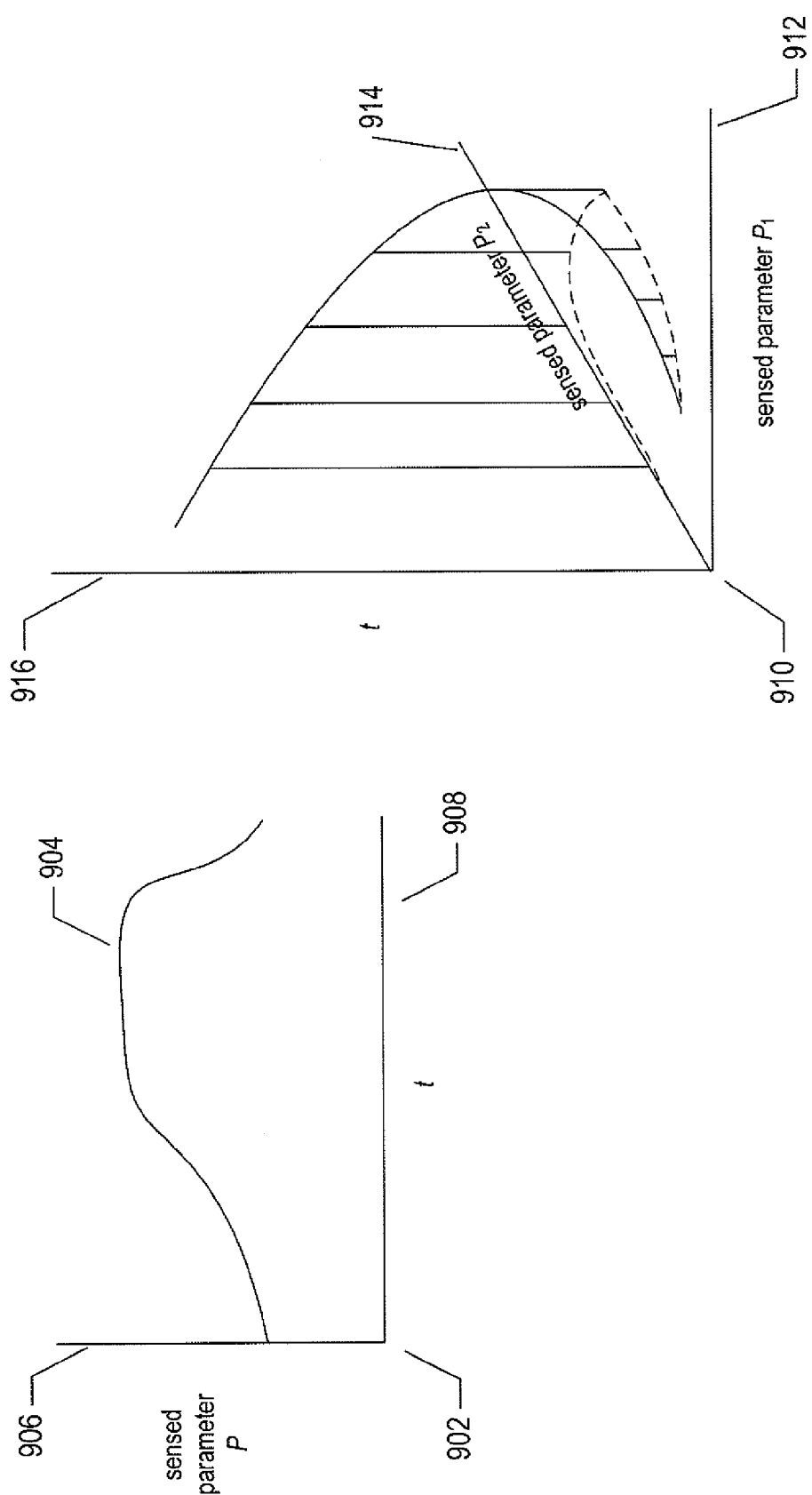
FIG. 9 illustrates the general characteristics of sensor output.

There are many different types of sensors and sensor output. In general, sensor output is directly or indirectly related to some type of parameter, machine state, organization state, computational state, or physical environmental parameter. FIG. 9 illustrates the general characteristics of sensor output. As shown in a first plot 902 in FIG. 9, a sensor may output a signal, represented by curve 904, over time, with the signal directly or indirectly related to a parameter P, plotted with respect to the vertical axis 906. The sensor may output a signal continuously or at intervals, with the time of output plotted with respect to the horizontal axis 908. In certain cases, sensor output may be related to two or more parameters. For example, in plot 910, a sensor outputs values directly or indirectly related to two different parameters P1 and P2, plotted with respect to axes 912 and 914, respectively, over time, plotted with, respect to vertical axis 916. In the following discussion, for simplicity of illustration and discussion, it is assumed that sensors produce output directly or indirectly related to a single parameter, as in plot 902 in FIG. 9. In the following discussion, the sensor output is assumed to be a set of parameter values for a parameter P. The parameter may be related to environmental conditions, such as temperature, ambient light level, sound level, and other such characteristics. However, the parameter may also be the position or positions of machine components, the data states of memory-storage address in data-storage devices, the current drawn from a power supply, the flow rate of a gas or fluid, the pressure of a gas or fluid, and many other types of parameters that comprise useful information for control purposes.

Figure 10A:
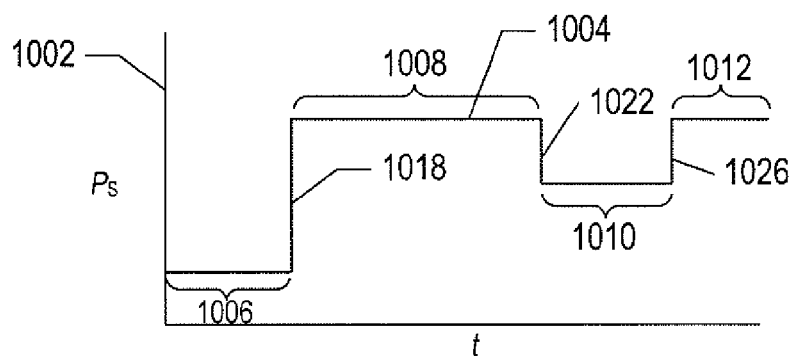
FIGS. 10A-D illustrate information processed and generated by an intelligent controller during control operations.

FIGS. 10A-D illustrate information processed and generated by an intelligent controller during control operations. All the figures show plots, similar to plot 902 in FIG. 9, in which values of a parameter or another set of control-related values are plotted with respect to a vertical axis and time is plotted with respect to a horizontal axis. FIG. 10A shows an idealized specification for the results of controlled-entity operation. The vertical axis 1002 in FIG. 10A represents a specified parameter value, Ps. For example, in the case of an intelligent thermostat, the specified parameter value may be temperature. For an irrigation system, by contrast, the specified parameter value may be flow rate. FIG. 10A is the plot of a continuous curve 1004 that represents desired parameter values, over time, that an intelligent controller is directed to achieve through control of one or more devices, machines, or systems. The specification indicates that the parameter value is desired to be initially low 1006, then rise to a relatively high value 1008, then subside to an intermediate value 1010, and then again rise to a higher value 1012. A control specification can be visually displayed to a user, as one example, as a control schedule.

A setpoint change may be stored as a record with multiple fields, including fields that indicate whether the setpoint change is a system-generated setpoint or a user-generated setpoint, whether the setpoint change is an immediate-control-input setpoint change or a scheduled setpoint change, the time and date of creation of the setpoint change, the time and date of the last edit of the setpoint change, and other such fields. In addition, a setpoint may be associated with two or more parameter values. As one example, a range setpoint may indicate a range of parameter values within which the intelligent controller should maintain a controlled environment. Setpoint changes are often referred to as "setpoints."

Figure 10B:
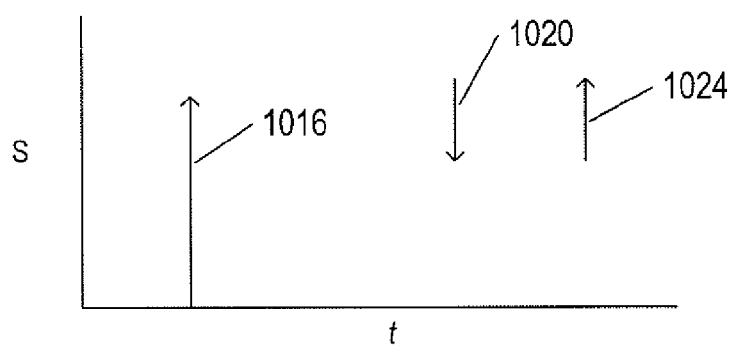

FIG. 10B shows an alternate view, or an encoded-data view, of a control schedule corresponding to the control specification illustrated in FIG. 10A. The control schedule includes indications of a parameter-value increase 1016 corresponding to edge 1018 in FIG. 10A, a parameter-value decrease 1020 corresponding to edge 1022 in FIG. 10A, and a parameter-value increase 1024 corresponding to edge 1016 in FIG. 10A. The directional arrows plotted in FIG. 10B can be considered to be setpoints, or indications of desired parameter changes at particular points in time within some period of time.

Figure 10C:
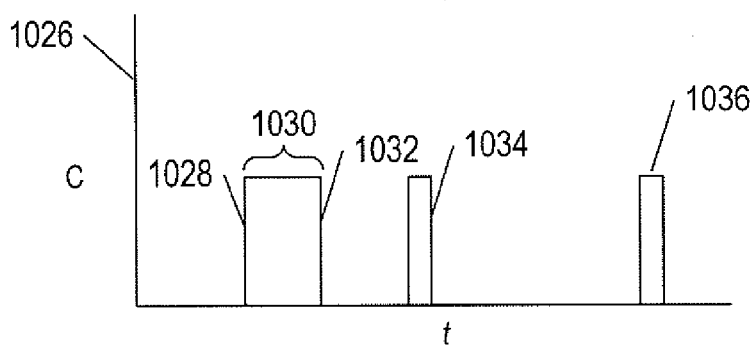

FIG. 10C illustrates the control output by an intelligent controller that might result from the control schedule illustrated in FIG. 10B. In this figure, the magnitude of an output control signal is plotted with respect to the vertical axis 1026. For example, the control output may be a voltage signal output by an intelligent thermostat to a heating unit, with a high-voltage signal indicating that the heating unit should be currently operating and a low-voltage output indicating that the heating system should not be operating. Edge 1028 in FIG. 10C corresponds to setpoint 1016 in FIG. 10B. The width of the positive control output 1030 may be related to the length, or magnitude, of the desired parameter-value change, indicated by the length of setpoint arrow 1016. When the desired parameter value is obtained, the intelligent controller discontinues output of a high-voltage signal, as represented by edge 1032. Similar positive output control signals 1034 and 1036 are elicited by setpoints 1020 and 1024 in FIG. 10B.

Figure 10D:
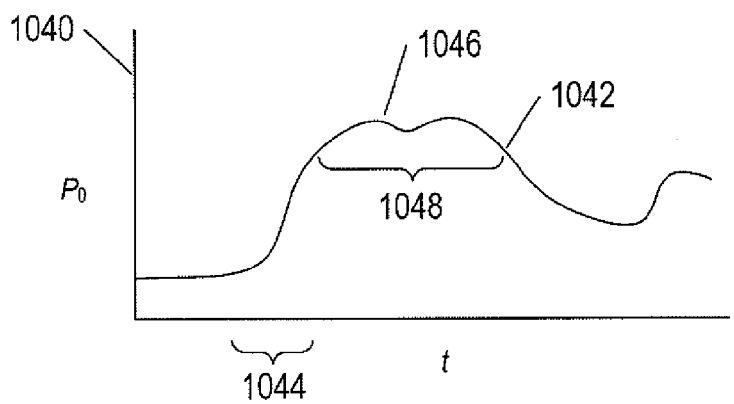

Finally, FIG. 10D illustrates the observed parameter changes, as indicated by sensor output, resulting from control, by the intelligent controller, of one or more controlled entities. In FIG. 10D, the sensor output, directly or indirectly related to the parameter P, is plotted with respect to the vertical axis 1040. The observed parameter value is represented by a smooth, continuous curve 1042. Although this continuous curve can be seen to be related to the initial specification curve, plotted in FIG. 10A, the observed curve does not exactly match that specification curve. First, it may take a finite period of time 1044 for the controlled entity to achieve the parameter-valued change represented by setpoint 1016 in the control schedule plotted in FIG. 10B. Also, once the parameter value is obtained, and the controlled entity directed to discontinue operation, the parameter value may begin to fall 1046, resulting in a feedback-initiated control output to resume operation of the controlled entity in order to maintain the desired parameter value. Thus, the desired high-level constant parameter value 1008 in FIG. 10A may, in actuality, end up as a time-varying curve 1048 that does not exactly correspond to the control specification 1004. The first level of feedback, discussed above with reference to FIG. 8, is used by the intelligent controller to control one or more control entities so that the observed parameter value, over time, as illustrated in FIG. 10D, matches the specified time behavior of the parameter in FIG. 10A as closely as possible. The second level feedback control loop, discussed above with reference to FIG. 8, may involve alteration of the specification, illustrated in FIG. 10A, by a user, over time, either by changes to stored control schedules or by input of immediate-control directives, in order to generate a modified specification that produces a parameter-value/time curve reflective of a user's desired operational results.

There are many types of controlled entities and associated controllers. In certain cases, control output may include both an indication of whether the controlled entity should be currently operational as well as an indication of a level, throughput, or output of operation when the controlled entity is operational. In other cases, the control out may be simply a binary activation/deactivation signal. For simplicity of illustration and discussion, the latter type of control output is assumed in the following discussion.

Figure 11:
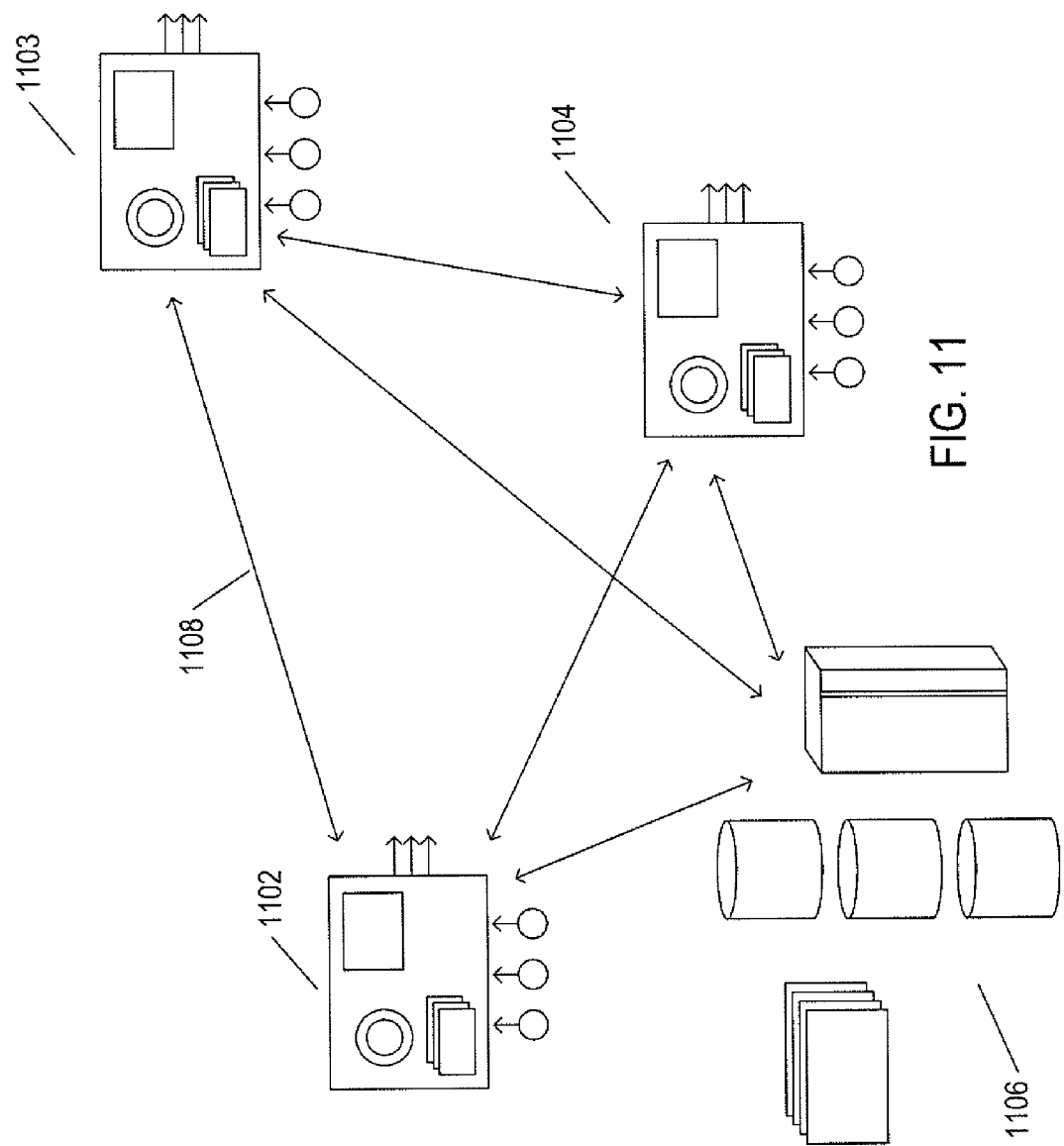
FIG. 11 illustrates a distributed-control environment.

FIG. 11 illustrates a distributed-control environment. The intelligent controller discussed with reference to FIGS. 4-8, above, is discussed in the context of a single controller within an environment that includes, or that is operated on by, a system controlled by the intelligent controller. However, as shown in FIG. 11, multiple intelligent controllers 1102-1104, in certain implementations in cooperation with a remote computing system 1106, may together control one or more systems that operate on an environment in which the multiple intelligent controllers are located or that is controlled remotely by the multiple intelligent controllers. As discussed further, below, the multiple intelligent controllers may control one or more systems with various degrees of control distribution and cooperation. In general, as indicated by double-headed arrows in FIG. 11, such as double-headed arrow 1108, each intelligent controller exchanges data with the remaining intelligent controllers of the multiple intelligent controllers and all of the intelligent controllers exchange data with the remote computing system. In certain cases, one or a subset of the multiple controllers acts as a local router or bridge on behalf of the remaining intelligent controllers of the multiple intelligent controllers so that data and messages sent from a first intelligent controller to a target intelligent controller or target remote computing system can be transmitted to, and forwarded by, a second intelligent controller acting as a router or bridge to the target.

Figure 12:
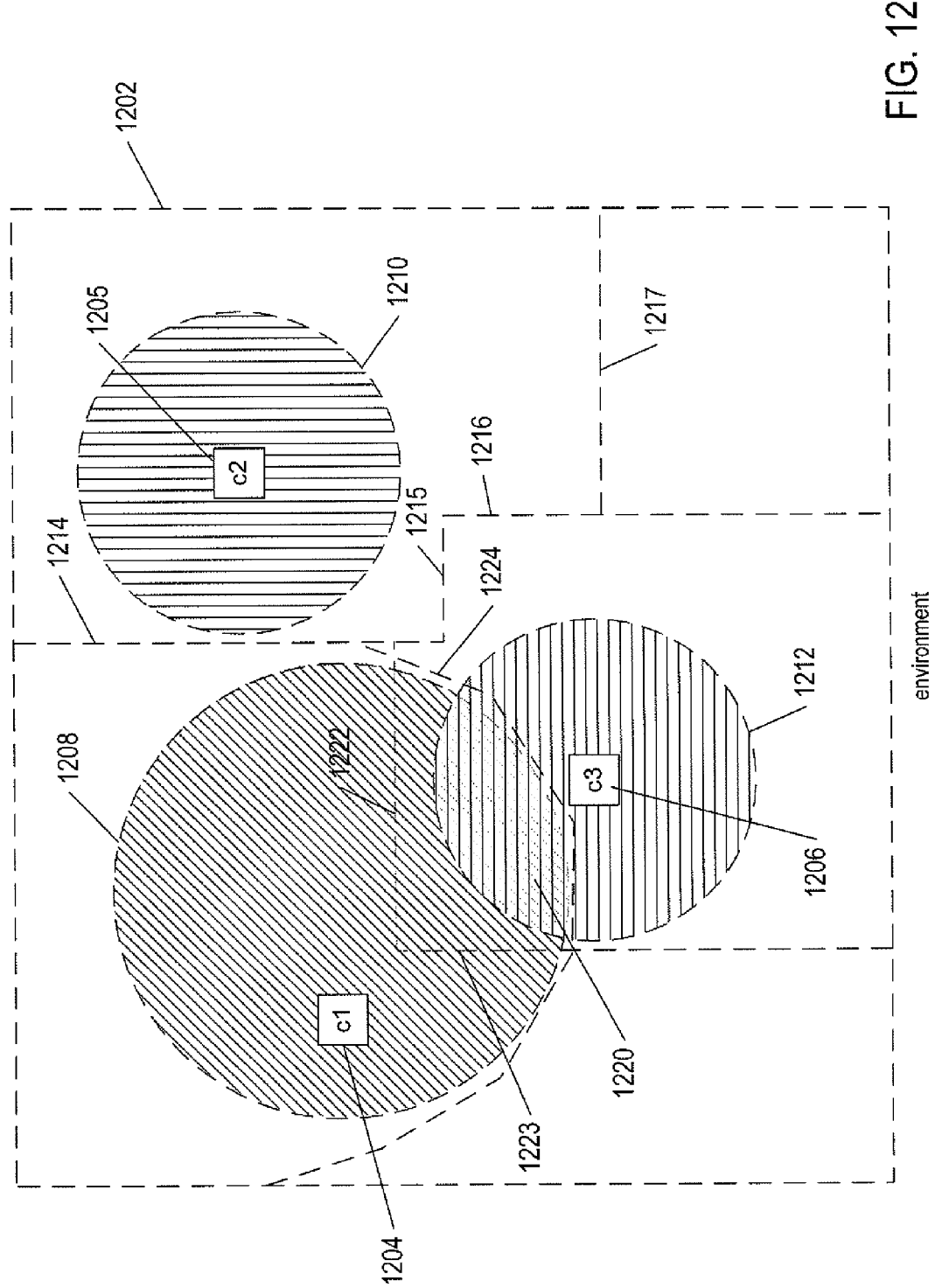
FIG. 12 illustrates sensing and inference regions associated with each controller of a set of multiple controllers within an environment.

FIG. 12 illustrates sensing and inference regions associated with each controller of a set of multiple controllers within an environment. The environment controlled by the multiple controllers is represented, in FIG. 12, by an outer dashed rectangle 1202. The environment includes three controllers 1204-1206. In certain implementations, rather than intelligent controllers, the environment contains sensors that communicate with corresponding remote intelligent controllers. In the present discussion, for simplicity of description, the intelligent controllers are discussed as residing within the environment that they control, but as indicated in the preceding statement, they may be physically located outside of the environment which they control. Each controller uses one or more sensors to receive sensor output that allows the controller to directly measure or detect characteristics or parameters of the environment within a region of direct perception. The region of direct perception for the controller c1 1204 is shown as a cross-hatched disk-shaped region 1208. The regions of direct perception for controllers c2 and c3 are similarly shown as cross-hatched disk-shaped regions 1210 and 1212, respectively. In the environment illustrated in FIG. 12, each controller may be responsible for directly measuring characteristics and parameters of the environment or inferring the characteristics and the parameters of the environment within a perception region. In FIG. 12, the perception regions of the three controllers are indicated by dashed lines and contain the corresponding regions of direct perception. For example, the perception region for controller c2 is bounded by the environment boundary 1202 and dashed-lines 1214-1217. As can be seen in FIG. 12, both regions of direct perception and perception regions corresponding to different controllers may overlap. For example, the doubly cross-hatched region 1220 represents the overlap of the regions of direct perception associated with controllers c1 1204 and c3 1206. Similarly, the region bounded by dashed-line segments 1222-1224 represents an overlap of the perception regions associated with controllers c1 and c3.

FIG. 12 shows that distributed control of an environment with multiple intelligent controllers may be associated with complex considerations. An intelligent controller may be responsible for sensing a portion of the environment, referred to above as the "perception region" associated with the intelligent controller, that exceeds a region directly accessible by the intelligent controller through sensors, referred to above as the "region of direct perception." In order to provide various types of determinations needed for control decisions with respect to the perception region, the intelligent controller may use various rules and differencing techniques to extend determinations based on sensor output to the larger perception region. When an intelligent controller includes multiple sensors, the intelligent controller may also carry out various types of probabilistic determinations with regard to inconsistencies in sensor outputs for multiple sensors, and may continuously calibrate and verify sensor data with independent determinations of environmental characteristics and parameters inferred from sensor output. When perception regions and regions of direct perception associated with multiple controllers overlap, distributed control may involve employing multiple determinations by multiple controllers and resolving conflicting determinations. In many cases, inferences made by one controller based on incomplete sensor data available to the controller may be strengthened by supplemental data relevant to the determinations supplied by other intelligent controllers.

Figure 13:
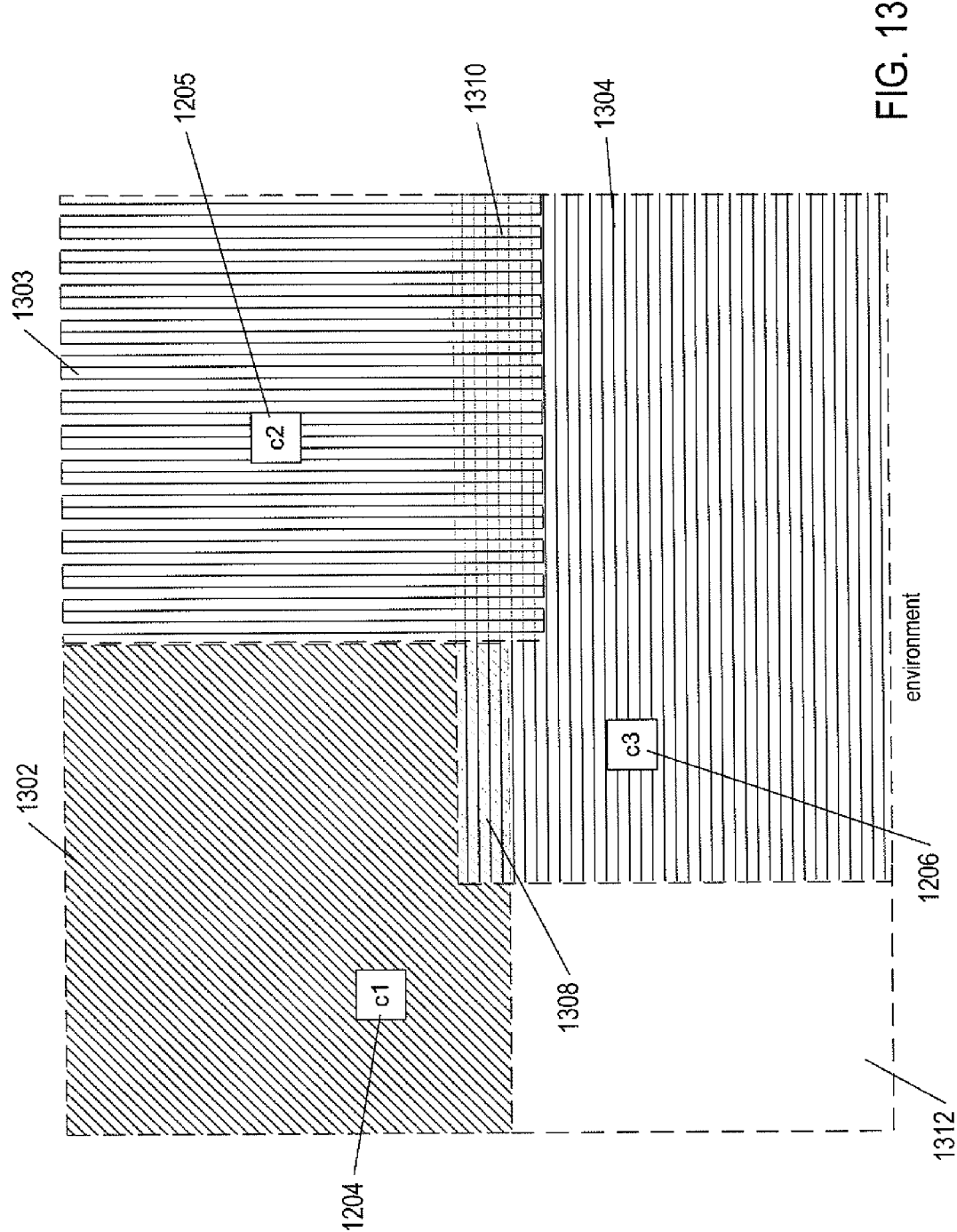
FIG. 13 illustrates control domains within an environment controlled by multiple intelligent controllers.

FIG. 13 illustrates control domains within an environment controlled by multiple intelligent controllers. In the environment illustrated in FIGS. 12 and 13, each of the three intelligent controllers 1204-1206 is associated with a control domain, indicated by cross-hatching. In the example shown in FIG. 13, the three control domains 1302-1304 associated with intelligent controllers 1204-1206, respectively, are rectangularly shaped. The control domains associated with intelligent controllers c1 1204 and c3 1206 overlap within a first doubly cross-hatched region 1308 and the control domains associated with controllers c2 1205 and c3 1206 overlap in a second doubly cross-hatched domain 1310.

The concept of control domains adds further complexity to the distributed control of an environment by multiple intelligent controllers. Intelligent controllers use determinations of various characteristics and parameters of the environment from sensor data and electronically stored information, including control schedules, historical sensor data, and historical determinations of environmental characteristics and parameters, to intelligently control one or more systems to provide desired characteristics and parameters within the control domain associated with the intelligent controller. However, because control domains may overlap, and because a portion of an environment, such as region 1312 in FIG. 13, may not be subject to direct control by any intelligent controller through control of one or more systems, many complex distributed-control decisions are made and many tradeoffs considered in order to provide intelligent distributed control over an environment. As one example, intelligent controllers c1 and c3 may end up controlling their individual control domains somewhat suboptimally in order to prevent unacceptable characteristics and parameter values from arising in the region of overlap 1308 between their control domains. Furthermore, because control domains may not be strictly coextensive with perception regions, complex control decisions may be undertaken to indirectly control portions of an environment external to individual control domains.

In FIGS. 12 and 13, the regions of direct perception, perception regions, and control domains are shown as areas within an environment. In certain intelligent-control problem domains, the regions of direct perception, perception regions, and control domains may be subvolumes within a larger environmental volume. For example, a single-story residence may be adequately described in terms of areas within a total residence area, while a multi-story apartment building may require consideration of subvolumes within a larger volume comprising all of the apartments in the multi-story apartment building. In the following discussion, an area view, rather than a volume view, of intelligent control is adopted, for clarity and ease of illustration and discussion.

The current application is directed to intelligent controllers that directly and indirectly sense the presence of one or more different types of entities within associated perception regions within their environment and then make, either alone or in distributed fashion together with other intelligent controllers and/or remote computers, control-schedule adjustments and may undertake additional activities and tasks depending on whether the one or more entities are present or absent within the environment, as a whole, or within certain portions of the environment. In the following discussion, intelligent controllers that determine the presence of human beings within environments controlled by the intelligent controllers are discussed, as one example. However, the presence or absence of any of a variety of other types of entities may be detected by intelligent controllers and the detection used to adjust control schedules or undertake additional activities. For example, intelligent controllers in manufacturing environment may detect the presence of subassemblies within or near automated assembly stages and accordingly control automated assembly stages to carry out various manufacturing processes on the subassemblies. Various types of automobile-traffic-related intelligent controllers may detect the presence or absence of automobiles in particular regions and accordingly control signal lights, drawbridges, street lighting, and other devices and systems.

Intelligent controllers that detect the presence and/or absence of human beings in an environment or a portion of an environment generally construct and maintain a continuously updated presence-probability map or scalar presence-probability indication, with continuous updating including updating the probability map or scalar indication after each new sensor reading, after a threshold-level change in sensor readings, at regular intervals, after expiration of timers or after fielding interrupts, or on many other temporal bases. The presence-probability maps or scalar indications are then used for adjustment of control schedules and launching of any of various control operations dependent on the presence or absence of human beings in the overall environment or regions of the environment controlled by the intelligent controllers. Note the phrase "presence probability" may refer to either the probability of one or more entities being present in an area or volume or the probability of one or more entities being absent from a an area or volume, equivalent to interchanging the polarity of a probability interval [0, 1].

Figure 14A:
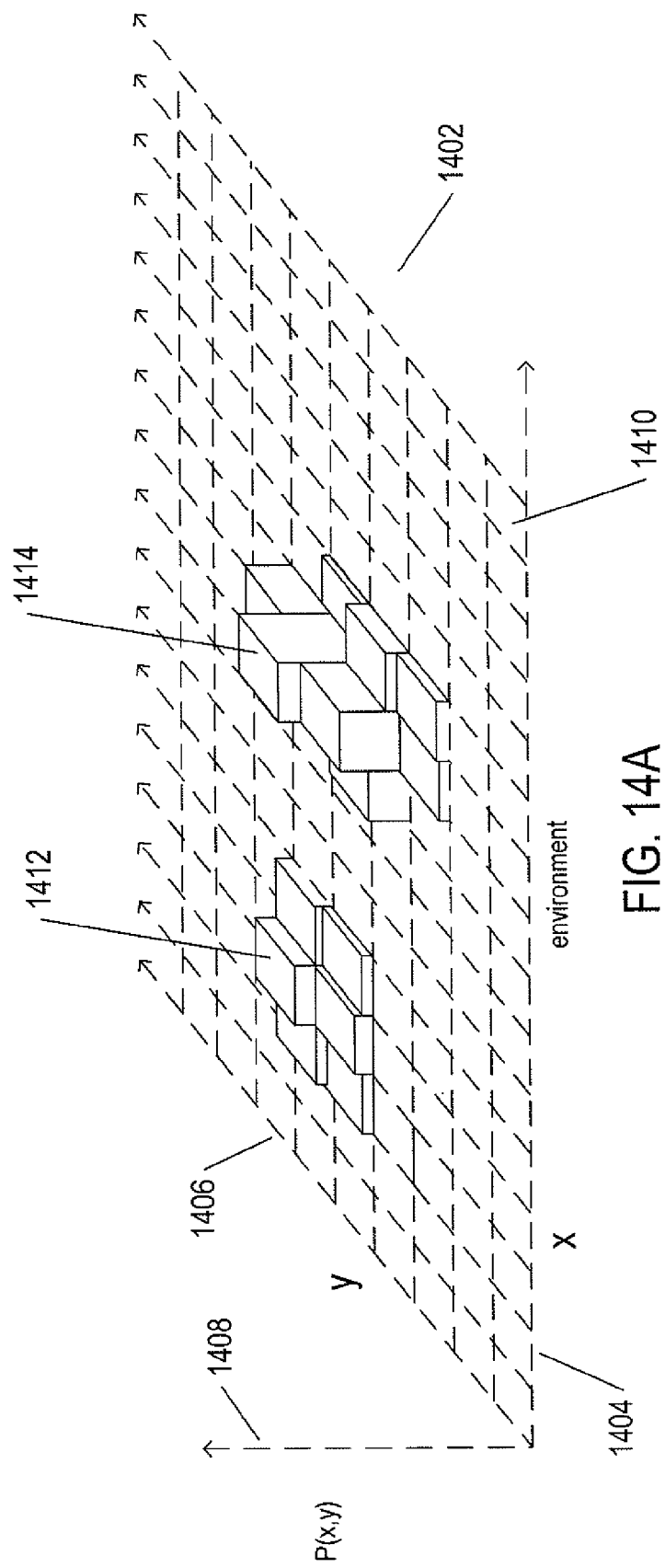
Figure 14B:
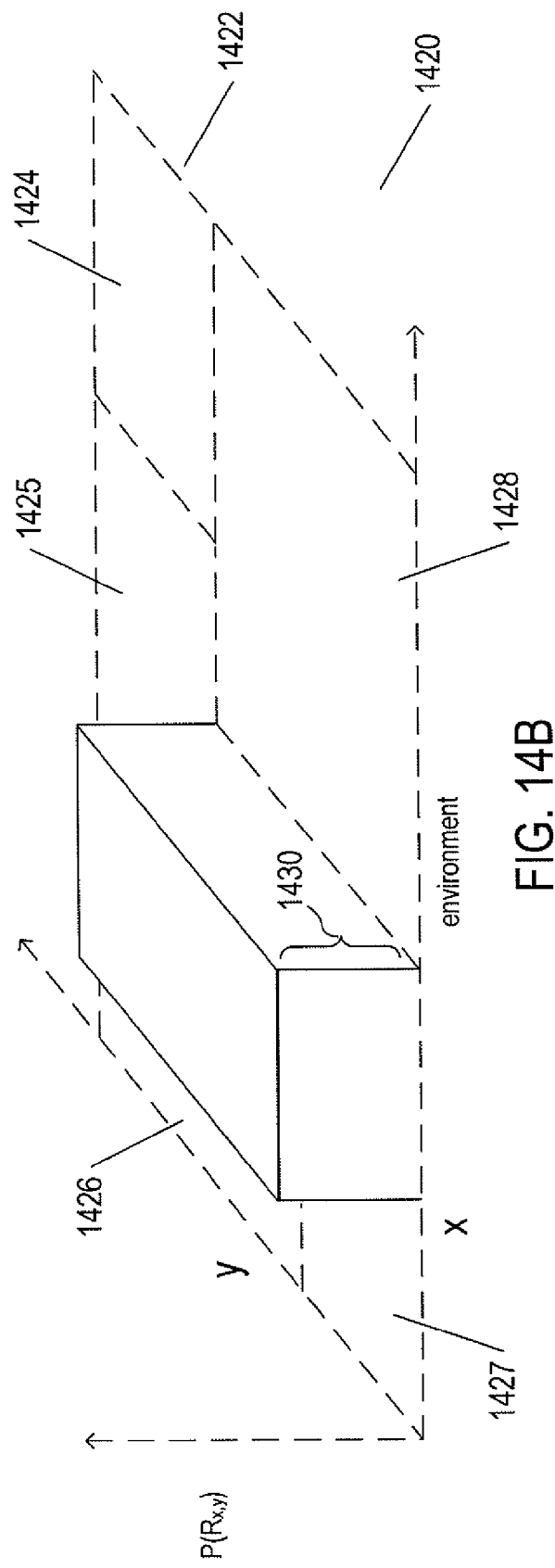

FIGS. 14A-C illustrate various types of electronically stored presence-probability information within one or more intelligent controllers and/or remote computer systems accessible to the one or more intelligent controllers. FIG. 14A shows a presence-probability map for a region of an environment associated with an intelligent controller. In the example shown in FIG. 14A, the region 1402 is rectangular, and points within the region are described by coordinates of a rectangular Cartesian coordinate system that includes an x axis 1404 and a y axis 1406. The vertical axis 1408 represents the probability $P(x,y)$ that a human being is present at the position $(x,y)$ within the region 1402. Commonly, the region may be divided in grid-like fashion into a two-dimensional array of smallest-granularity subregions, such as subregion 1410. For those subregions associated with a non-zero presence probability, the height of a column rising from a subregion represents the probability that a human being is currently present within that subregion. Thus, in the example shown in FIG. 14A, there is a non-zero probability that a human being is present within a first subregion 1412 and a second subregion 1414 within the region 1402 described by the presence-probability map. In many cases, the probability map is normalized, so that integration of the column volumes for the entire presence-probability map provides a cumulative presence probability for the entire environment in the range [0,1]. However, other types of normalizations are possible, and, for many control decisions, normalization is not required.

FIG. 14B illustrates a different type of presence-probability map. In the presence-probability map 1420 shown in FIG. 14B, a rectangle 1422 representing an entire environment or a portion of an environment controlled by an intelligent controller is subdivided into subregions 1424-1428. In this presence-probability map, the height 1430 of a column rising from a subregion represents the probability that a human being is present in that subregion. In general, this second type of presence-probability map is more coarsely grained than the presence-probability map illustrated in FIG. 14A, and the smallest-granularity subregions are regularly sized or regularly positioned within the region or environment 1422 described by the presence-probability map. As one example, a presence-probability map of this type may be used for a residential environment, with each subregion corresponding to a room in the residence.

In general, as indicated above, an intelligent controller maintains a presence-probability map over time, adjusting the presence-probability map, at intervals, to reflect a best estimate for the probability of the presence of a human being in subregions of the map based on current sensor readings, historical, electronically stored information, and information obtained from remote sources. FIG. 14C illustrates a presence-probability map maintained by an intelligent controller over time. At each of various points of time, including the points of time labeled $t_1$ 1440, $t_2$ 1441, and $t_3$ 1442 along a horizontal time axis 1444, the intelligent controller has prepared a presence-probability map, including presence-probability maps 1446-1448 corresponding to time points $t_1$, $t_2$, and $t_3$.

In certain cases, one or more intelligent controllers may make a single, scalar determination of the probability of the presence of a human being within an entire environment, and compute the scalar presence-probability value at intervals, over time. FIG. 14D illustrates a portion of a time line 1460 along which computed scalar presence-probability values are shown as columns above time intervals.

Figure 15:
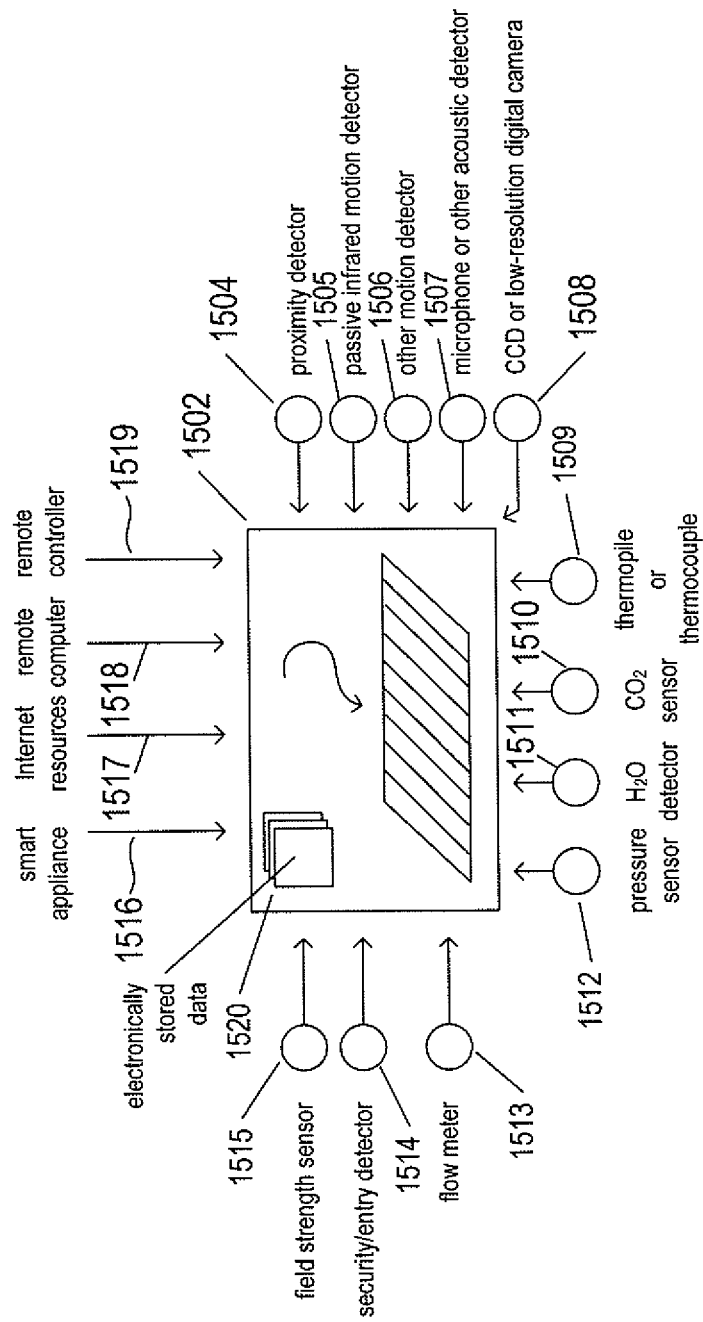
FIG. 15 illustrates some of the many different types of received and electronically stored information that may be used by an intelligent controller in order to determine the probability of presence of a human being in an entire environment or within subregions or at certain points of the environment.

An intelligent controller may use any of many different types of received and/or electronically stored data in order to construct presence-probability maps and scalar values, discussed above with reference to FIGS. 4A-D. FIG. 15 illustrates some of the many different types of received and electronically stored information that may be used by an intelligent controller in order to determine the probability of presence of a human being in an entire environment or within subregions or at certain points of the environment. In FIG. 15, rectangle 1502 represents an intelligent controller. Unfilled circles, such as unfilled circle 1504, represent sensors. Arrows, such as arrow 1516, represent data input. In addition to sensor data and data input from remote information and data sources, the intelligent controller may also internally store many different types of data 1520, including historical sensor data, non-current presence-probability scalars and maps, historical determinations of the presence and/or absence of humans, control schedules, control inputs, and many other different types of data.

Various types of sensors useful for making determinations with regard to the presence or absence of human beings in an environment include proximity detectors 1504, passive infrared ("PIR") motion detectors 1505, other types of motion detectors 1506, microphones or other types of acoustic detectors 1507, charge-coupled detectors ("CCD") or low-resolution digital cameras 1508, thermopiles or thermocouples 1509, carbon dioxide sensors 1510, water-vapor detectors 1511, pressure sensors 1512, various types of flow meters 1513, security/entry detectors within home-security systems 1514, and various types of field-strength sensors that sense magnetic and electrical fields 1515. Proximity detectors include a wide variety of different types of sensors, including capacitive, capacitive-displacement, conductive, magnetic, optical, thermal, sonar, and other types of sensors. PIR motion-detector sensors detect abrupt changes in temperatures based on infrared radiation emitted by living creatures. Other types of motion detectors include ultrasonic, microwave, and tomographic motion detectors. Acoustic detectors can detect various types of sounds or sound patterns indicative of the presence of human beings. Low-resolution cameras and CCD devices may detect changes in ambient light, including changes in ambient light due to moving objects. Thermopiles and thermocouples can be used to detect changes in temperature correlated with the presence of human beings and other living organisms. Similarly, carbon-dioxide and water-vapor detectors may detect gasses exhaled by human beings and other living creatures. Pressure sensors may detect changes in pressure within an environment due to opening and closing of doors, windows, motion of large objects through the air, and other such pressure changes. Flow meters may detect the rate of flow of water, natural gas, and other gasses and liquids that flow under positive control by human beings. Various types of security-system entry detectors may be used to detect ingress and egress of occupants into and out from an environment. Field-strength sensors may detect temporal changes in field strength correlated with presence of human beings or motion of human beings through an environment.

An intelligent controller may receive data inputs from various smart appliances within an environment that indicate the presence of human beings as well as location-monitoring mobile phones and other such appliances 1516, information from a variety of Internet resources 1517 in which presence-and/or-absence information can be gleaned, information from a remote computer system 1518, as, for an example, a remote computer system to which various intelligent-control tasks and data is distributed, and various remote controllers 1519, including other intelligent controllers within an environment controlled by multiple intelligent controllers.

Figure 16:
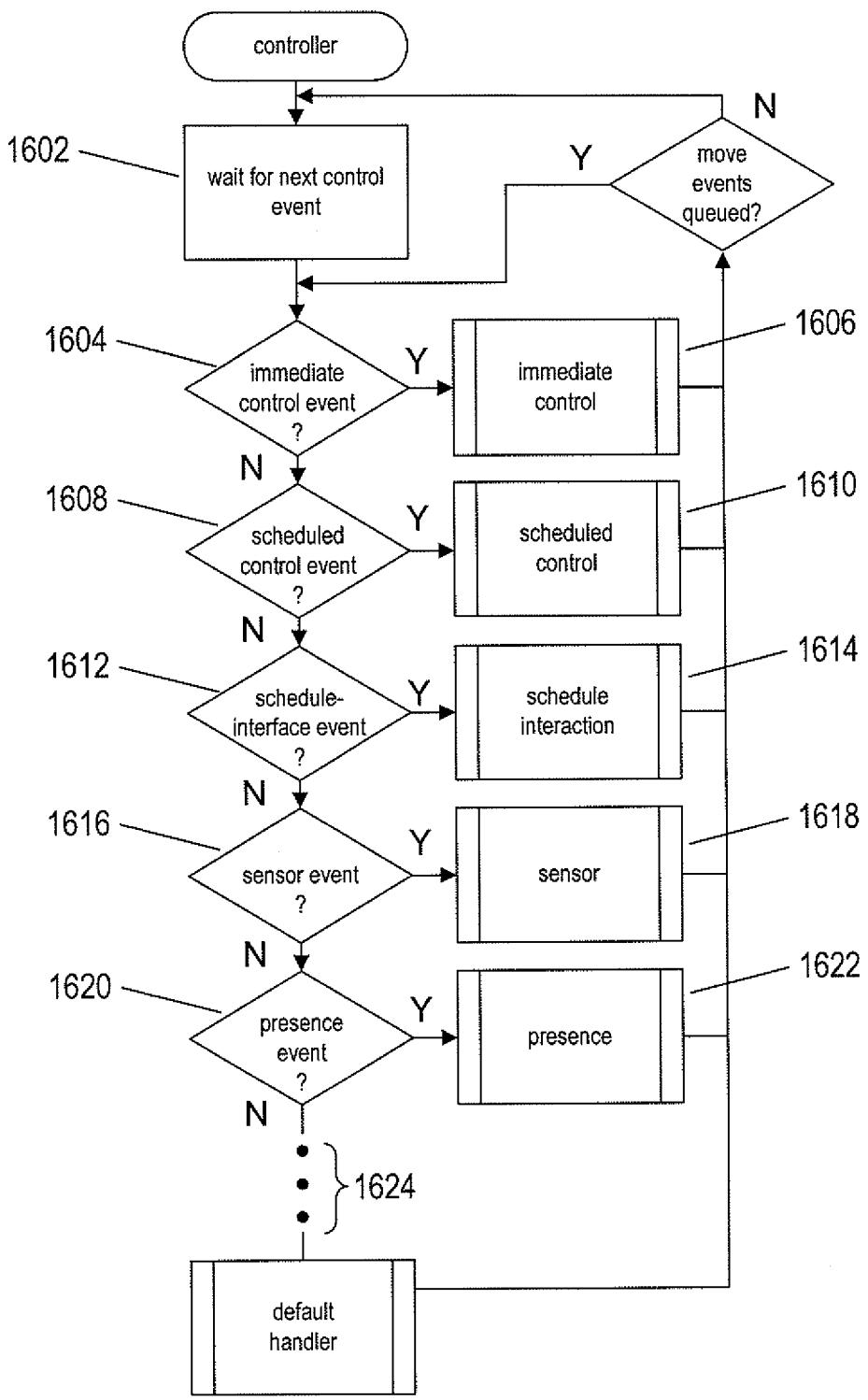
FIG. 16 illustrates a control-flow diagram for intelligent-controller operation.

FIG. 16 illustrates a control-flow diagram for intelligent-controller operation. In general, an intelligent controller, at a high level, continuously operates within the context of an event handler or event loop. In step 1602, the intelligent controller waits for a next control event. When the next control event occurs, then, in a series of conditional statements, the intelligent controller determines the type of event and invokes a corresponding control routine. In the case of an immediate-control event, as determined in step 1604, the intelligent controller calls an immediate-control routine, in step 1606, to carry out the intelligent controller's portion of a user interaction to receive one or more immediate-control inputs that direct the intelligent controller to issue control signals, adjust a control schedule, and/or carry out other activities specified by a user through an intermediate-control interface. In the case that the control event is a scheduled control event, such as when the current time corresponds to a time at which a control schedule specifies a control activity to be undertaken, as determined in step 1608, then a schedule-control routine is called, in step 1610, to carry out the scheduled control event. When the control event is a schedule-interface event, as determined in step 1612, then the intelligent controller invokes a schedule-interaction routine, in step 1614, to carry out the intelligent controller's portion of a schedule-input or schedule-change dialog with the user through a schedule interface. In the case that the control event is a sensor event, as determined in step 1616, then a sensor routine is called by the intelligent controller in step 1618 to process the sensor event. Sensor events may include interrupts generated by a sensor as a result of a change in sensor output, expiration of timers set to awaken the intelligent controller to process sensor data of a next-scheduled sensor-data-processing interval, and other such types of events. When the event is a presence event, as determined in step 1620, then the intelligent controller calls a presence routine, in step 1622. A presence event is generally a timer expiration, interrupt, or other such event that informs the intelligent controller that it is time to determine a next current probability-presence scalar value or to construct a next current probability-presence map. As indicated by the ellipsis 1624 in FIG. 16, many additional types of control events may occur and may be handled by an intelligent controller, including various types of error events, communications events, power-on and power-off events, and a variety of events generated by internal set components of the intelligent controller.

There are many different models that describe how various different intelligent controllers respond to detected presence and/or absence of human beings. As discussed above, during intelligent-controller operation, the intelligent controller continuously evaluates a wide variety of different types of electronically stored data and input data to update stored indication of the probability of human presence in each of one or more regions within an environment controlled by the intelligent controller. In one model, the intelligent controller primarily operates with respect to two different states: (1) a presence state resulting from determination, by the intelligent controller, that one or more human beings are present within one or more regions; and (2) a no-presence state, in which the intelligent controller has determined that no human beings are present within the one or more regions.

Figure 17A:
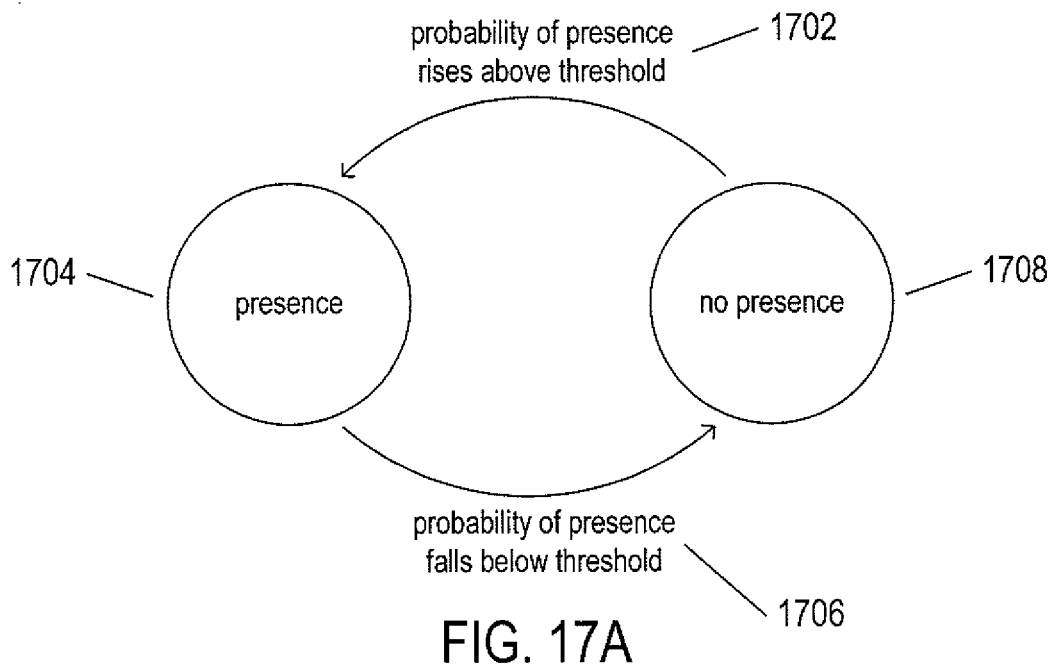
FIGS. 17A-B illustrate variations in a presence/no-presence model.
Figure 17B:
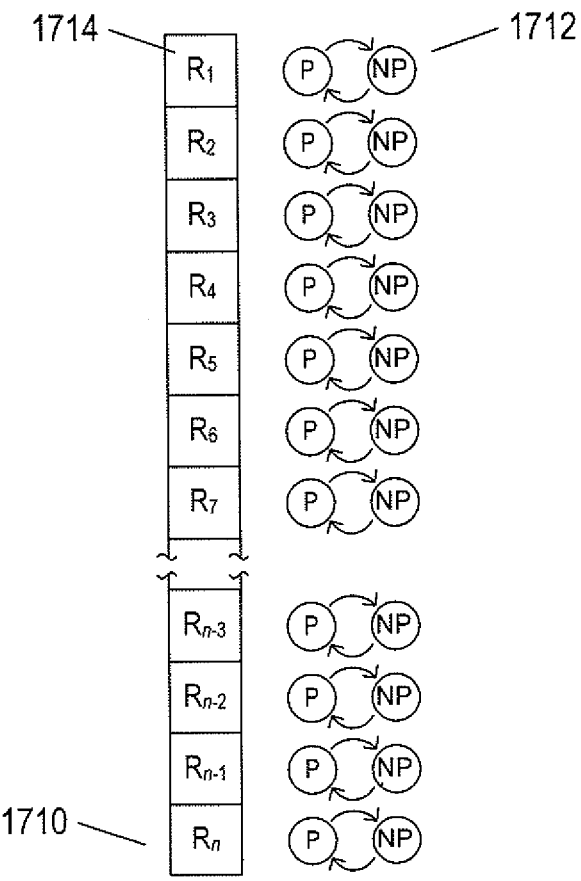

FIGS. 17A-B illustrate variations in a presence/no-presence model. FIG. 17A shows a simple presence/no-presence model that includes two states for the entire perception region or control domain associated with the controller. When the probability of human presence within the perception region rises above a first threshold value 1702, the intelligent controller transitions to a presence state 1704. When the probability of presence of a human being within the perception region falls below a second threshold value 1706, the intelligent controller transitions to a no-presence state 1708. In this case, the current scalar probability value or presence-probability map is continuously or iteratively evaluated with respect to one or more thresholds in order to determine in which of the two states 1704 and 1708 the intelligent controller currently resides. As shown in FIG. 17B, when an intelligent controller makes presence and/or absence determinations for multiple regions within an environment, then each region is associated with presence and no-presence states. In FIG. 17B, each element of the column vector 1710 corresponds to a different region, and each different region is associated with a presence/no-presence state-transition diagram such as the state-transition diagram 1712 associated with region $R_1$ 1714.

Figure 18A:
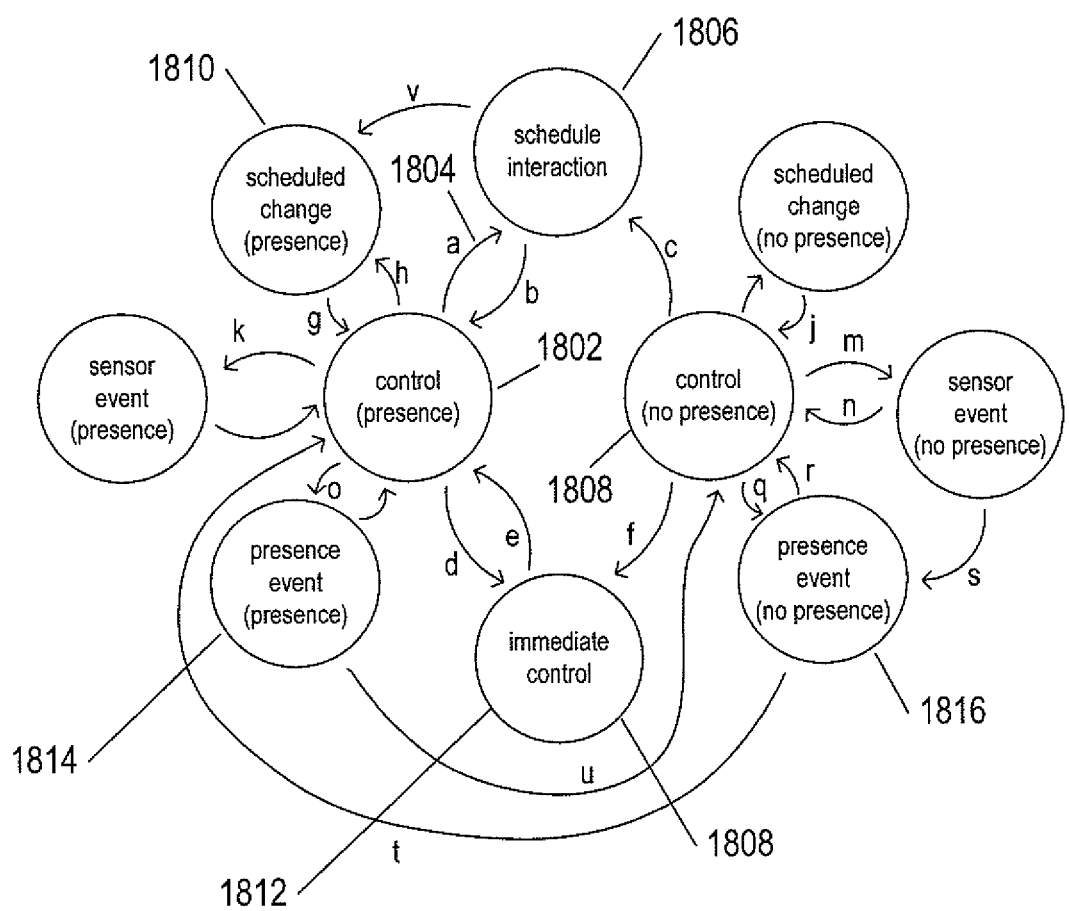

FIGS. 18A-B provide a state-transition diagram for an intelligent controller that operates according to the two-state transition diagram illustrated in FIG. 17A. In FIG. 18A, each state is represented by a labeled circle, such as labeled circle 1802, and state transitions are represented by curved arrows, such as curved arrow 1804. FIG. 18B provides a table in which the lower-case letter corresponding to each state transition in FIG. 18A is paired with an explanation of the state transition. In FIG. 18A, the intelligent-controller state is largely divided between presence states and no-presence states. In other words, the state-transition diagram of FIG. 17A is superimposed over a state-transition diagram for an intelligent controller to produce presence states and no-presence states. However, two states 1806 and 1808 do not have presence and no-presence counterparts, since, in the simple example intelligent controller described by FIGS. 18A-B, a human being must be present in order to interact with the intelligent controller through a schedule interface or an immediate-control interface. In other words, these two states are defined to be presence states, for this example. Many intelligent controllers would, in fact, have presence and no-presence states for the schedule-interaction state 1806 and the immediate-control state 1808, since users may access a schedule interface or immediate-control interface remotely, through mobile phones and other mobile computing appliances. However, the intelligent controller described by the state-transition diagram provided in FIGS. 18A-B features a simple schedule display and immediate-control interface that requires the presence of a user. In general, the intelligent controller occupies either of the two control states 1802 and 1808. In these states, the intelligent controller may carry out a variety of different activities on an ongoing basis, including exchanging data with other intelligent controllers and remote computer systems, responding to error events, and other such activities.

When a user interacts with the intelligent controller through the schedule interface, the intelligent controller transitions from either of the control states 1802 and 1808 to the schedule-interaction state 1806. Once the schedule interaction is concluded, the intelligent controller may return to control state 1802 either directly or through a scheduled-change state 1810 as a result of the current time corresponding to a schedule setpoint. However, when the schedule-interaction state 1806 is reached directly from the no-presence control state 1808, there is no state transition that returns the intelligent controller to the no-presence control state 1808. This is because user interaction through the schedule interface provides unambiguous evidence of the fact that a human being is present, in this example, and, therefore, subsequent states are presence-associated states. Similar considerations apply to the immediate-control state 1812. The intelligent controller may transition from the presence-associated states to no-presence-associated states from a presence-event state 1814 in which the intelligent controller determines the current probability of human presence. A similar presence-event state 1816 provides a transition to presence-associated events. Thus, the state transition diagrams in FIG. 18A-B represent intelligent-controller operation alternatively to the high-level control-flow diagram provided in FIG. 16.

Figure 19:
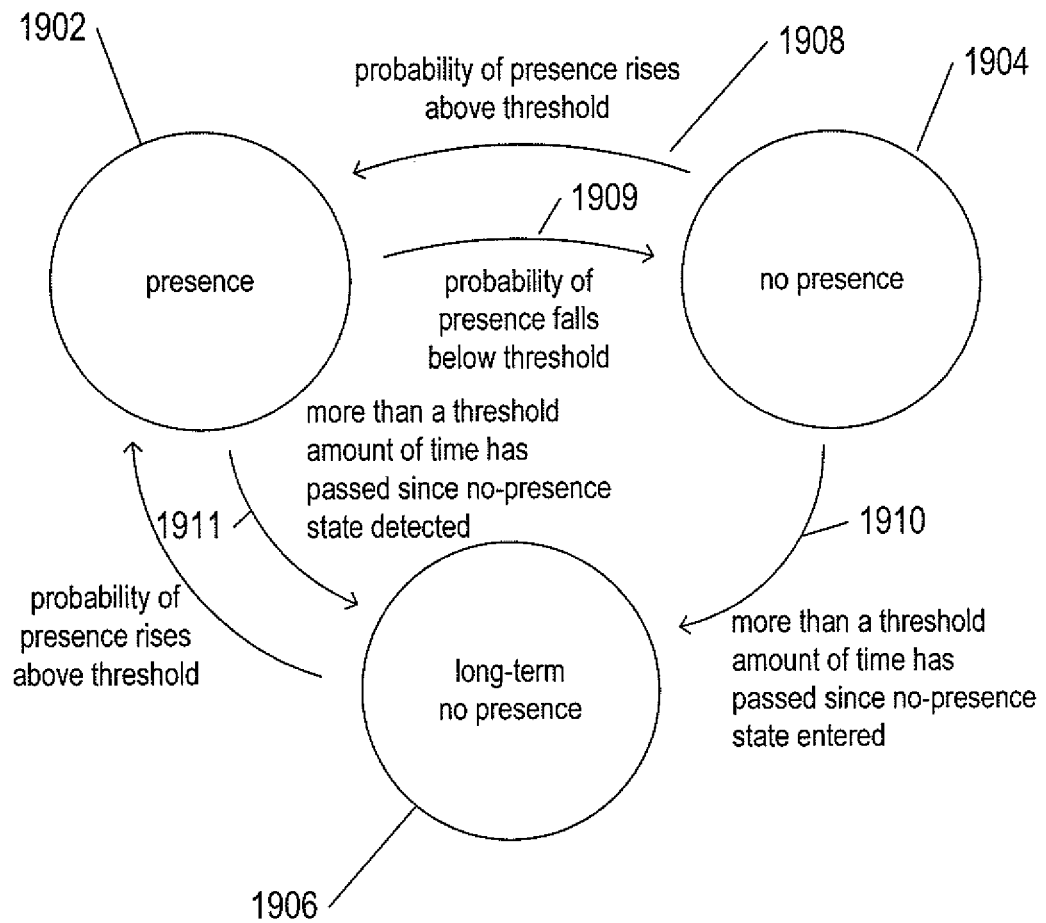
FIGS. 19 and 20 illustrate a three-presence-states intelligent controller using illustration conventions similar to those used in FIGS. 17A and 18A.
Figure 20:
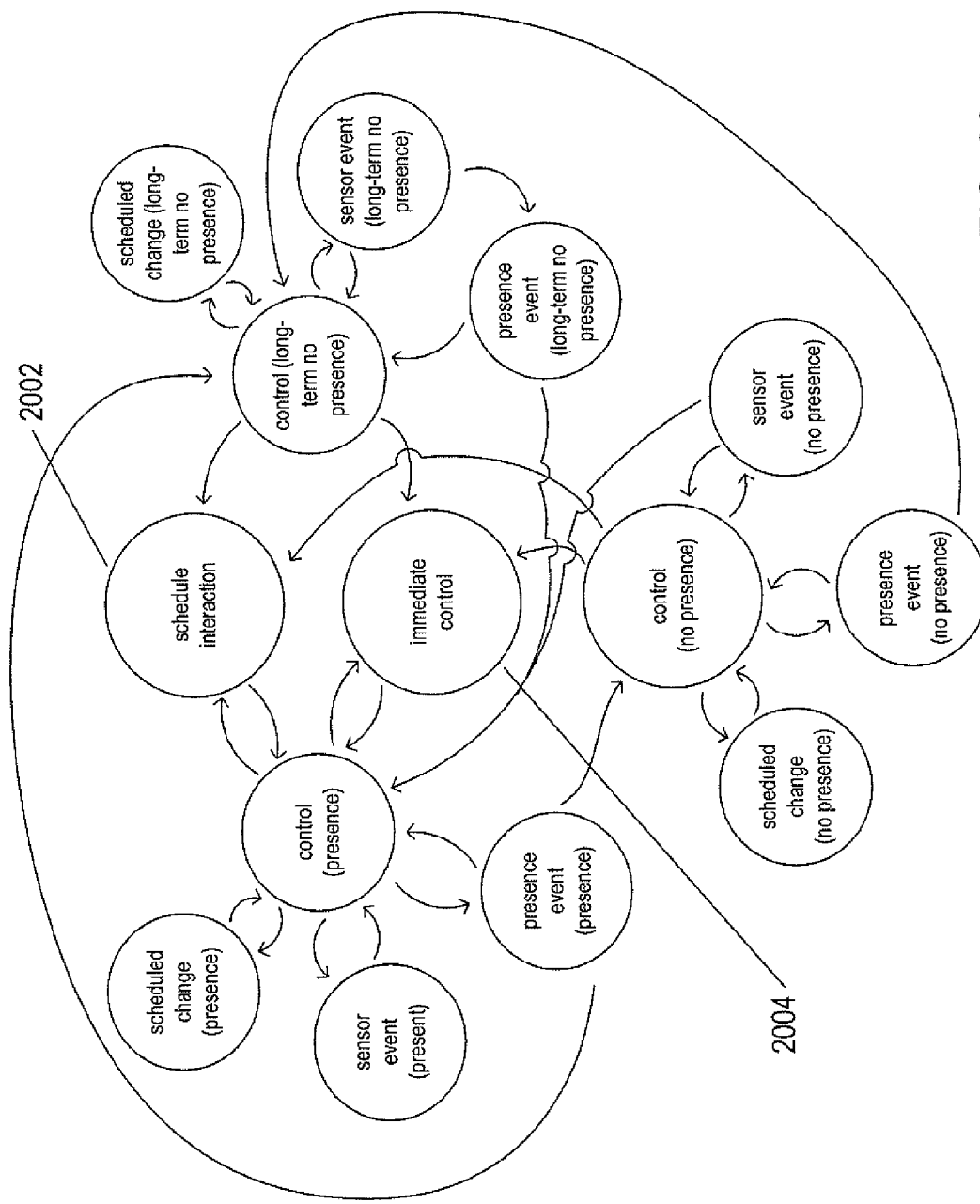

In other intelligent-controller implementations, there may be additional presence-related states. FIGS. 19 and 20 illustrate a three-presence-states intelligent controller using illustration conventions similar to those used in FIGS. 17A and 18A. In one type of three-presence-states intelligent controller, the intelligent controller may operate within a presence state 1902, a no-presence state 1904, or a long-term no-presence state 1906. States 1902 and 1904, along with transitions 1908-1909, respond to the state-transition diagram shown in FIG. 17A. However, the state-transition diagram shown in FIG. 19 also includes state 1906 which corresponds to the absence of human presence within one or more regions controlled by the intelligent controller for greater than a threshold amount of time. This state can be entered either from the no-presence state 1904 or the presence state 1902 via transitions 1910 and 1911, respectively. However, the intelligent controller, once in the long-term no-presence state 1906, can only transition out of long-term no-presence state 1906 to the present state 1902. FIG. 20 provides a state-transition diagram for intelligent-controller operation similar to that provided in FIG. 18A. However, in this case, there are three different types of states associated with the presence, no-presence, and long-term no-presence states 1902, 1904, and 1906 shown in FIG. 19. In other words, the state-transition diagram of FIG. 19 has been superimposed over a state-transition diagram for intelligent-controller operation in order to generate the state-transition diagram shown in FIG. 20. As in the state-transition diagram shown in FIG. 18A, the schedule-interaction state 2002 and the immediate-control state 2004 are defined to indicate the presence of a human being, and are thus not replicated to create three presence-associated, no-presence-associated, and long-term-no-presence-associated states.

Figure 21:
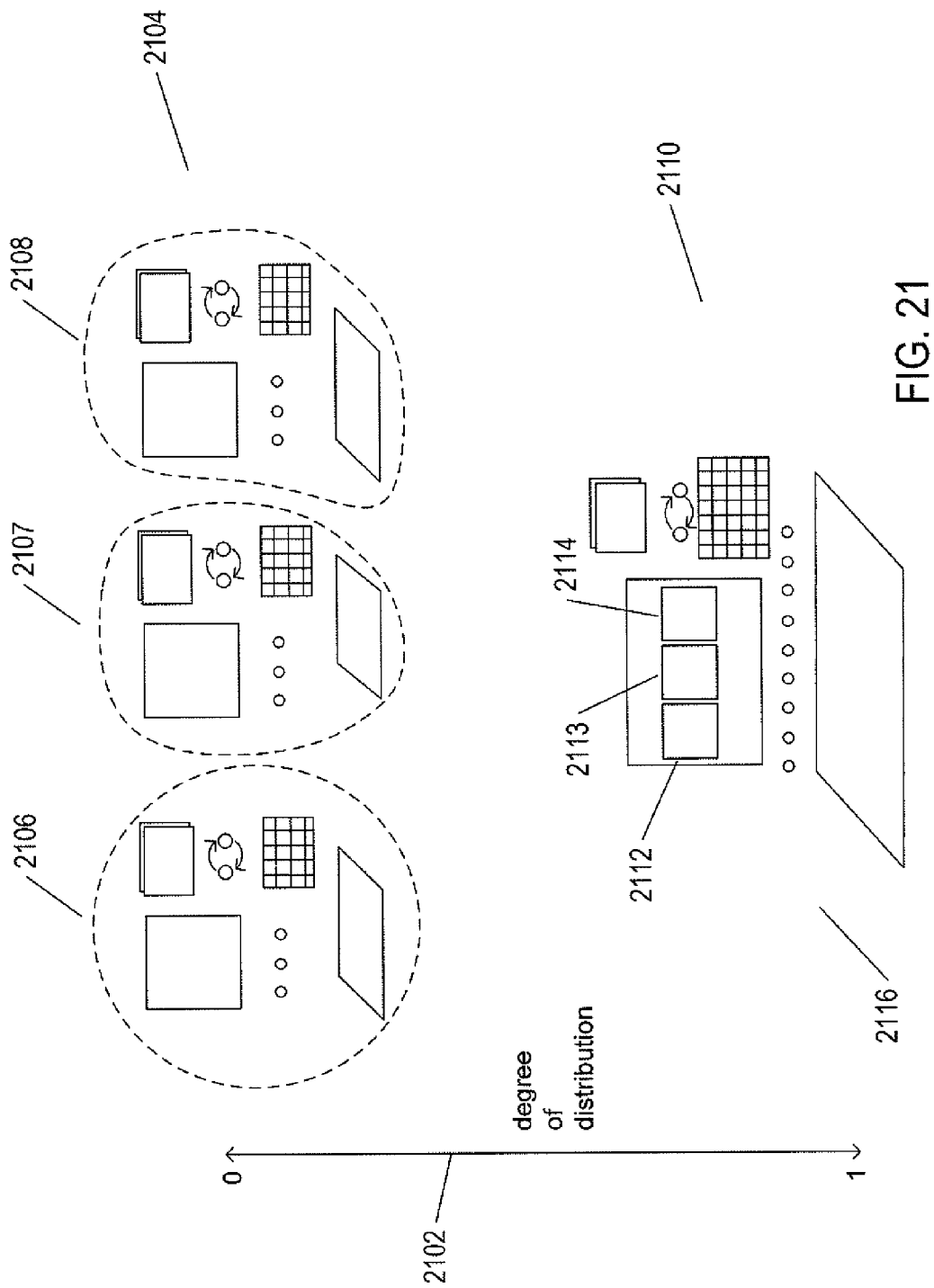
FIG. 21 illustrates varying degrees of distribution of intelligent control with respect to multiple intelligent controllers within an environment.

FIG. 21 illustrates varying degrees of distribution of intelligent control with respect to multiple intelligent controllers within an environment. The degree of distribution is indicated by vertical axis 2102. At one extreme 2104, each intelligent controller 2106-2108 is a completely separate and distinct subcontroller, monitoring and controlling a distinct region within an overall environment. At the other extreme 2110, the three intelligent controllers 2112-2114 can be considered to be subcomponents of a distributed intelligent controller 2116, with all sensor data, electronically stored data, and other information processed in distributed fashion in order to monitor and control an environment. Many different intermediate rules of distribution between these two extremes may describe any particular level of distribution exhibited by multiple intelligent controllers of a distributed intelligent controller. For example, the intelligent controllers may be responsible for controlling different subregions, but may share sensor data, presence and/or absence determinations, and other data and inferences in order that each intelligent controller provides optimal or near-optimal control within the control domain associated with the intelligent controller within the context of the entire environment.

Figure 22A:
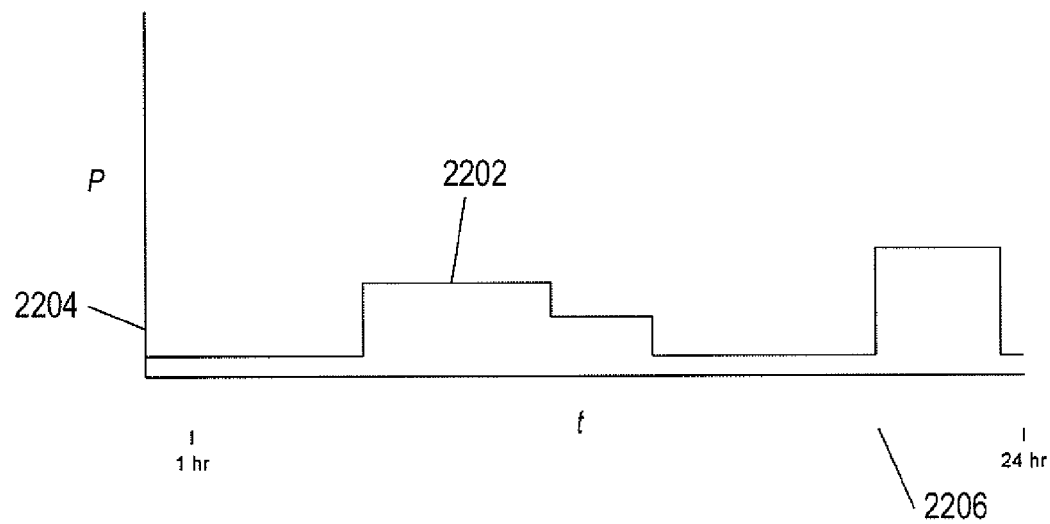
FIGS. 22A-C show three different types of control schedules.
Figure 22B:
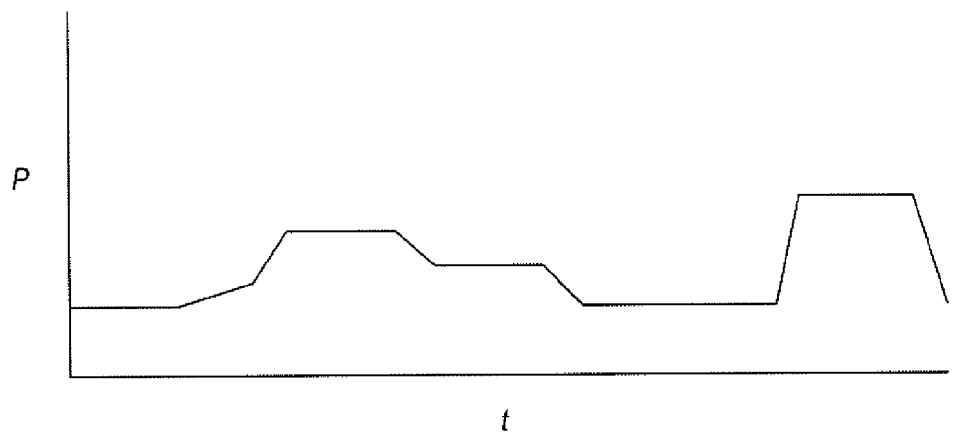
Figure 22C:
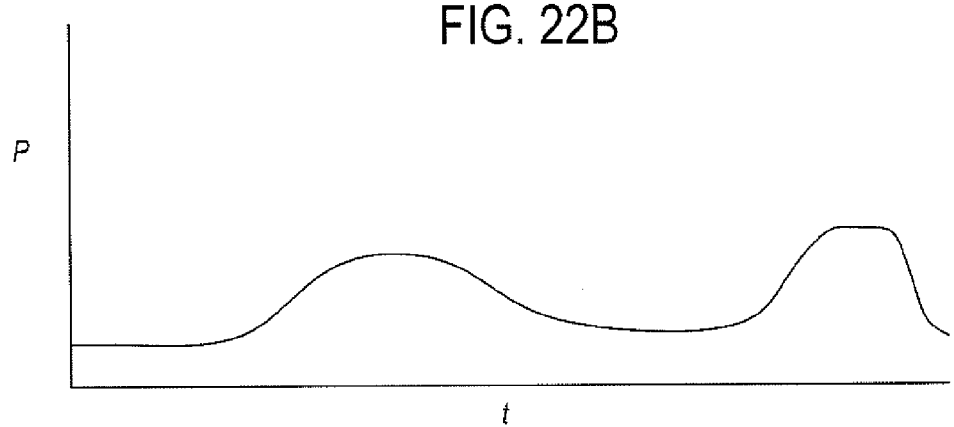

FIGS. 22A-C show three different types of control schedules. In FIG. 22A, the control schedule is a continuous curve 2202 representing a parameter value, plotted with respect to the vertical axis 2204, as a function of time, plotted with respect to the horizontal axis 2206. The continuous curve comprises only horizontal and vertical sections. Horizontal sections represent periods of time at which the parameter is desired to remain constant and vertical sections represent desired changes in the parameter value at particular points in time. This is a simple type of control schedule and is used, below, in various examples of automated control-schedule learning. However, automated control-schedule-learning methods can also learn more complex types of schedules. For example, FIG. 22B shows a control schedule that includes not only horizontal and vertical segments, but arbitrarily angled straight-line segments. Thus, a change in the parameter value may be specified, by such a control schedule, to occur at a given rate, rather than specified to occur instantaneously, as in the simple control schedule shown in FIG. 22A. Automated-control-schedule-learning methods may also accommodate smooth-continuous-curve-based control schedules, such as that shown in FIG. 22C. In general, the characterization and data encoding of smooth, continuous-curve-based control schedules, such as that shown in FIG. 22C, is more complex and includes a greater amount of stored data than the simpler control schedules shown in FIGS. 22B and 22A.

In the following discussion, it is generally assumed that a parameter value tends to relax towards lower values in the absence of system operation, such as when the parameter value is temperature and the controlled system is a heating unit. However, in other cases, the parameter value may relax toward higher values in the absence of system operation, such as when the parameter value is temperature and the controlled system is an air conditioner. The direction of relaxation often corresponds to the direction of lower resource or expenditure by the system. In still other cases, the direction of relaxation may depend on the environment or other external conditions, such as when the parameter value is temperature and the controlled system is an HVAC system including both heating and cooling functionality.

Turning to the control schedule shown in FIG. 22A, the continuous-curve-represented control schedule 2202 may be alternatively encoded as discrete setpoints corresponding to vertical segments, or edges, in the continuous curve. A continuous-curve control schedule is generally used, in the following discussion, to represent a stored control schedule either created by a user or remote entity via a schedule-creation interface provided by the intelligent controller or created by the intelligent controller based on already-existing control schedules, recorded immediate-control inputs, and/or recorded sensor data, or a combination of these types of information.

Figure 23A:
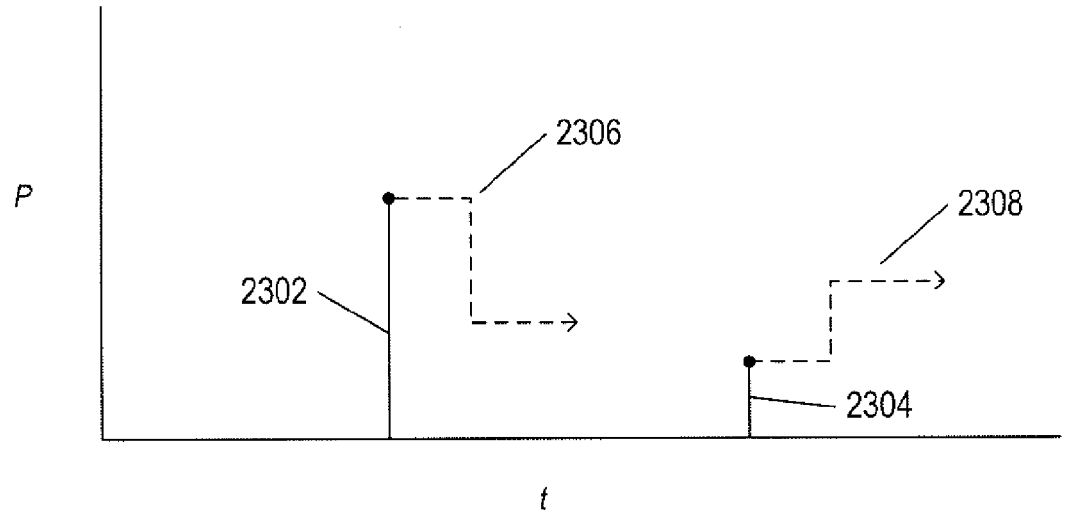
FIGS. 23A-G show representations of immediate-control inputs that may be received and executed by an intelligent controller, and then recorded and overlaid onto control schedules, such as those discussed above with reference to FIGS. 22A-C, as part of automated control-schedule learning.

Immediate-control inputs are also graphically represented in parameter-value versus time plots. FIGS. 23A-G show representations of immediate-control inputs that may be received and executed by an intelligent controller, and then recorded and overlaid onto control schedules, such as those discussed above with reference to FIGS. 22A-C, as part of automated control-schedule learning. An immediate-control input is represented graphically by a vertical line segment that ends in a small filled or shaded disk. FIG. 23A shows representations of two immediate-control inputs 2302 and 2304. An immediate-control input is essentially equivalent to an edge in a control schedule, such as that shown in FIG. 22A, that is input to an intelligent controller by a user or remote entity with the expectation that the input control will be immediately carried out by the intelligent controller, overriding any current control schedule specifying intelligent-controller operation. An immediate-control input is therefore a real-time setpoint input through a control-input interface to the intelligent controller.

Because an immediate-control input alters the current control schedule, an immediate-control input is generally associated with a subsequent, temporary control schedule, shown in FIG. 23A as dashed horizontal and vertical lines that form a temporary-control-schedule parameter vs. time curve extending forward in time from the immediate-control input. Temporary control schedules 2306 and 2308 are associated with immediate-control inputs 2302 and 2304, respectively, in FIG. 23A.

Figure 23B:
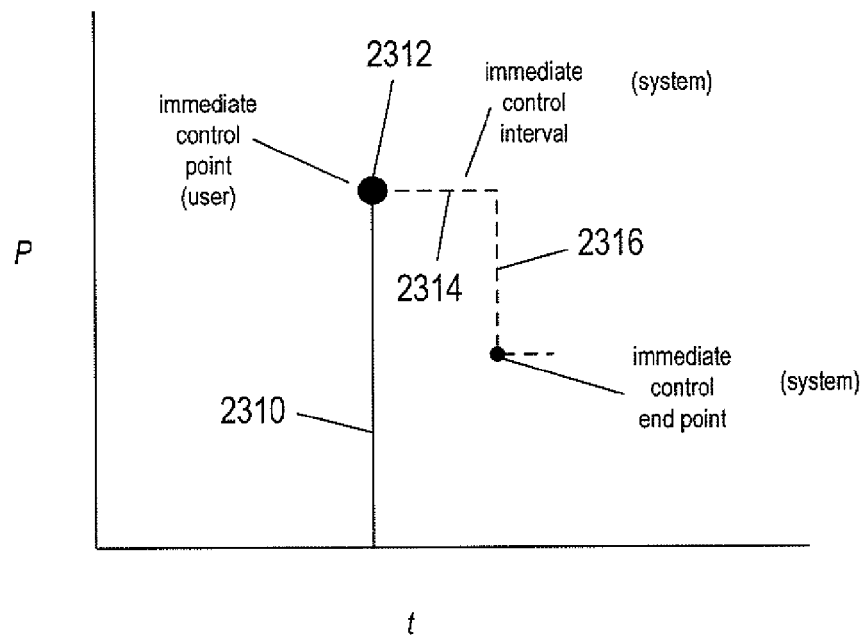

FIG. 23B illustrates an example of immediate-control input and associated temporary control schedule. The immediate-control input 2310 is essentially an input setpoint that overrides the current control schedule and directs the intelligent controller to control one or more controlled entities in order to achieve a parameter value equal to the vertical coordinate of the filled disk 2312 in the representation of the immediate-control input. Following the immediate-control input, a temporary constant-temperature control-schedule interval 2314 extends for a period of time following the immediate-control input, and the immediate-control input is then relaxed by a subsequent immediate-control-input endpoint, or subsequent setpoint 2316. The length of time for which the immediate-control input is maintained, in interval 2314, is a parameter of automated control-schedule learning. The direction and magnitude of the subsequent immediate-control-input endpoint setpoint 2316 represents one or more additional automated-control-schedule-learning parameters. Please note that an automated-control-schedule-learning parameter is an adjustable parameter that controls operation of automated control-schedule learning, and is different from the one or more parameter values plotted with respect to time that comprise control schedules. The parameter values plotted with respect to the vertical axis in the example control schedules to which the current discussion refers are related directly or indirectly to observables, including environmental conditions, machines states, and the like.

Figure 23C:
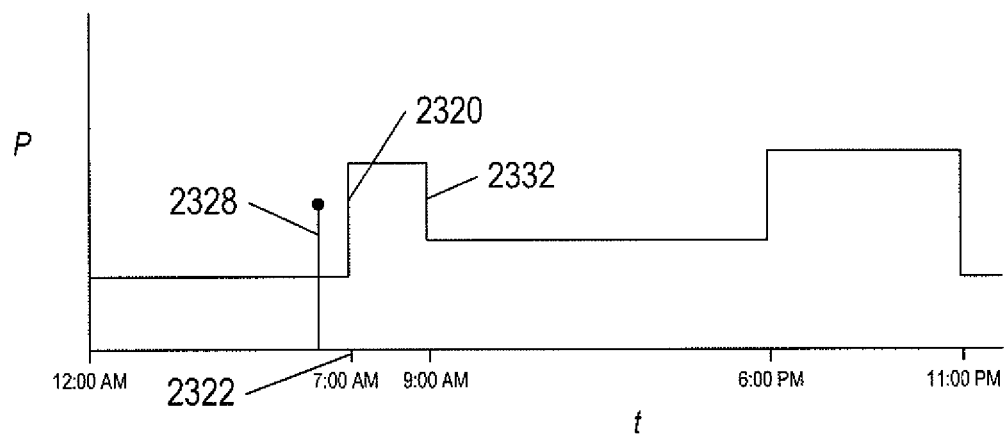
Figure 23D:
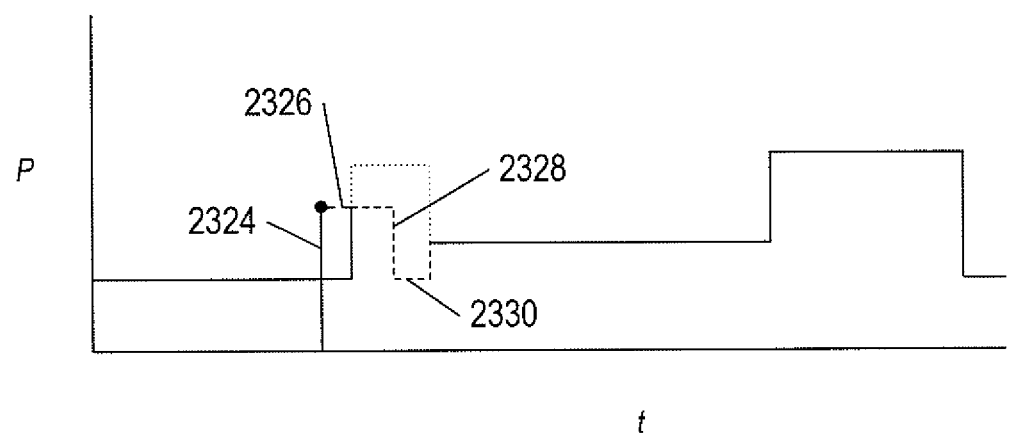

FIG. 23C shows an existing control schedule on which an immediate-control input is superimposed. The existing control schedule called for an increase in the parameter value P, represented by edge 2320, at 7:00 AM (2322 in FIG. 23C). The immediate-control input 2324 specifies an earlier parameter-value change of somewhat less magnitude. FIGS. 23D-G illustrate various subsequent temporary control schedules that may obtain, depending on various different implementations of intelligent-controller logic and/or current values of automated-control-schedule-learning parameter values. In FIGS. 23D-G, the temporary control schedule associated with an immediate-control input is shown with dashed line segments and that portion of the existing control schedule overridden by the immediate-control input is shown by dotted line segments. In one approach, shown in FIG. 23D, the desired parameter value indicated by the immediate-control input 2324 is maintained for a fixed period of time 2326 after which the temporary control schedule relaxes, as represented by edge 2328, to the parameter value that was specified by the control schedule at the point in time that the immediate-control input is carried out. This parameter value is maintained 2330 until the next scheduled setpoint, which corresponds to edge 2332 in FIG. 23C, at which point the intelligent controller resumes control according to the control schedule.

Figure 23E:
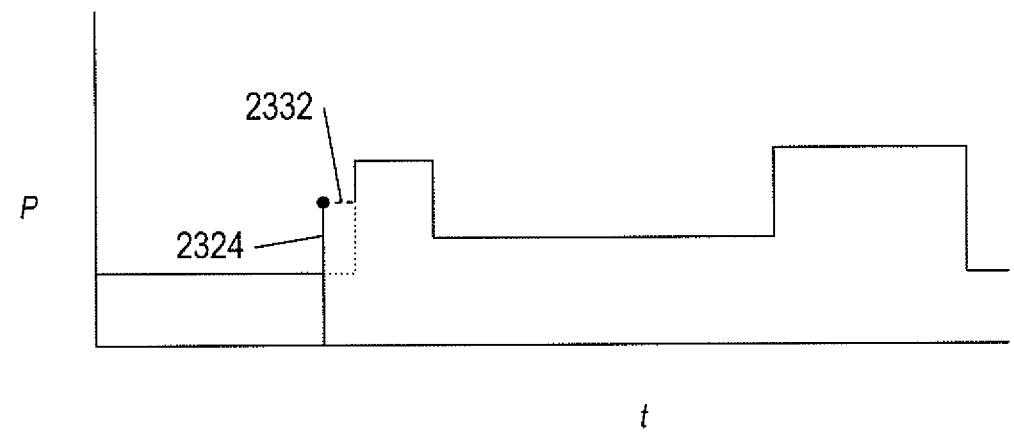

In an alternative approach shown in FIG. 23E, the parameter value specified by the immediate-control input 2324 is maintained 2332 until a next scheduled setpoint is reached, in this case the setpoint corresponding to edge 2320 in the control schedule shown in FIG. 23C. At the next setpoint, the intelligent controller resumes control according to the existing control schedule. This approach is desired by many users, who expect manually entered setpoints to remain in force until a scheduled setpoint change.

Figure 23F:
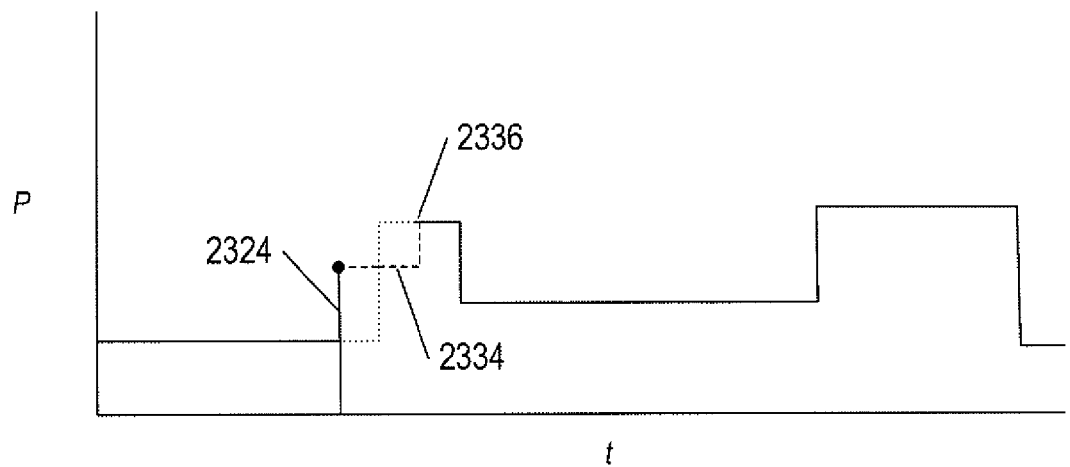

In a different approach, shown in FIG. 23F, the parameter value specified by the immediate-control input 2324 is maintained by the intelligent controller for a fixed period of time 2334, following which the parameter value that would have been specified by the existing control schedule at that point in time is resumed 2336.

Figure 23G:
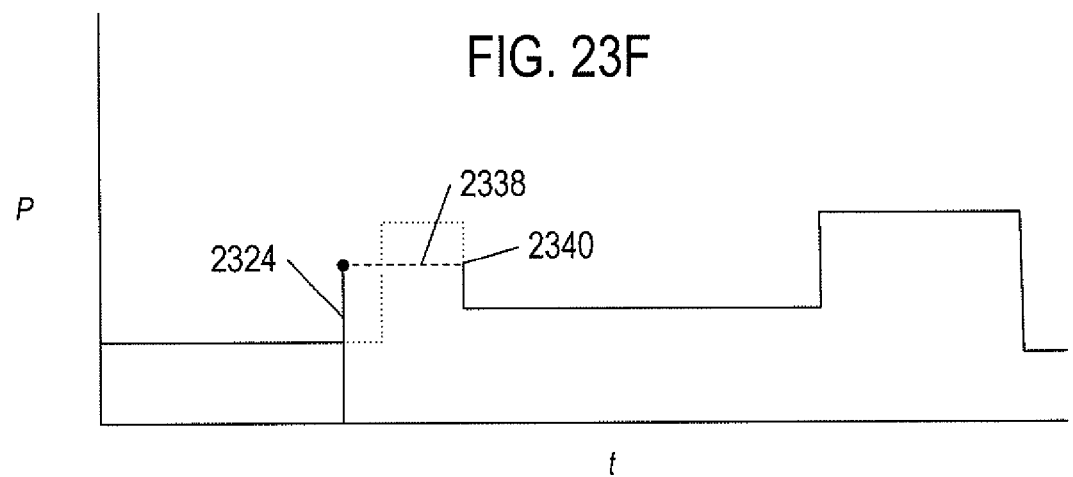

In the approach shown in FIG. 23G, the parameter value specified by the immediate-control input 2324 is maintained 2338 until a setpoint with opposite direction from the immediate-control input is reached, at which the existing control schedule is resumed 2340. In still alternative approaches, the immediate-control input may be relaxed further, to a lowest-reasonable level, in order to attempt to optimize system operation with respect to resource and/or energy expenditure. In these approaches, generally used during aggressive learning, a user is compelled to positively select parameter values greater than, or less than, a parameter value associated with a minimal or low rate of energy or resource usage.

In one example implementation of automated control-schedule learning, an intelligent controller monitors immediate-control inputs and schedule changes over the course of a monitoring period, generally coinciding with the time span of a control schedule or subschedule, while controlling one or more entities according to an existing control schedule except as overridden by immediate-control inputs and input schedule changes. At the end of the monitoring period, the recorded data is superimposed over the existing control schedule and a new provisional schedule is generated by combining features of the existing control schedule and schedule changes and immediate-control inputs. Following various types of resolution, the new provisional schedule is promoted to the existing control schedule for future time intervals for which the existing control schedule is intended to control system operation.

FIGS. 24A-D illustrate no-presence events and their effects on control schedules. FIG. 24 shows a simple control schedule using the same illustration conventions employed in FIGS. 22A and 23A-G. This schedule includes a relatively low-parameter-value initial time period 2402, a first setpoint 2404, following which the schedule includes a relatively high-parameter-value interval 2406, followed by a second setpoint 2408 that lowers the parameter value back to a relatively low parameter value for a subsequent time period 2410.

In FIG. 24B, an intelligent controller, operating according to the control schedule shown in FIG. 24A, determines at time $t_1$ 2412, that a human being is present in the controlled environment. This determination constitutes a no-presence event 2416 represented by a vertical dashed line 2414 and a disk with a half-shaded portion 2418 indicating presence and an unshaded portion 2420 indicating no presence. As a result of the no-presence event, the intelligent controller adjusts the control schedule by lowering the desired parameter value back to a relatively low value 2422. For example, in a home-heating context, the parameter value may correspond to temperature and the fact that there are no occupants at time $t_1$ justifies lowering the temperature setting in order to save energy.

In FIG. 24C, at time $t_2$ 2424, a user enters an immediate-control input 2426 to reset the temperature via the immediate-control interface of the intelligent controller. Thus, the user is now present. Because the elapsed time period 2428 between the no-presence event 2416 and the immediate-control input 2426 is, in this case, below a threshold value, the immediate-control input represents a corrective presence event, designated by a disk 2430 with an unshaded portion 2432 preceding a shaded portion 2434, indicating a transition from no presence to presence, and an overlying bar 2436 indicating that there is a strong probability that a recent, preceding no-presence event was incorrectly established by the intelligent controller. As an example, an occupant of a residence may have taken a short nap prior to time $t_1$, as a result of which none of the sensors of the intelligent controller detected the occupant's presence and the presence-related event 2416 was generated. Upon awakening, the occupant noticed a temperature decrease, and adjusted the temperature setting via the immediate-control interface.

Figure 24D:
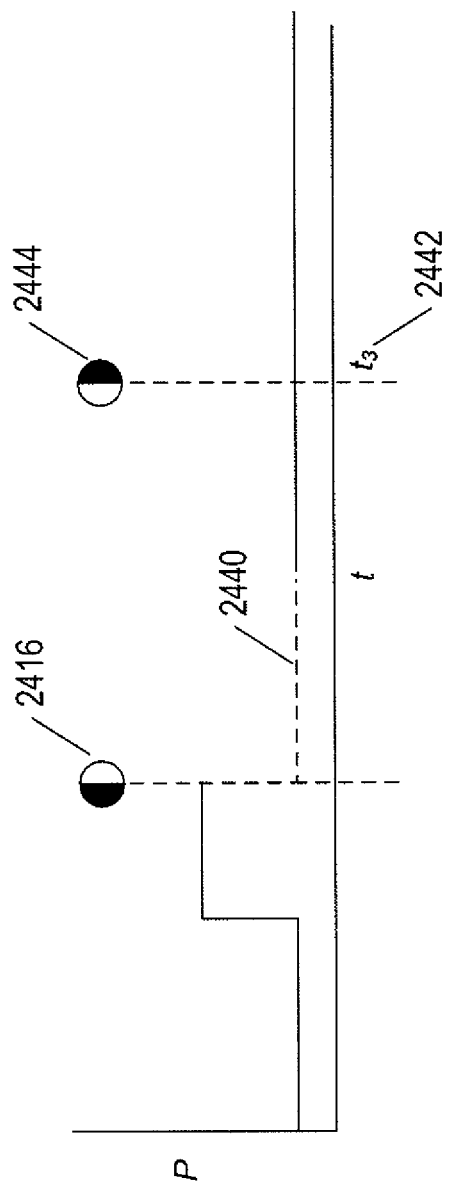

FIG. 24D shows another situation with respect to the control schedule illustrated in FIG. 24A. In FIG. 24D, following the initial no-presence event 2416, the schedule was accordingly adjusted by the intelligent controller 2440 and no presence event occurred during the period of time for which the schedule is adjusted. Later, at time $t_3$ 2442, the intelligent controller determined a human being is now present in the controlled environment, resulting in the presence event 2444. However, the intelligent controller continues to operate according to the control schedule, in this example, because there is no indication that the occupant intended to override the control schedule. In alternative implementations, the intelligent controller may adjust the control schedule for presence events rather than no-presence events or for both presence events and no-presence events. In many cases, various schedule adjustments with respect to presence events and no-presence events can be specified through a scheduling interface or other input interface of the intelligent controller. Alternatively, the schedule adjustments may be learned, over time, by the intelligent controller by patterns of presence and absence and patterns of immediate-control inputs and schedule adjustments.

Figure 25:
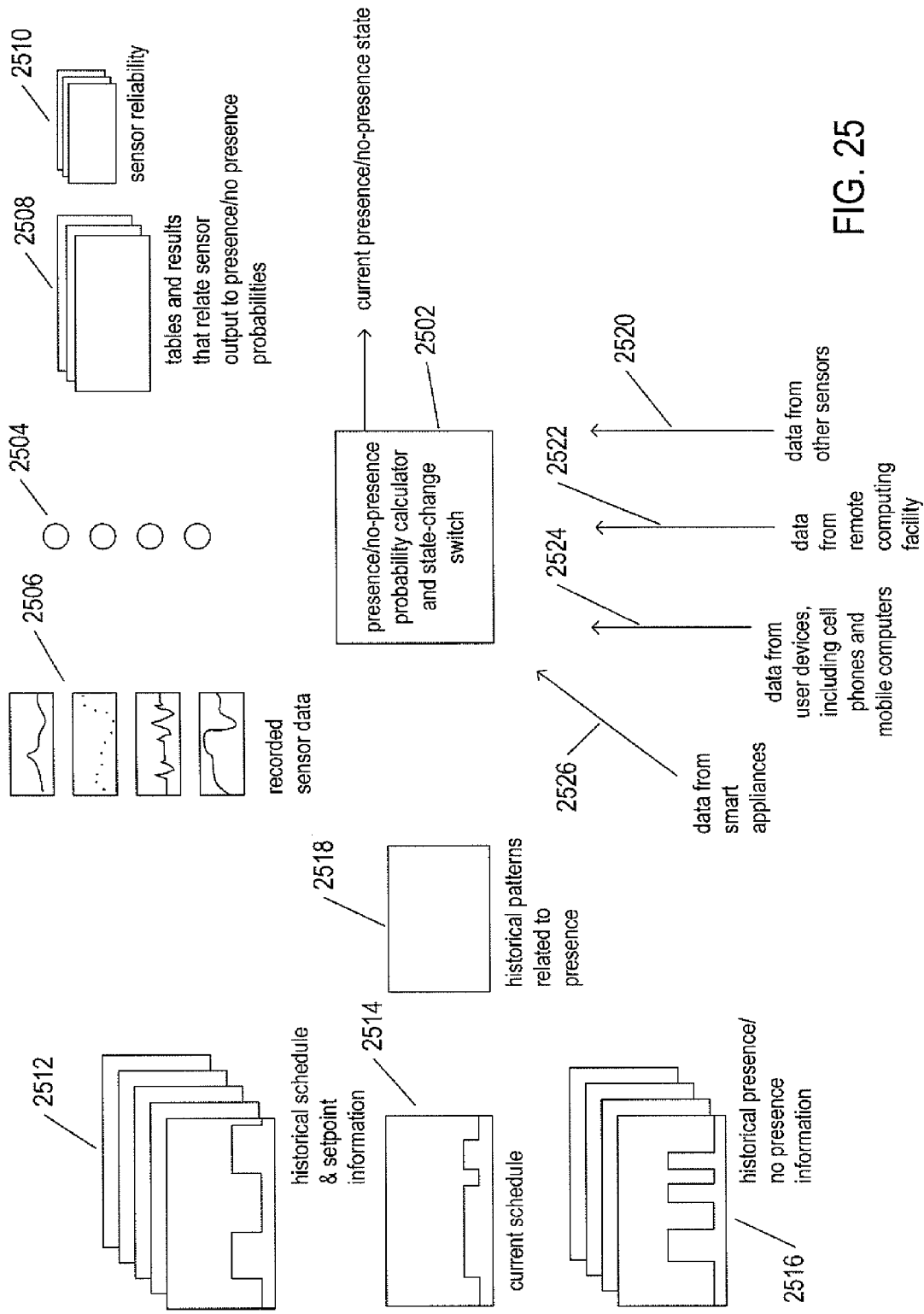
FIG. 25 illustrates many different types of information that may be used by an intelligent controller in order to determine the presence and/or absence of one or more human beings within a controlled environment or a region or subvolume of the controlled environment.

FIG. 25 illustrates many different types of information that may be used by an intelligent controller in order to determine the presence and/or absence of one or more human beings within a controlled environment or a region or subvolume of the controlled environment. As discussed above, the intelligent controller includes a continuous or intermittent presence/no-presence probability-calculating subsystem as well as a state-change switch 2502 that implements the state transitions discussed with reference to FIG. 17A. The state-change switch changes a state variable within the intelligent controller between two or more presence-related states, as discussed above. The transitions between presence-related states are initiated based on a current presence-probability map or scalar value and various threshold values. The presence-probability scalar or map is compiled by the intelligent controller based on many different potential types of information. The various types of information may include direct sensor output 2504 as well as recorded output from sensors 2506 over one or more preceding time intervals. The information may additionally include tables, expressions, or other data that relate sensor output values to presence/no-presence probabilities associated with the sensor outputs 2508. In addition, the intelligent controller may maintain confidence or reliability information 2510 for one or more sensors. The sensor-confidence values vary with time and also with respect to outputs of other sensors, environmental conditions, parameters, and characteristics as well as other types of locally or remotely stored information. Information also may include historical control-schedule and setpoint information 2512 as well as a current control schedule 2514 according to which the intelligent controller is currently operating. Information may additionally include historical presence/no-presence information, such as presence/no-presence determinations previously made by the intelligent controller or other intelligent controllers and remote computer systems with which the intelligent controller communicates 2516. In addition, the intelligent controller may maintain the results of various presence-pattern-determining analyses 2518. Finally, the information used to compile presence-probability maps and scalar values may include information obtained from remote entities, including data from remote sensors 2520 within remote intelligent controllers, data from a remote computing facility 2522, data from various user devices, including cell phones and mobile phones 2524, and data from various smart appliances within the controlled environment 2526. The types of information used by an intelligent controller compile presence-probability maps and scalar values that may include many additional types of information in different implementations and contexts. As one example, an intelligent controller may provide a presence-indication interface allowing users to explicitly indicate their presence and absence with respect to the controlled environment, as one example.

Figure 26A:
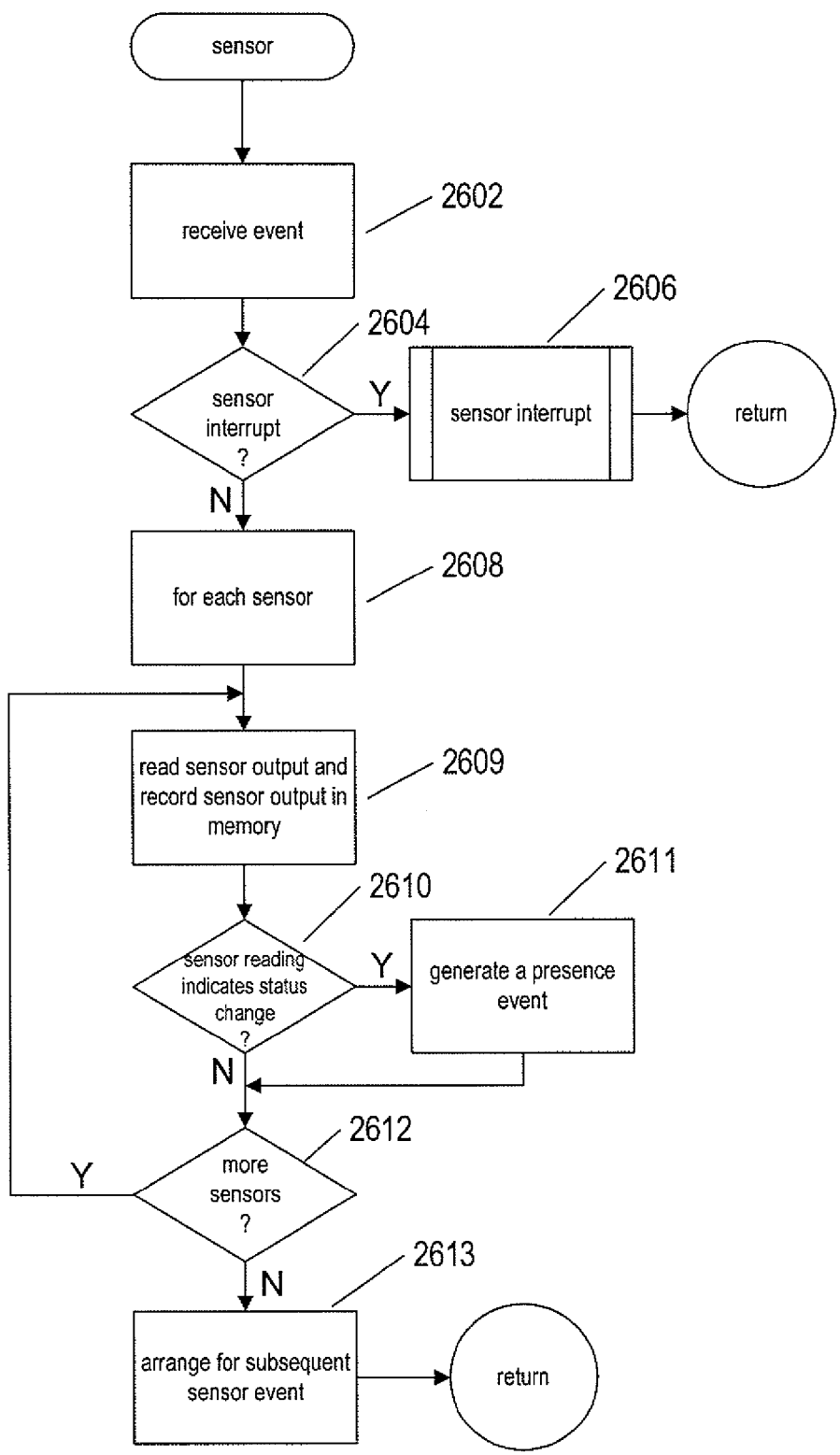

FIGS. 26A-28B provide control-flow diagrams for the sensor and presence routines called in step 1618 and 1622, respectively, of the control-flow diagram provided in FIG. 16. FIG. 26A provides a control-flow diagram for the sensor routine. In step 2602, the sensor routine receives an indication of the sensor event detected in the intelligent-controller event loop. In the case that the event is a sensor interrupt, as determined in step 2604, a routine sensor interrupt, described below, is invoked in step 2606. Otherwise, in one implementation, the triggering event was a timer expiration or other indication that the intelligent controller needs to poll the various sensors with which the intelligent controller monitors the controlled environment. This polling occurs in the for-loop of steps 2608-2612. The for-loop of steps 2608-2614 iterates for each of the sensors. In step 2609, the current sensor output is read and recorded in memory by the intelligent controller. In step 2610, the intelligent controller determines whether or not the sensor reading obtained in step 2609 may likely indicate a presence-status change. If so, then, in step 2611, the intelligent controller generates a presence event so that the intelligent controller will undertake the next presence-determination cycle. Following completion of the for-loop of steps 2608-2612 the intelligent controller arranges for a subsequent sensor event by resetting a timer, arranging for subsequent interrupt, or by some other means.

Figure 26B:
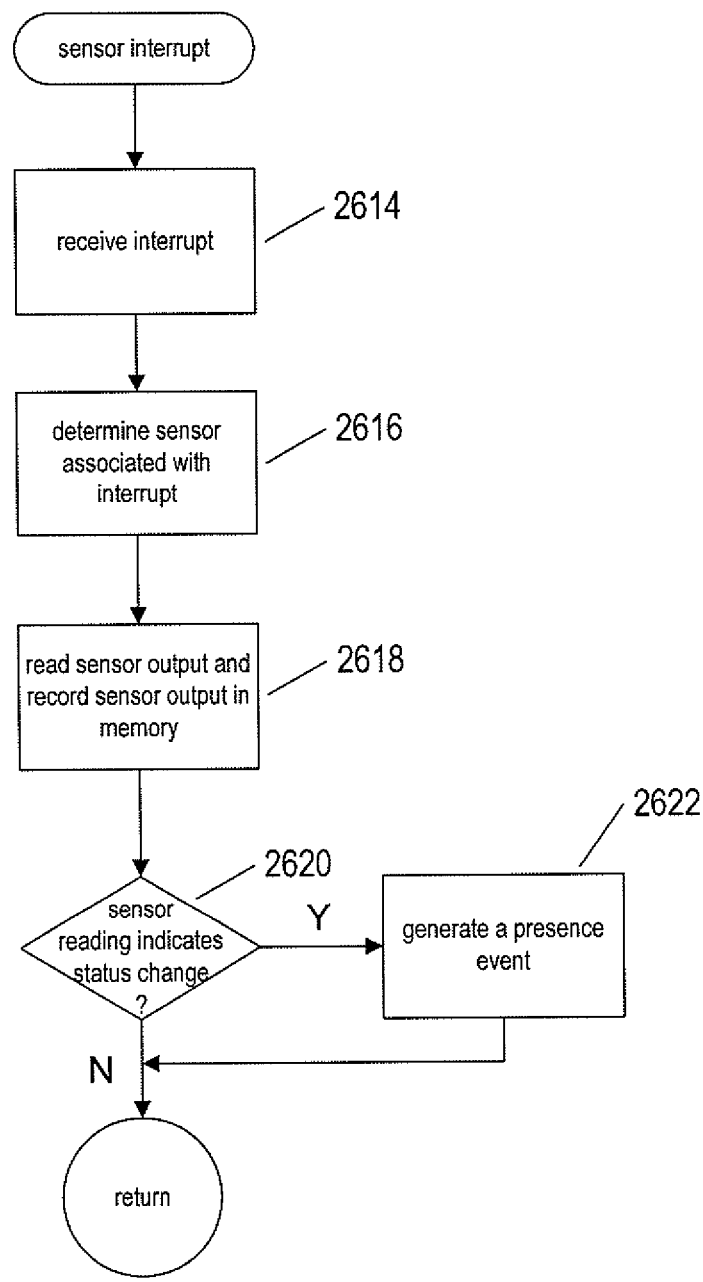

FIG. 26B shows the sensor-input routine called in step 2606 of FIG. 26A. In step 2614, the interrupt is received by the intelligent controller. In step 2616, the intelligent controller determines the particular sensor associated with the interrupt and, in step 2618, reads the current sensor output and records the sensor output in memory. When the recorded sensor output likely indicates that the presence-related state has changed, as determined in step 2620, then the intelligent controller generates a presence event, in step 2622, to initiate a next presence-determination cycle.

Figure 27A:
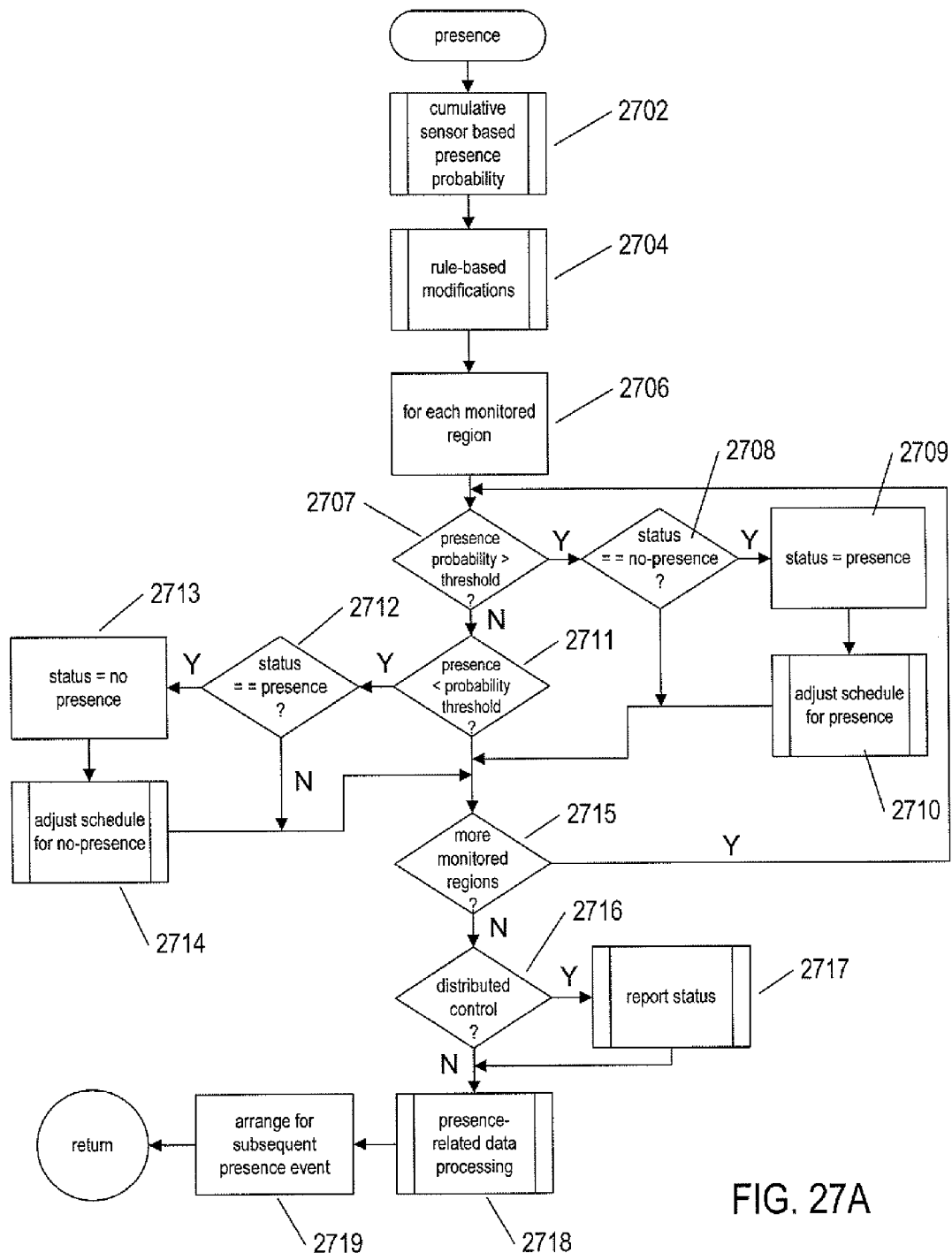
FIG. 27A provides a control-flow diagram for the presence routine called in step 1622 of the control-flow diagram.

FIG. 27A provides a control-flow diagram for the presence routine called in step 1622 of the control-flow diagram provided in FIG. 16. In step 2702, the intelligent controller computes a cumulative sensor-based presence probability for a controlled environment or for regions within the controlled environment. The intelligent controller may carry out this computation by computing a probability for each successively considered sensor output and maintaining a running average or continuously adjusted cumulative probability. For example, the presence probability for region r may be computed as a running average of individual probabilities p computed from the output of a number of individual sensors, indexed by variable i, by repeatedly calling a running-average routine f(P(r),p,i):

$$f(P(r), p, i) = \frac{(i-1)P(r) + p}{i}.$$

Alternatively, setting P(r) has some initial value, such as 0, the cumulative probability of presence P(r) can be adjusted for each sensor output by:

$f(P(r),p)=$,if $p>P(r)$,return $P(r)+(p-P(r))/k;$ else if $p<P(r)$,return $P(r)-(P(r)-p)/k;$ else return $P(r)$ where k is a predetermined constant.

Once a cumulative sensor-based probability of presence is computed, in step 2702, the intelligent controller may apply various rules to this sensor-based presence probability in order to adjust the presence probability according to rule-based considerations, in step 2704. In one approach, the cumulative presence probability P(r) is adjusted by each applicable rule as follows:

$f(P(r),\text{rule})=P(r)\cdot\text{evaluate(rule)}.$

Many different rules and types of rules can be used. Four hypothetical, example rules are provided below, as examples:
  rule 1: if $P(r)<T_1$ AND ∀ user devices with GPS,
    distance (location (user device), r)$>T_2$, return 0.5;
    else return 1.0
  rule 2: if ∀ sensors, P(r) computed for sensor data $>T_2$,
    return 1.3;
    else return 1.0
  rule 3: if ∃ remote sensor reporting P (s) AND overlap
    (s,r)$>T_3$
    if $P(s)>T_4$, return 1.5;
    else if $P(s)<T_5$, return 0.6;
    else return 1.0
  rule 4: if similarity (current schedule, schedule pattern)$>T_6$
    AND number of no-presence-to-presence events during
    adjusted schedule segments associated with schedule
    pattern $>T_4$·number of schedule pattern occurrences,
    return 0.4;
    else return 1.0 where $T_x$ are various numeric threshold values. Rules provide a convenient mechanism for introducing heuristics. For example, the occurrence of corrective events may be stored in memory, and rules may be applied to adjust a cumulative sensor-based probability of presence based on the number and types of corrective events that are associated with a window of time centered around the current time. In other cases, the a cumulative sensor-based probability of presence may be adjusted, regardless of the current time, based on the number and types of corrective events that have occurred within a preceding amount of time. Such rules carry out a form of punishment of automatic transition to an Away state and corresponding schedule adjustments, effectively increasing the time from detection of absence of presence to the time when schedule adjustments based on non-presence are made. In certain cases, rules may be used to enforce a minimum passage of time before a schedule adjustment based on non-occupancy can be made. For example, in certain implementation, regardless of the cumulative sensor-based probability of presence, such schedule adjustments cannot be made until at least 10 minutes, in certain implementations, or 20 or 30 minutes in alternative implementations, after the cumulative sensor-based probability of presence threshold for a transition to an Away state is reached. In certain implementation, such rules can be used to disable transitions to an Away state altogether, when the frequency of occurrence of corrective events passes a threshold frequency value. As discussed elsewhere, corrective events may be weighted depending on type and on other considerations, and these weights are factored into rules, such as those discussed above. Weights can be used, in certain implementations, to significantly increase the delay between when the cumulative sensor-based probability of presence threshold for a transition to an Away state is first reached and when the transition is actually allowed to occur.

Next, in the for-loop of steps 2706-2715, the intelligent controller determines the current presence status for each region monitored for presence of human beings by the intelligent controller. When the computed presence of probability for a currently considered region is greater than a first threshold value, as determined in step 2707, and when the current status of the region is no-presence, as determined in step 2708, then the status is changed to presence, in step 2709, and the control schedule accordingly adjusted, in step 2710. When the presence probability is less than a second threshold value, as determined in step 2711, and when the current status of the region is presence, as determined in step 2712, then the status of the region is changed to no presence, in step 2713 and the control schedule is accordingly adjusted in step 2714. Upon completion of the for-loop of steps 2706-2715, the intelligent controller determines whether or not it is currently participating in a distributed control of one or more regions. When so, the intelligent controller reports the current presence status, in step 2717, to one or more remote intelligent controllers and/or remote computer systems. Next, in step 2718, the intelligent controller carries out any additional presence-related data processing. Presence-related data processing may involve updating various types of electronically stored information, both locally and remotely, including presence-status histories, carrying out presence-related pattern matching, re-evaluating and adjusting sensor-confidence values, re-evaluating rules used for presence determination, and other such data-processing tasks. Finally, in step 2719, the intelligent controller arranges for a subsequent presence event, such as resetting a timer or arranging for a presence-event-associated interrupt to occur at a point in the future.

Figure 27B:
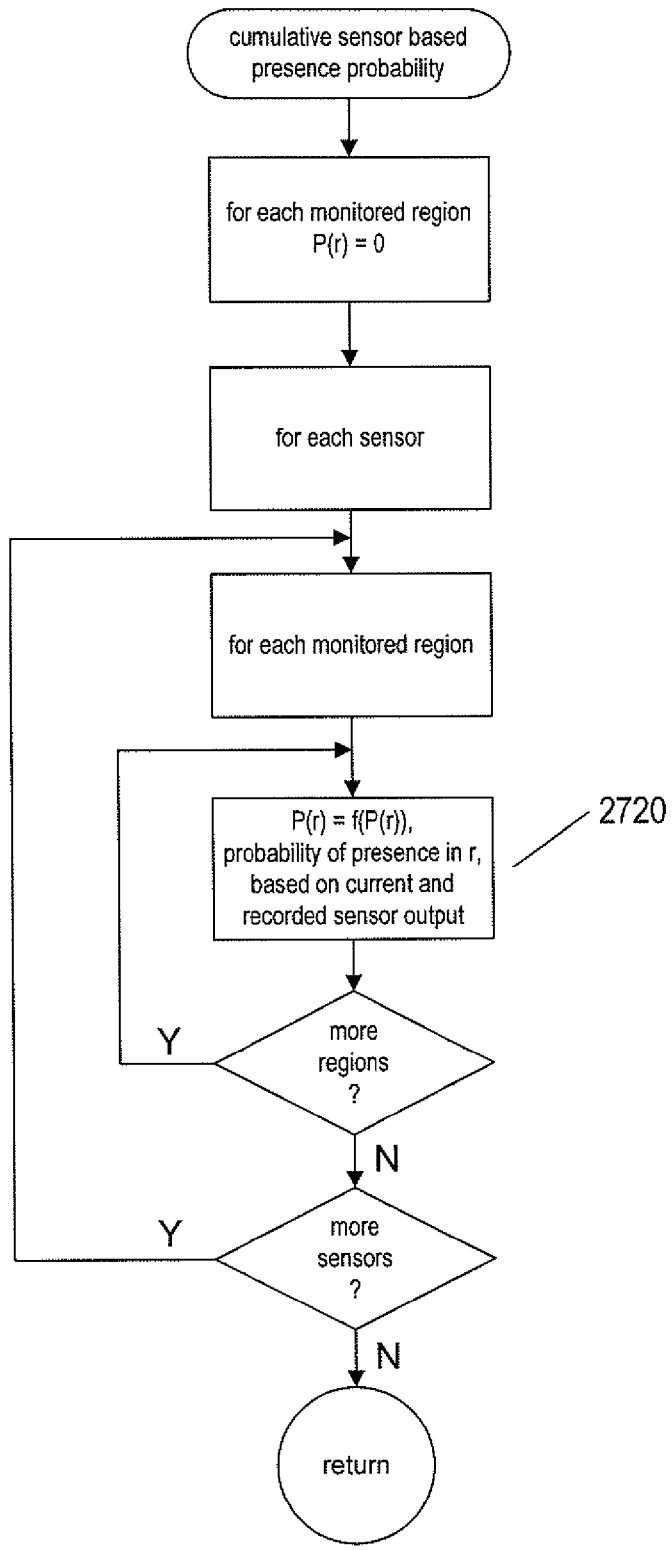
FIG. 27B provides a control-flow diagram of the routine that carries out cumulative sensor-based presence-probability computation invoked in step 2702 of the control-flow diagram provided in FIG. 27A.
Figure 27C:
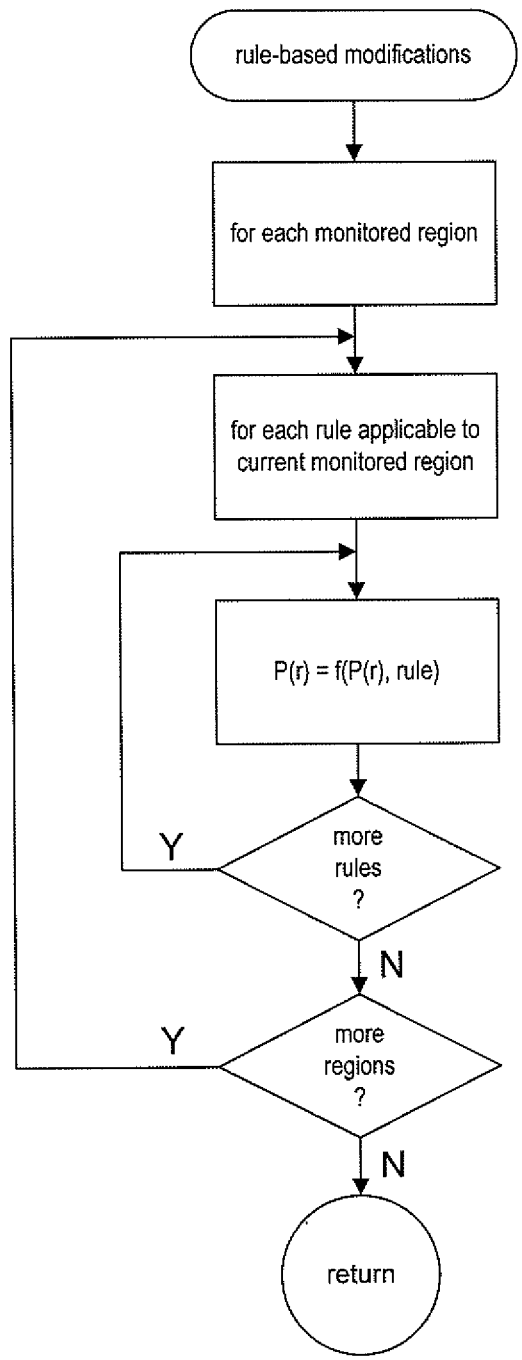
FIG. 27C provides a control-flow diagram for the rule-based-modifications routines called in step 2704 of the control-flow diagram provided in FIG. 27A.

FIG. 27B provides a control-flow diagram of the routine that carries out cumulative sensor-based presence-probability computation invoked in step 2702 of the control-flow diagram provided in FIG. 27A. This routine considers each monitored region and, for each monitored region, considers each sensor output to calculate the cumulative presence probability for the region, in step 2720, as described above. Similarly, FIG. 27C provides a control-flow diagram for the rule-based-modifications routines called in step 2704 of the control-flow diagram provided in FIG. 27A.

Figure 28A:
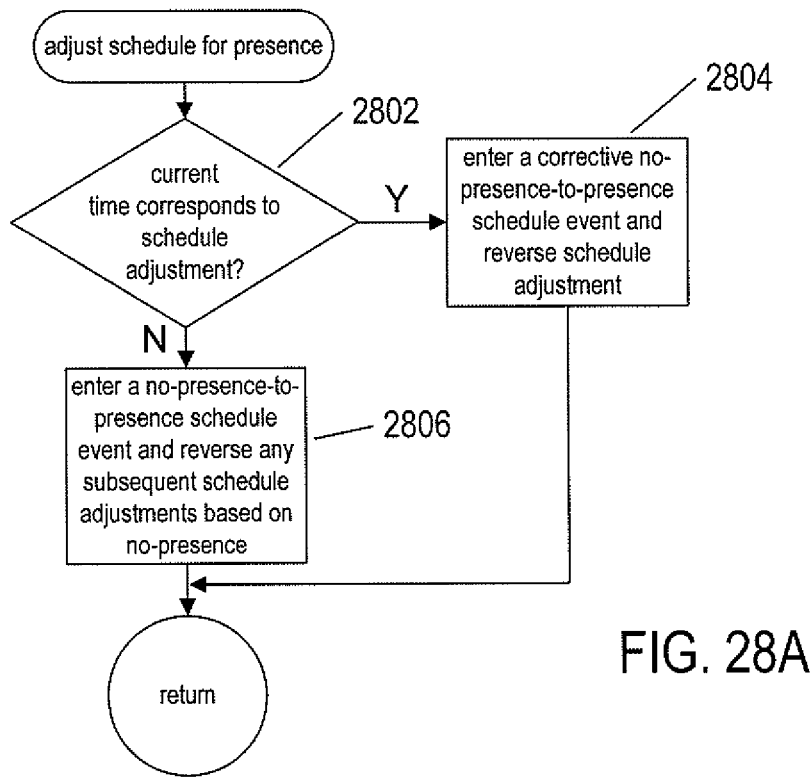
Figure 28B:
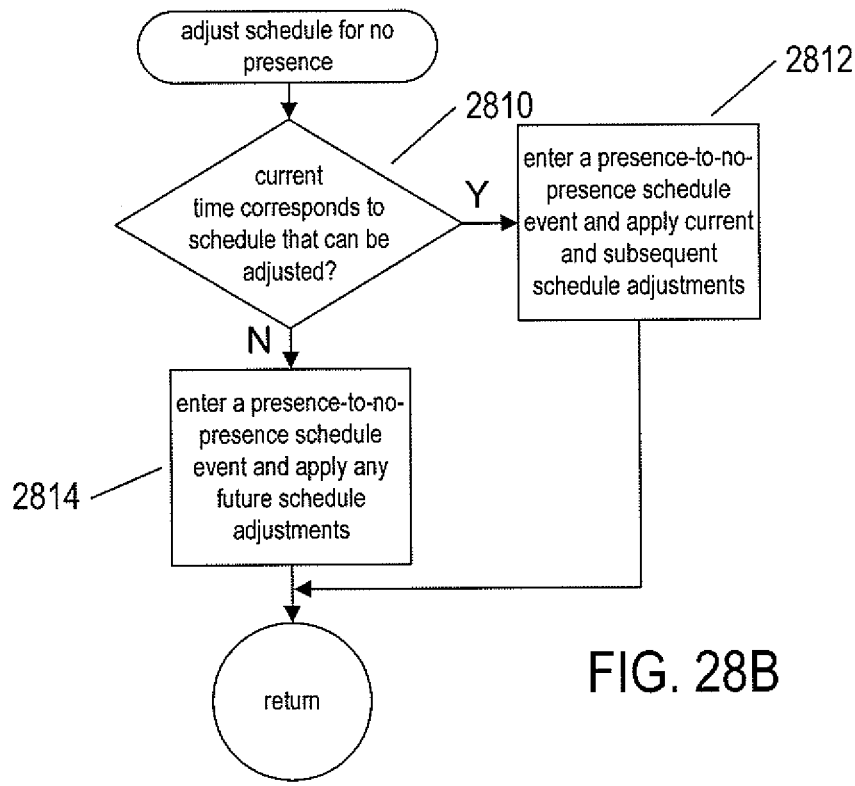

FIGS. 28A-B illustrate example implementations of the schedule-adjustment routines called in steps 2710 and 2714 of the control-flow diagram provided in FIG. 27A. FIG. 28A shows an implementation for the adjustment of a control schedule for a presence event. When the current time corresponds to a previously made schedule adjustment for a no-presence event, as determined in step 2802, a corrective presence event is recorded with respect to the control schedule and the previously made schedule adjustment is reversed, in step 2804. Otherwise, in step 2806, the intelligent controller enters a no-presence-to-presence event into the control schedule and reverses subsequent schedule adjustments based on the recent no-presence event. It should be noted that corrective presence events, such as those associated with the control schedule in step 2804, may be considered in various rules for adjusting sensor confidences and adjusting rules used to compute presence probabilities. Corrective presence events are indications of likely erroneous no-presence events generated during presence-probability computations, and thus serve as valuable opportunities for adjusting sensor confidences and probability-adjustment rules in order to decrease the likelihood of subsequent erroneous no-presence events. Additionally, corrective-presence events may be differentiated and weighted according to different types of corrective-presence events. For example, a corrective event that occurs within a threshold time of an auto-away schedule adjustment may be weighted twice as significantly as a corrective event that occurs after the threshold time. Corrective events that occur quickly, particularly corrective events associated with manually entered setpoint changes, provide strong indication not only of an erroneous transition to an Away state, but that the transition was perceived with annoyance by a user or resident. In certain implementations, an annoyance-associated corrective event is weighted twice as much as other corrective events. Similarly, corrective events associated with sensor detection of a user's presence may be weighted differently than corrective events associated with immediate-control inputs. As one example, the weight for sensor-detection-related corrective events may be significantly less than the weight for corrective events associated with immediate-control inputs. The weighting associated with corrective events may be decreased, over time. In one implementation, the weight associated with a corrective event may decrease by 1% per day, as one example. The rate of decrease may also vary with the type of corrective event. In general, the weight associated with an annoyance-associated corrective event may decrease less quickly, or even not decrease, in certain implementations. In certain implementations, the intelligent controller provides a user interface that allows a user to indicate whether or not the user is currently within the controlled environment, and such active indications of occupancy state can also be associated with corrective events and differential weighting.

FIG. 28B shows an example limitation of a routine for adjusting a control schedule for a status change to a no-presence status. When the current time corresponds to an interval in the control schedule that can or should be adjusted in accordance with determination of no human presence, as determined in step 3810, then a presence-to-no-presence event is associated with the control schedule and the corresponding control-schedule adjustment or adjustments are applied in step 2812. Otherwise, any subsequent control-schedule adjustments that should be applied to the control schedule are applied in step 2814.

As discussed above, in other contexts, the reversal of schedule adjustments may be triggered by occurrence of no-presence events and schedule adjustments may be made as a result of the occurrence of presence events. In other contexts, the reversal of schedule adjustments may be triggered by occurrence of both presence and no-presence events and schedule adjustments may be made as a result of the occurrence of both presence events and no-presence events.

FIGS. 29A-D illustrate various types of presence-related schedule adjustments. FIG. 29A shows an example control schedule. FIG. 29B illustrates schedule adjustments that may be undertaken, in certain implementations, in response to a presence-to-no-presence event 2902 that occurs at a first point in time $t_1$ 2904. In this case, the schedule is generally adjusted to a low-parameter value, such as in intervals 2906-2908, but scheduled setpoints that would raise the parameter value 2910-2912 are preserved in the control schedule. The parameter-value change of these setpoints is allowed to continue for a period of time 2914, following which no-presence schedule adjustments, such as no-presence schedule adjustment 2907, ensue. This period of time may decrease, over time, as a continuing lack of presence further decreases the probability of presence estimations, and no-presence thresholds are more quickly reached following setpoint changes. In addition, explicit rules may be used to decrease the time period according to a time-period-decrease schedule, such as a linear decrease schedule. In the case of a recurring schedule, setpoint 2916 is also preserved, by the presence-to-no-presence event 2902. As shown in FIG. 29C, in certain implementations, when no presence has been detected for the remaining control-schedule cycle and some subsequent period, then the control schedule may be more severely adjusted 2920, removing even scheduled setpoints that would otherwise increase the parameter value. In certain implementations, the control-schedule adjustments illustrated in FIG. 29B can be carried out by intelligent controllers in a non-presence state and the more severe adjustments illustrated in FIG. 29C may be carried out in a long-term no-presence state, as discussed above with reference to FIG. 19. Many alternative types of schedule adjustments for both presence events and no-presence events may be undertaken in different contexts and implementations. FIG. 29D illustrates the reversal of schedule adjustments upon a corrective no-presence-to-presence event. Following a no-presence event 2902, the schedule is adjusted downward 2922, but the occurrence of a corrective no-presence-to-presence event 29 reverses all of the schedule adjustments, such as those shown in FIG. 29B, made following the no-presence event 2902.

Figure 30A:
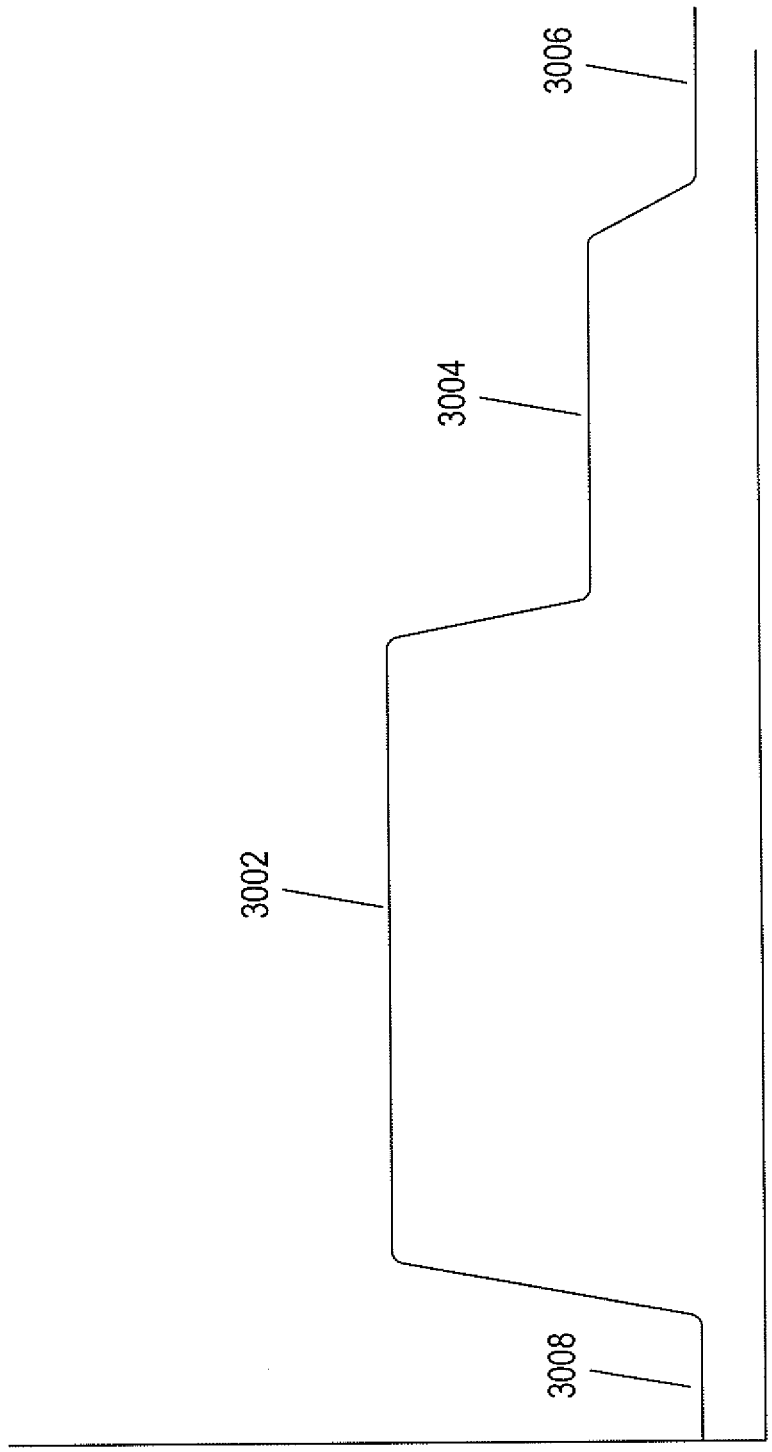

FIGS. 30A-C illustrate certain of the various considerations in computing a presence probability from the output of a sensor. FIG. 30A shows a plot of sensor output versus time over a control-schedule interval, such as a 24-hour period. As an example, the sensor may fully or partially reflect ambient light levels, so that sensor output is high during daylight hours 3002, falls to lower, internal-lighting-related levels in the evening hours 3004, and falls to quite low levels during the late evenings and early mornings 3006 and 3008. FIG. 30B illustrates actual sensor output for a particular 24-hour period aligned with presence-probability calculated from the sensor output in FIG. 30C. In general, the actual sensor output curve 3010 reflects the generic curve shown in FIG. 30A. However, there are noticeable departures from expected sensor-output values. For example, during a first time interval 3012, the sensor output dramatically decreases and increases over very short intervals. This may be correlated with changes in ambient light levels due to passing humans, and thus the probability of presence rapidly rises 3014 for the same time period. The presence probability may remain high for a particular interval 3016 and then may decay relatively rapidly. A slower depression in sensor output and subsequent elevation of sensor output 3018 may not be reflected in increased presence probabilities. For example, it may have been determined, by automated learning or application of presence-related rules, that a slow decrease and a subsequent slow increase in ambient light levels is generally not correlated with human presence, but more probably correlated with passing clouds, weather systems, or other environmental phenomena. During a second time interval 3020, additional rapid changes in ambient light level are observed 3022 with a corresponding rapid rise in presence probability 3024. However, a sharp, single change in ambient light level that occurs in a third time interval 3026 may not be associated with an increase in the probability of presence. This decrease may have occurred too closely to an expected decrease 3010 due to the normal daily cycle of light level, or it may have been found, in the past, that single sharp spikes occur for instrumentation reasons or reasons not associated with human presence. Variations in ambient light that occur during a fourth time interval 3028, both rapid and slow, may be reflected by an increased presence probability 3030, since all such variations, during evening hours, are found to correlate strongly with human presence. A short, single variation in ambient light level in a fifth time period 3032 may also be reflected in a large increase in presence probability 3034, as any increase in ambient light level during late evening hours is strongly correlated with human presence.

The point of FIGS. 30A-C is that the probability of human presence calculated from the output of a particular sensor may be the result of relatively complex calculations that involve many different considerations. Sensor output levels that, at one point in time, strongly correlate with human presence may, at another point in time, only weakly correlate with human presence. The temporal proximity of a change in sensor output to scheduled events, various expected cycles, changes in outputs of other sensors, and many other considerations may together suggest a variety of different presence probabilities for any particular sensor-output level. These considerations may also be strongly dependent on the type of sensor.

Figure 31:
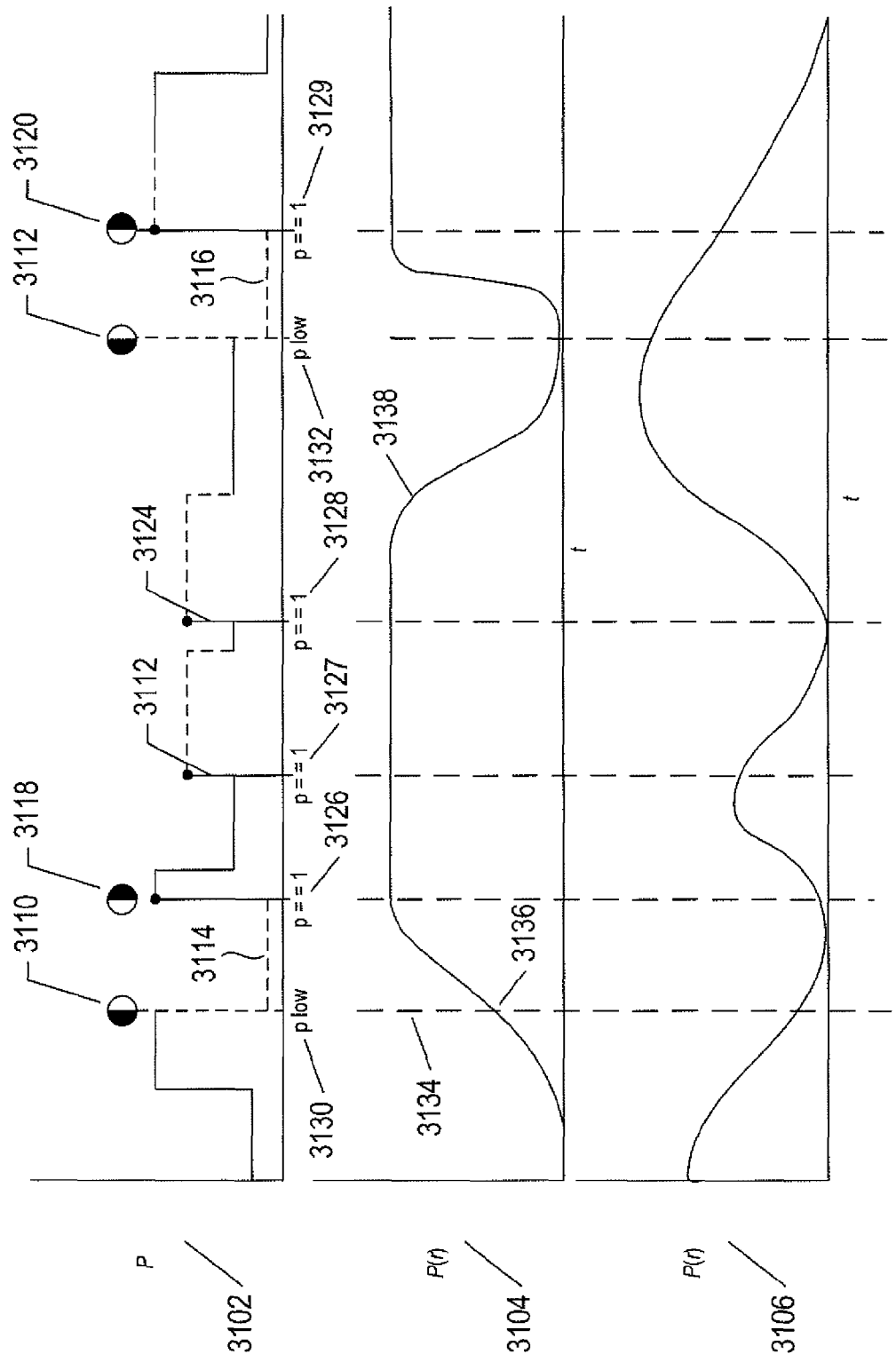
FIG. 31 illustrates determination of the confidence in probability estimates based on individual sensor output.

FIG. 31 illustrates determination of the confidence in probability estimates based on individual sensor output. In FIG. 31, a plot 3102 of a control schedule onto which various immediate-control inputs and presence events have been superimposed is aligned with two plots 3104 and 3106 of the presence probability calculated for a controlled region r, based on input of a particular sensor, with respect to time. In the annotated schedule, two presence-to-no-presence events 3110 and 3112 resulted in schedule adjustments 3114 and 3116, respectively, which were, in turn, overridden by no-presence-to-presence events 3118 and 3120. In addition, two immediate-control inputs not associated with no-presence-to-presence events 3122 and 3124 occurred in the time period for which the control schedule is shown. The immediate-input events 3122 and 3124 as well as the immediate-input events associated with no-presence-to-presence events 3118 and 3120 are all assumed to correspond to input of immediate control inputs by a user through an immediate-control-input interface physically associated with an intelligent controller. As a result, the probability that a human was present in the controlled environment r, assuming the intelligent controller is located in r, is 1 at each of the times corresponding to intelligent-controller inputs and no-presence-to-presence events 3118, 3120, 3122, and 3124, as indicated by the "p=1" annotations 3126-3129. Conversely, at the points in time associated with presence-to-no-presence events 3110 and 3112, the intelligent controller has determined, based on all information available to the intelligent controller, that the probability of human presence was low at the times these events occurred, as indicated by annotations 3130 and 3132. Thus, there are six time points within the interval for which the control schedule is shown in plot 3102, associated with annotations 3126-3130, for which the intelligent controller has or can assign presence probability with high confidence. In order to determine a confidence metric for the probabilities calculated from individual sensors, these relatively certain human-presence probabilities can be compared with the probabilities calculated from sensor output at these same points in time. Dashed vertical lines, such as dashed vertical line 3134, are used in FIG. 31 to show the time alignment between plots 3102, 3104, and 3106.

First consider plot 3104. At the time corresponding to annotation 3130, the probability of human presence is low and the calculated presence probability from the sensor output 3136, at the intersection of dashed vertical line 3134 and the probability curve 3138 plotted in plot 3104, appears to be significant, although less than 0.5. However, with respect to all of the other annotated time points 3126-3129 and 3132, computed probability from the sensor output corresponds precisely to the relatively certain controller-determined probabilities at those points in time. Thus, even though the calculated probability from the sensor output does not exactly match the relatively certain probabilities at the six points in time corresponding to annotations 3126-3130 and 3132, it would seem reasonable to associate a relatively high confidence in probabilities calculated from the sensor output in the case of the sensor from which plot 3104 was generated. By contrast, there is little correspondence between the calculated probabilities from the sensor from which plot 3106 was generated and the relatively certain probabilities inferred from the annotated control schedule, as can be seen in the lower plot 3106 in FIG. 31. In this case, it would be reasonable to assign a relatively low confidence in the probabilities calculated from the output of the second sensor. This illustration indicates one method, described below mathematically, for computing a confidence multiplier, or weight, for individual sensors in order to weight the probabilities calculated from the sensor outputs when computing cumulative user-based probability based on the sensor outputs:

$$d = \frac{\sqrt{\sum_{i=1}^{n}(p_i - P(\text{time}(p_i)))^2}}{n}$$

if $d < 0.1$, weight = 10;

else weight = $\frac{1}{d}$ where i indexes the set of certain probabilities, represented by annotations in FIG. 31; and P(t) is the presence probability at time t calculated for a sensor.

FIGS. 32A-B illustrate the fact that the length of a time interval separating a presence-to-no-presence event and a no-presence-to-presence event may determine whether or not the latter event is deemed a corrective event. In FIG. 32A, a presence-to-no-presence event 3202 is relatively quickly followed by an immediate-input control through an immediate-control interface indicating the presence of a human 3204, thus constituting a no-presence-to-presence event. Because the time interval 3206 between these two events is relatively short, the no-presence-to-presence event is deemed a corrective no-presence-to-presence event 3208. By contrast, as shown in FIG. 32B, when two such events are separated by a much longer time interval 3210, the no-presence-to-presence event 3212 is not deemed to be a corrective no-presence-to-presence event. As mentioned above, corrective no-presence-to-presence events are strong indicators of erroneous no-presence determinations by an intelligent controller. Analysis of the occurrence of such events may lead to changing of sensor confidences, changing of thresholds used in various rules, deletion or addition of new rules, and other changes in the computations used by an intelligent controller to determine presence probabilities.

FIG. 33 illustrates various alterations to presence-related schedule adjustments and presence-probability determinations that can be used by an intelligent controller to factor in corrective no-presence-to-presence events and other information into presence-probability determinations and schedule adjustments related to presence-probability determinations. FIG. 33 shows a plot of a portion of a control schedule 3302 above and aligned with a plot of the presence probability computed by an intelligent controller with respect to time 3304. In general, when the computed presence probability falls below a threshold value 3306, the intelligent controller infers that transition from a present state to a no-present state or another no-presence-related state is warranted. This threshold may be lowered in the case that corrective no-presence-to-presence events occur frequently. Alternatively, the threshold may be raised until no-presence-to-presence corrective events begin to occur with high frequency in order to determine a maximum reasonable threshold value that results in optimal intelligent control. For example, in a home-heating context, schedule adjustments that accompany presence-to-no-presence events generally result in significant energy savings, and thus an intelligent controller may continuously adjust the threshold values as high as possible.

Another possible adjustment to scheduling adjustments associated with presence events is to employ a lag time or buffer time 3310 between the time 3312 that the calculated presence probability falls below a threshold value and the time 3314 that a schedule adjustment is made as a result of a no-presence determination. During the lag time 3310, should the calculated presence probability again rise above the threshold value, a potential corrective no-presence-to-presence event can be avoided. There are many additional possible adjustments to schedule adjustments related to presence events that can be used to optimize intelligent control with respect to human presence.

In the preceding discussion, schedule adjustments are generally made as a result of transitions from a presence state to a no-presence state, but in other implementations, schedule adjustments may be undertaken with respect to no-presence-to-presence events. For example, in a critical air-conditioning context, an air-conditioning system can be activated whenever human presence is detected. As mentioned above, there are a wide variety of different types of schedule adjustments that may occur concurrently with, or proximal in time to, presence-related events. In distributed intelligent-control implementations, presence-probability calculations, sensor confidences, and other derived results and data associated with presence-probability determinations may involve even more complex considerations but also may be substantially more accurate, due to a greater number of sensors and stored information, more favorable spatial and temporal distributions of sensors, and collection of sensor data.

Figure 34:
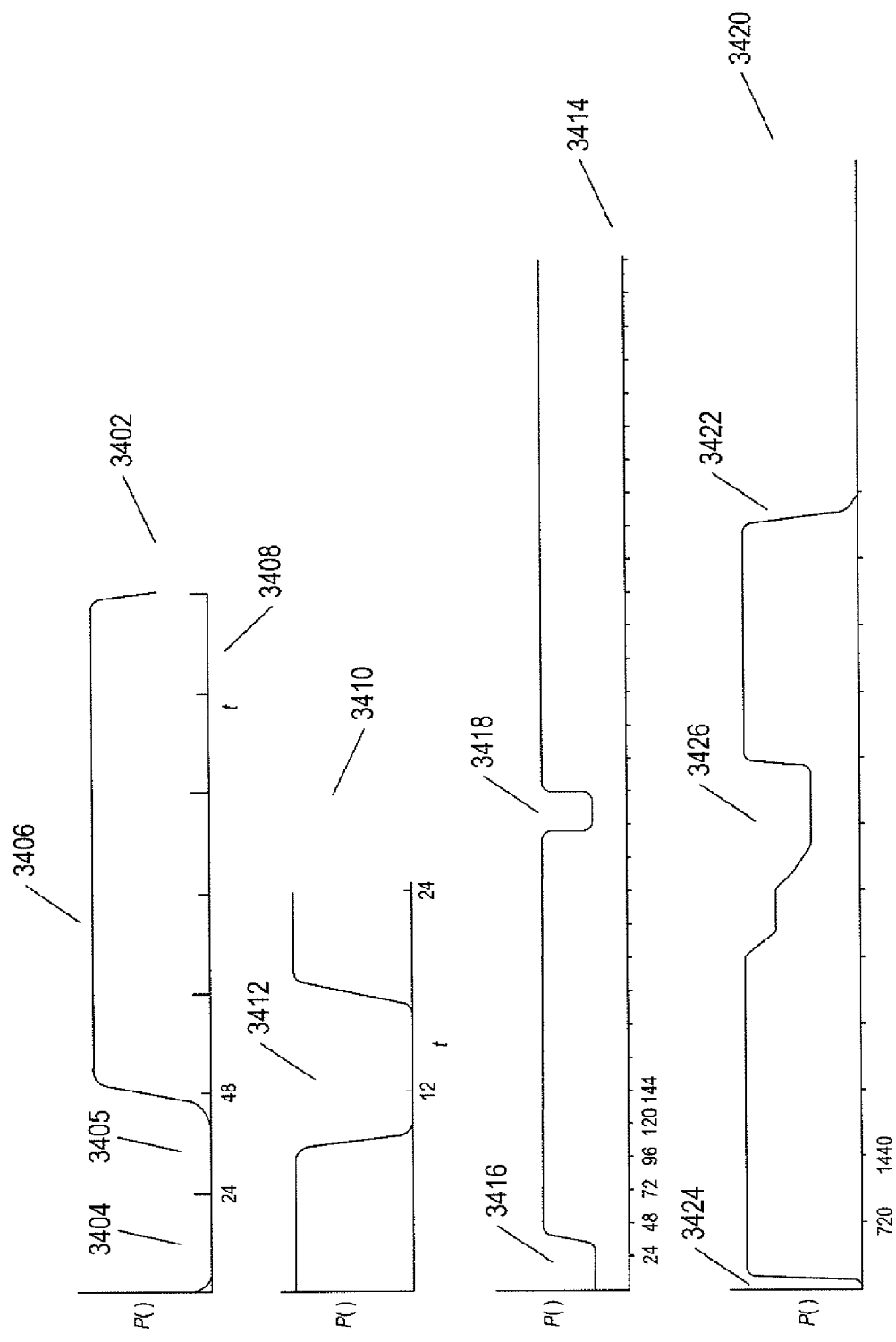
FIG. 34 illustrates an example of presence patterns determined over a variety of different time periods.

As part of presence-probability calculations, intelligent controllers may compute and store presence-probabilities computed over various time intervals in order to detect various types of presence-related cycles and patterns. FIG. 34 illustrates an example of presence patterns determined over a variety of different time periods. A first plot 3402 shows a general presence-probability pattern computed over a week-long time interval. This pattern may be observed, as one example, for probability of presence of humans within a residential environment. On two days of the week 3404-3405, the probability of human presence is relatively low while on the remaining five days of the week 3406, the probability of presence is relatively high. In this case, the occupants of the residence may generally be away on weekends. Note that the horizontal time axis 3408 is incremented in hours. A second plot 3410 shows a presence-probability pattern observed over day-long intervals. In this case, occupants are generally present except for during work hours 3412 from 9:00 in the morning until 6:00 o'clock in the evening. Plot 3414 shows presence-probability patterns over month-long intervals. In this case, occupants of a residence are frequently absent on the first day 3416 and $15^{th}$ day 3418 of each month, but are otherwise generally present. Finally, plot 3420 shows presence-probability patterns over year-long time intervals. In this case, occupants of the residence are generally absent in late December 3422 and the first week of January 3424 and are relatively frequently absent during the summer months 3426. These types of presence-probability patterns may be considered cumulatively or successively during presence-probability calculations. For example, the thresholds of calculated presence probabilities used to trigger to state transitions may be lowered in time periods associated with high-presence probabilities and raised during time periods associated with low-presence probabilities. Alternatively, rules may be developed to adjust cumulative presence-probabilities computed based on sensor output to reflect detected presence-probability patterns.

Presence-and/or-Absence Detection and Control Adjustment in the Context of an Intelligent Thermostat An implementation of a method for control-schedule adjustment based on presence and/or absence determinations is included in a next-described intelligent thermostat. The intelligent thermostat is provided with a selectively layered functionality that exposes unsophisticated users to a simple user interface, but provides advanced users with an ability to access and manipulate many different energy-saving and energy tracking capabilities. Even for the case of unsophisticated users who are only exposed to the simple user interface, the intelligent thermostat provides advanced energy-saving functionality that runs in the background. The intelligent thermostat uses multi-sensor technology to learn the heating and cooling environment in which the intelligent thermostat is located and to optimize energy-saving settings.

The intelligent thermostat also learns about the users, beginning with a setup dialog in which the user answers a few simple questions, and then continuing, over time, using multi-sensor technology to detect user occupancy patterns and to track the way the user controls the temperature using schedule changes and immediate-control inputs. On an ongoing basis, the intelligent thermostat processes the learned and sensed information, automatically adjusting environmental control settings to optimize energy usage while, at the same time, maintaining the temperature within the environment at desirable levels, according to the learned occupancy patterns and comfort preferences of one or more users.

Advantageously, the selectively layered functionality of the intelligent thermostat allows for effective operation in a variety of different technological circumstances within home and business environments. For simple environments having no wireless home network or Internet connectivity, the intelligent thermostat operates effectively in a standalone mode, learning and adapting to an environment based on multi-sensor technology and user input. However, for environments that have home network or Internet connectivity, the intelligent thermostat operates effectively in a network-connected mode to offer additional capabilities.

When the intelligent thermostat is connected to the Internet via a home network, such as through IEEE 802.11 (Wi-Fi) connectivity, the intelligent thermostat may: (1) provide real-time or aggregated home energy performance data to a utility company, intelligent thermostat data service provider, intelligent thermostats in other homes, or other data destinations; (2) receive real-time or aggregated home energy performance data from a utility company, intelligent thermostat data service provider, intelligent thermostats in other homes, or other data sources; (3) receive new energy control instructions and/or other upgrades from one or more intelligent thermostat data service providers or other sources; (4) receive current and forecasted weather information for inclusion in energy-saving control algorithm processing; (5) receive user control commands from the user's computer, network-connected television, smart phone, and/or other stationary or portable data communication appliance; (6) provide an interactive user interface to a user through a digital appliance; (7) receive control commands and information from an external energy management advisor, such as a subscription-based service aimed at leveraging collected information from multiple sources to generate energy-saving control commands and/or profiles for their subscribers; (8) receive control commands and information from an external energy management authority, such as a utility company to which limited authority has been voluntarily given to control the intelligent thermostat in exchange for rebates or other cost incentives; (9) provide alarms, alerts, or other information to a user on a digital appliance based on intelligent thermostat-sensed HVAC-related events; (10) provide alarms, alerts, or other information to the user on a digital appliance based on intelligent thermostat-sensed non-HVAC related events; and (11) provide a variety of other useful functions enabled by network connectivity.

Figure 35A:
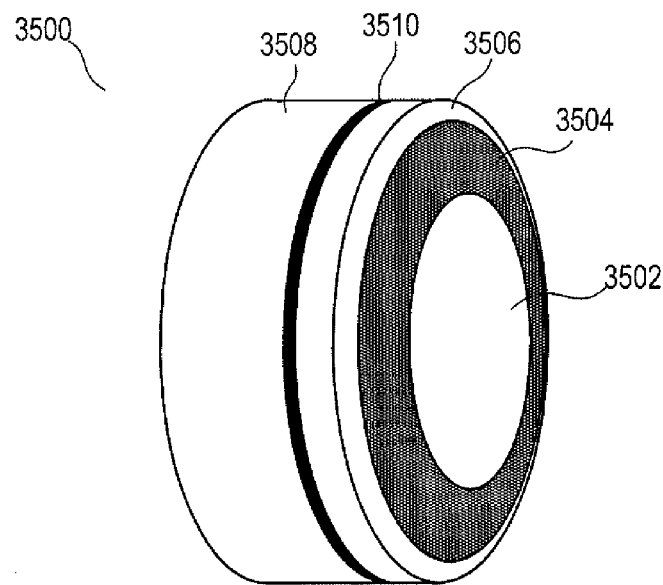
FIG. 35A illustrates a perspective view of an intelligent thermostat.

FIG. 35A illustrates a perspective view of an intelligent thermostat. The intelligent thermostat 3500 has a sleek, elegant appearance. The intelligent thermostat 3500 comprises a circular main body 3508 with a diameter of about 8 cm and that has a visually pleasing outer finish, such as a satin nickel or chrome finish. A cap-like structure comprising a rotatable outer ring 3506, a sensor ring 3504, and a circular display monitor 3502 is separated from the main body 3508 by a small peripheral gap 3510. The outer ring 3506 may have an outer finish identical to that of the main body 3508, while the sensor ring 3504 and circular display monitor 3502 may have a common circular glass (or plastic) outer covering that is gently arced in an outward direction and that provides a sleek yet solid and durable-looking overall appearance. The sensor ring 3504 contains any of a wide variety of sensors, including infrared sensors, visible-light sensors, and acoustic sensors. The glass or plastic that covers the sensor ring 3504 may be smoked or mirrored such that the sensors themselves are not visible to the user. An air venting functionality may be provided, via the peripheral gap 3510, which allows the ambient air to be sensed by the internal sensors without the need for gills or grill-like vents.

Figures 35B, 35C:
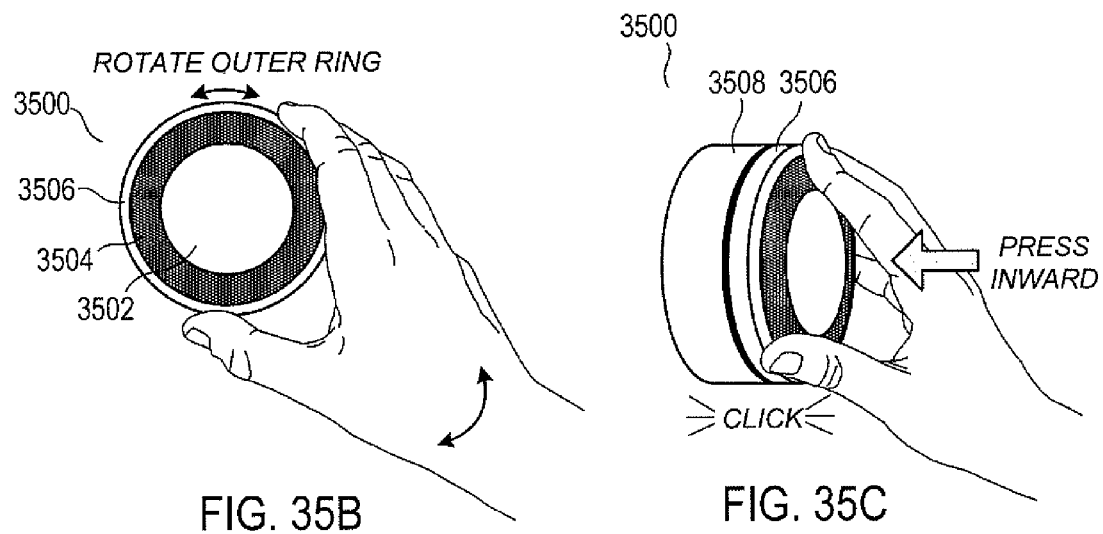
FIGS. 35B-35C illustrate the intelligent thermostat being controlled by a user.

FIGS. 35B-35C illustrate the intelligent thermostat being controlled by a user. The intelligent thermostat 3500 is controlled by two types of user input: (1) a rotation of the outer ring 3506 (FIG. 35B); and (2) an inward push on the outer ring 3506 (FIG. 35C) until an audible and/or tactile "click" occurs. The inward push may cause the outer ring 3506 to move forward, while in another implementation, the entire cap-like structure, including both the outer ring 3506 and the glass covering of the sensor ring 3504 and circular display monitor 3502, move inwardly together when pushed. The sensor ring 3504, the circular display monitor 3502, and the common glass covering do not rotate with outer ring 3506 in one implementation.

By rotation of the outer ring 3506, or ring rotation, and inward pushing of the outer ring 3506, or inward click, the intelligent thermostat 3500 can receive all necessary information from the user for basic setup and operation. The outer ring 3506 is mechanically mounted in a manner that provides a smooth yet viscous feel to the user, for further promoting an overall feeling of elegance while also reducing spurious or unwanted rotational inputs. The intelligent thermostat 3500 recognizes three fundamental user inputs: (1) ring rotate left, (2) ring rotate right, and (3) inward click. In other implementations, more complex fundamental user inputs can be recognized, such as double-click or triple-click inward presses and speed-sensitive or acceleration-sensitive rotational inputs.

Figure 36:
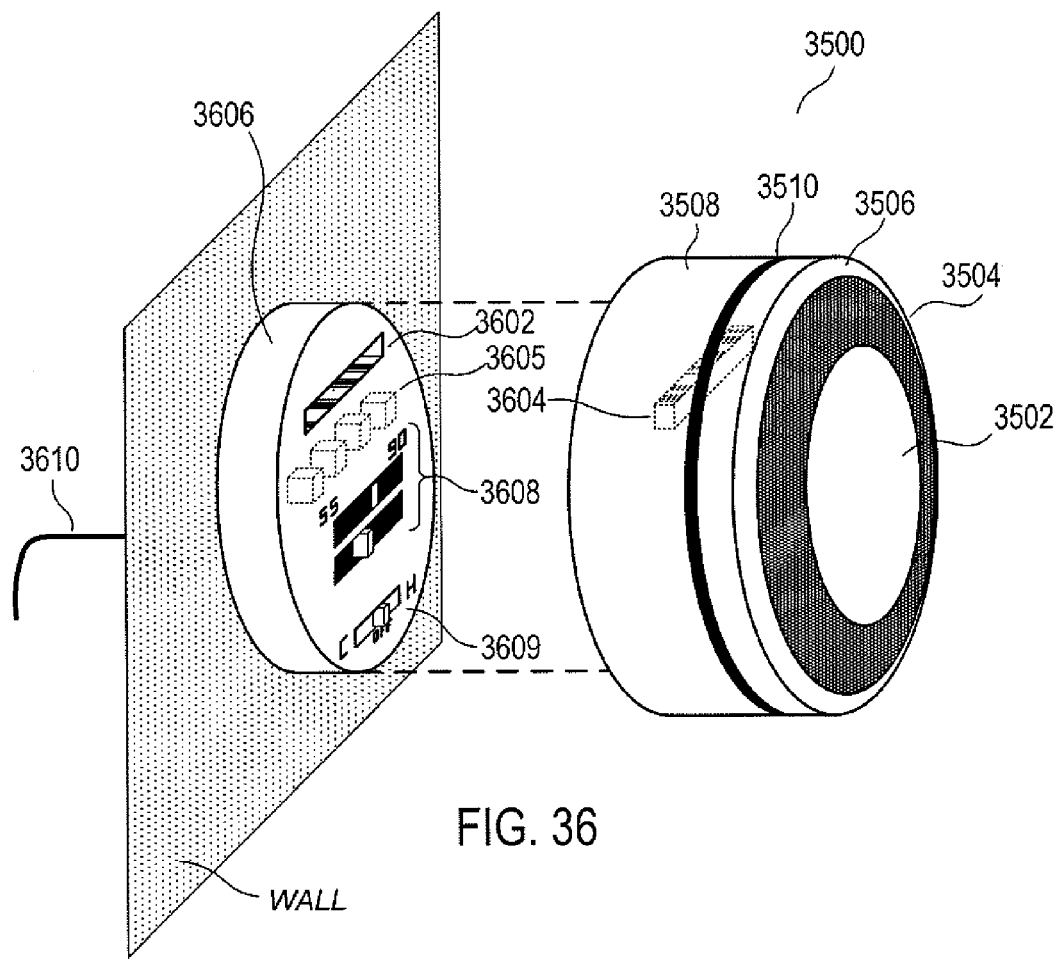
FIG. 36 illustrates an exploded perspective view of the intelligent thermostat and an HVAC-coupling wall dock.

FIG. 36 illustrates an exploded perspective view of the intelligent thermostat and an HVAC-coupling wall dock. The HVAC-coupling wall dock 3606 has the functionality as a very simple, elemental, standalone thermostat when the intelligent thermostat 3500 is removed, the elemental thermostat including a standard temperature readout/setting dial 3608 and a simple COOL-OFF-HEAT switch 3609. This can prove useful for a variety of situations, such as when the intelligent thermostat 3500 needs to be removed for service or repair for an extended period of time. In one implementation, the elemental thermostat components 3608 and 3609 are entirely mechanical in nature, so that no electrical power is needed to trip the control relays. In other implementations, simple electronic controls, such as electrical up/down buttons and/or an LCD readout, are provided. In other implementations, a subset of the advanced functionalities of the intelligent thermostat 3500 can be provided, such as elemental network access to allow remote control that provides a brain-stem functionality while the intelligent thermostat is temporarily removed.

Figure 37A:
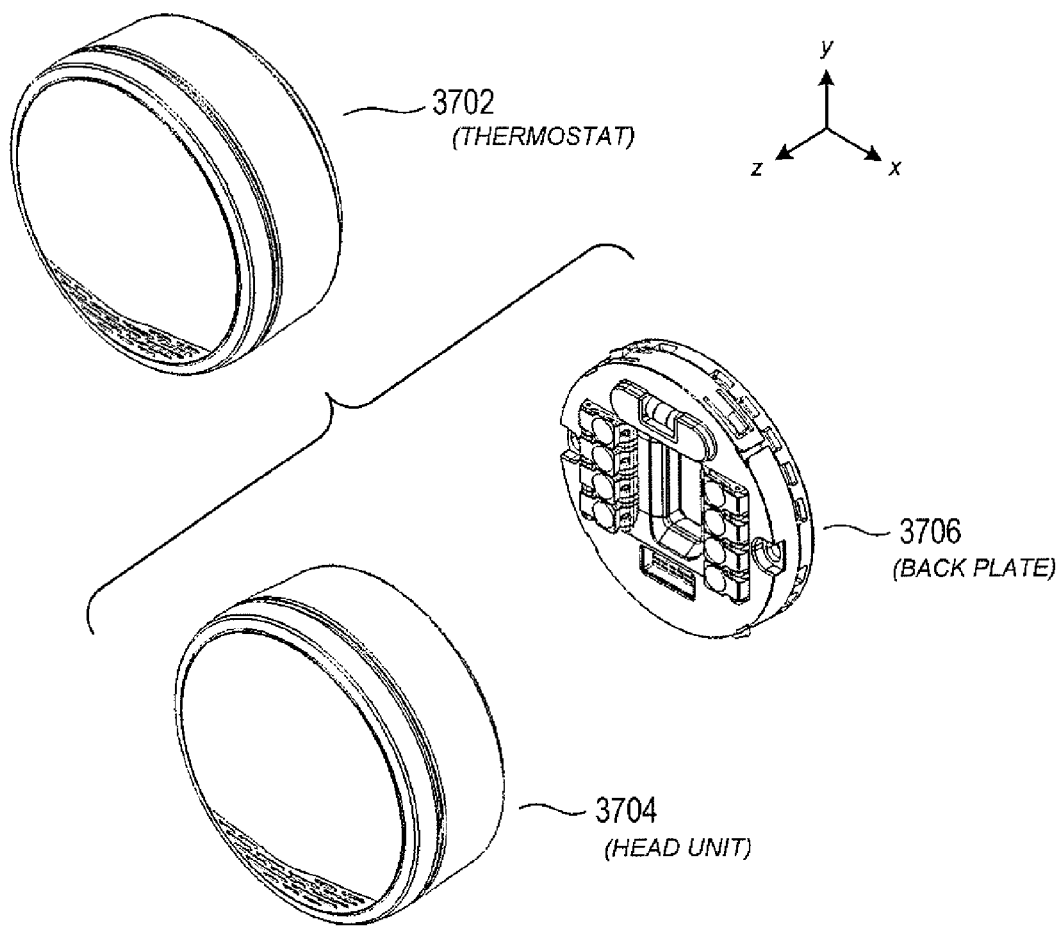
FIGS. 37A-37B illustrate exploded front and rear perspective views of the intelligent thermostat.
Figure 37B:
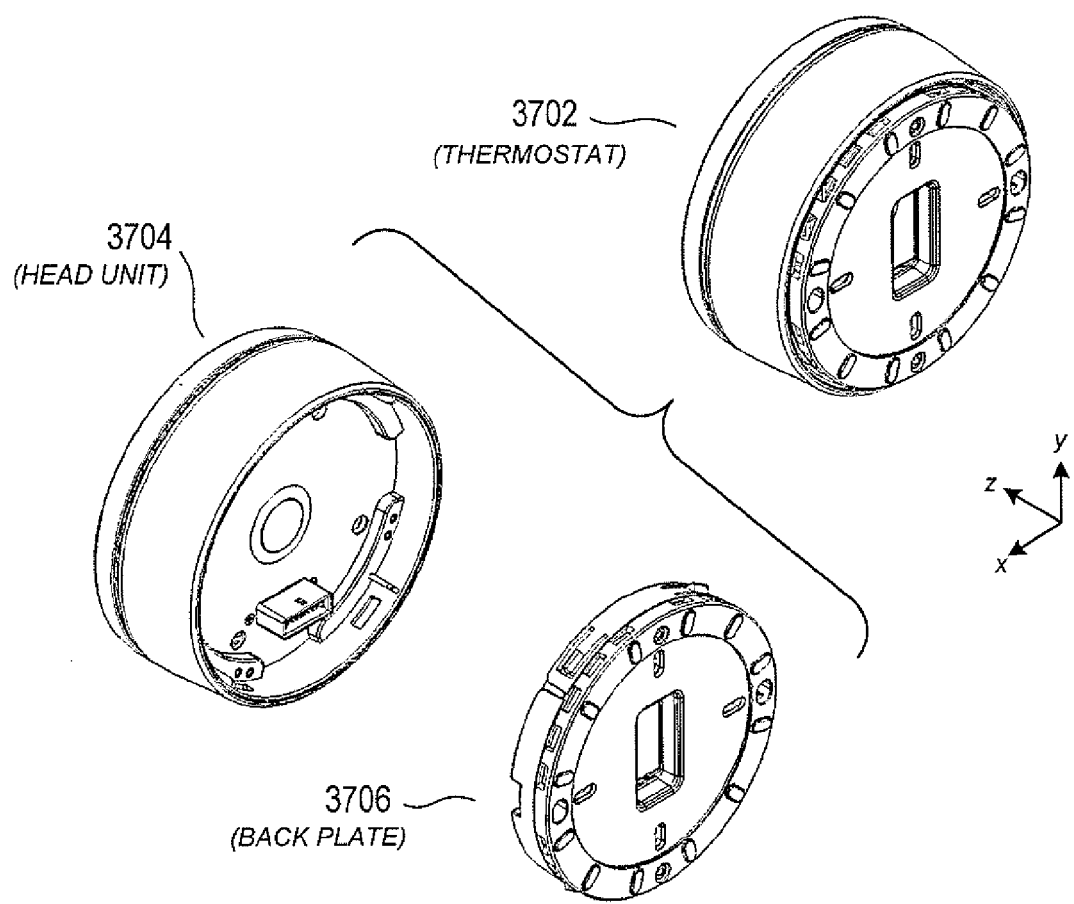

FIGS. 37A-37B illustrate exploded front and rear perspective views of the intelligent thermostat. FIGS. 37A-37B show the intelligent thermostat 3702 with respect to its two main components: (1) the head unit 3604; and (2) the back plate 3706. In the drawings shown, the z direction is outward from the wall, the y direction is the head-to-toe direction relative to a walk-up user, and the x direction is the user's left-to-right direction.

Figure 38A:
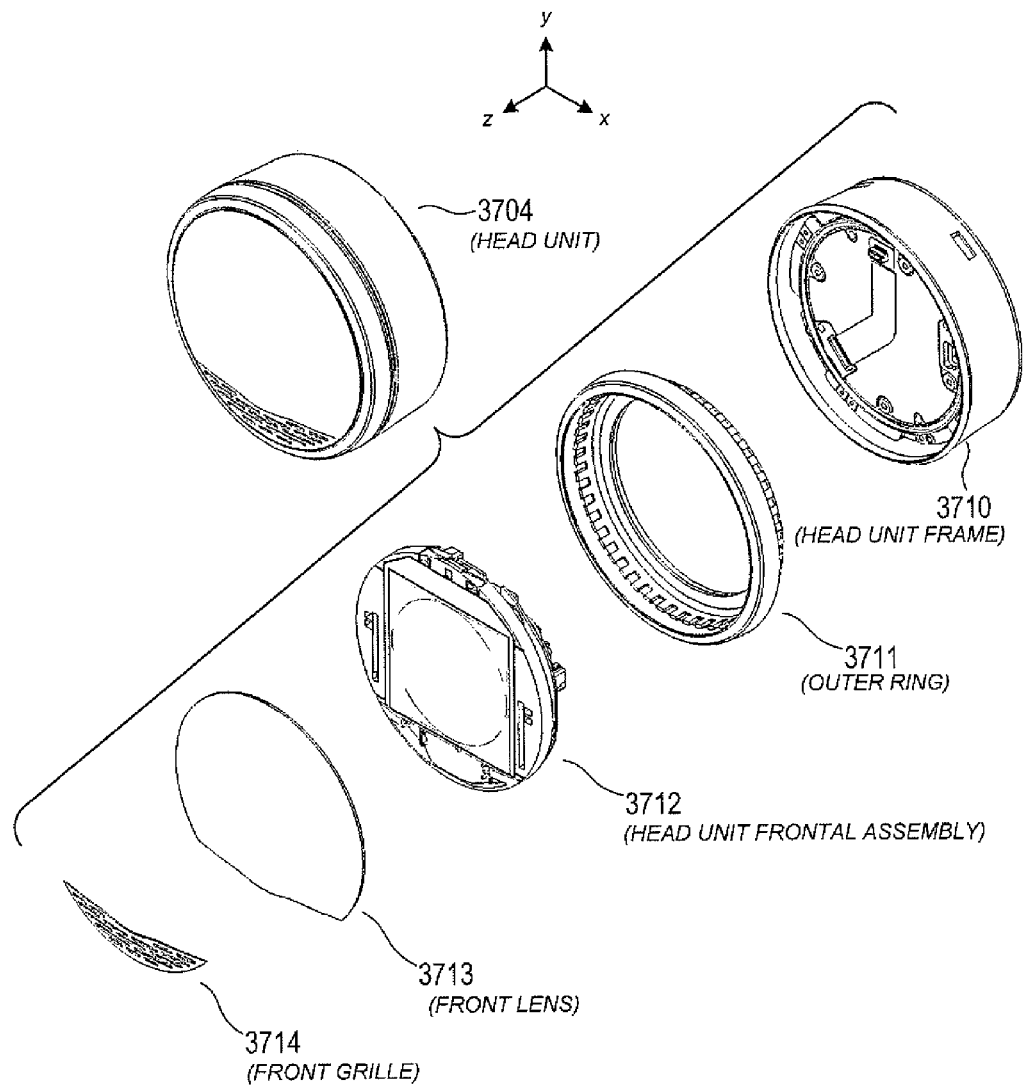
FIGS. 38A-38B illustrate exploded front and rear perspective views, respectively, of the head unit.
Figure 38B:
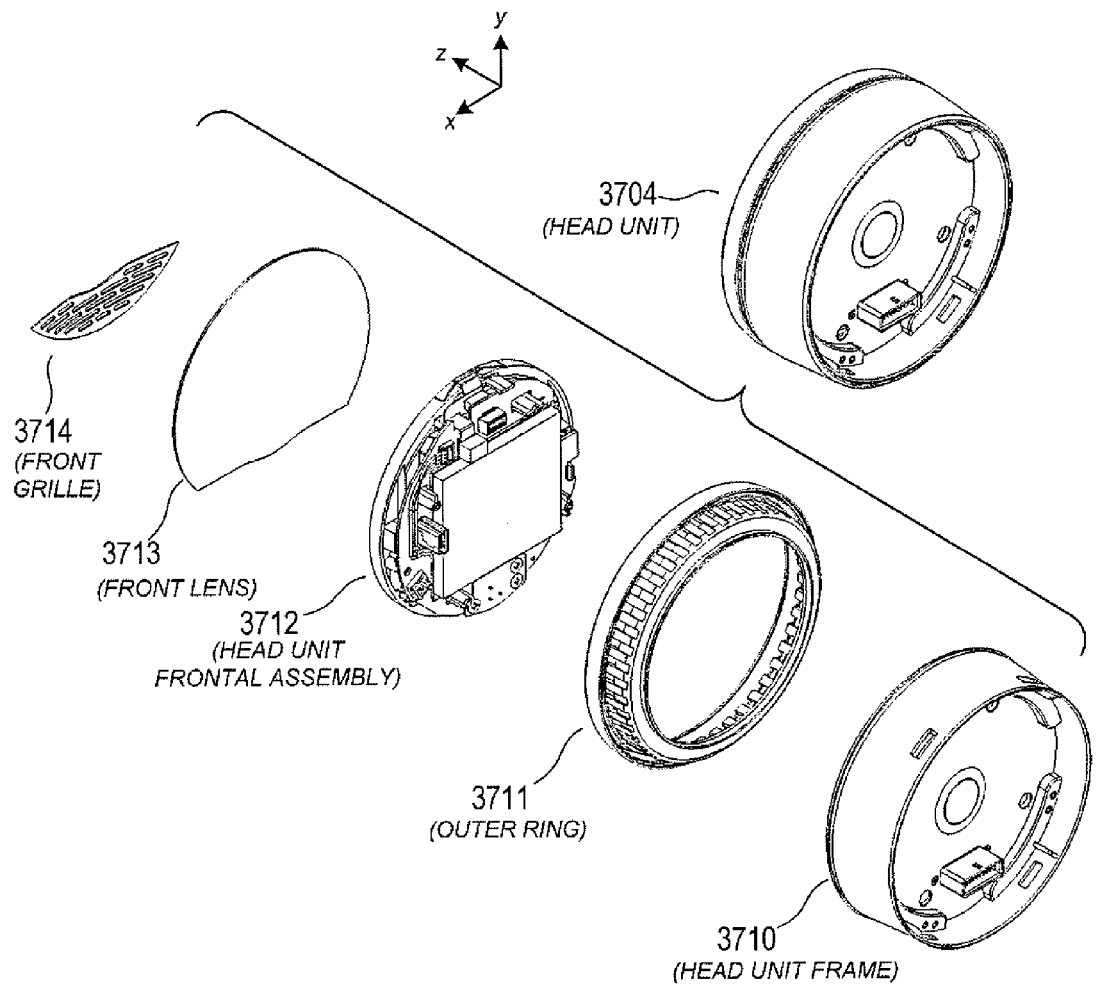

FIGS. 38A-38B illustrate exploded front and rear perspective views, respectively, of the head unit. Head unit 3604 includes a head unit frame 3710, the outer ring 3711, a head unit frontal assembly 3712, a front lens 3713, and a front grille 3714. Electrical components on the head unit frontal assembly 3712 can connect to electrical components on the backplate 3706 via ribbon cables and/or other plug type electrical connectors.

Figure 39A:
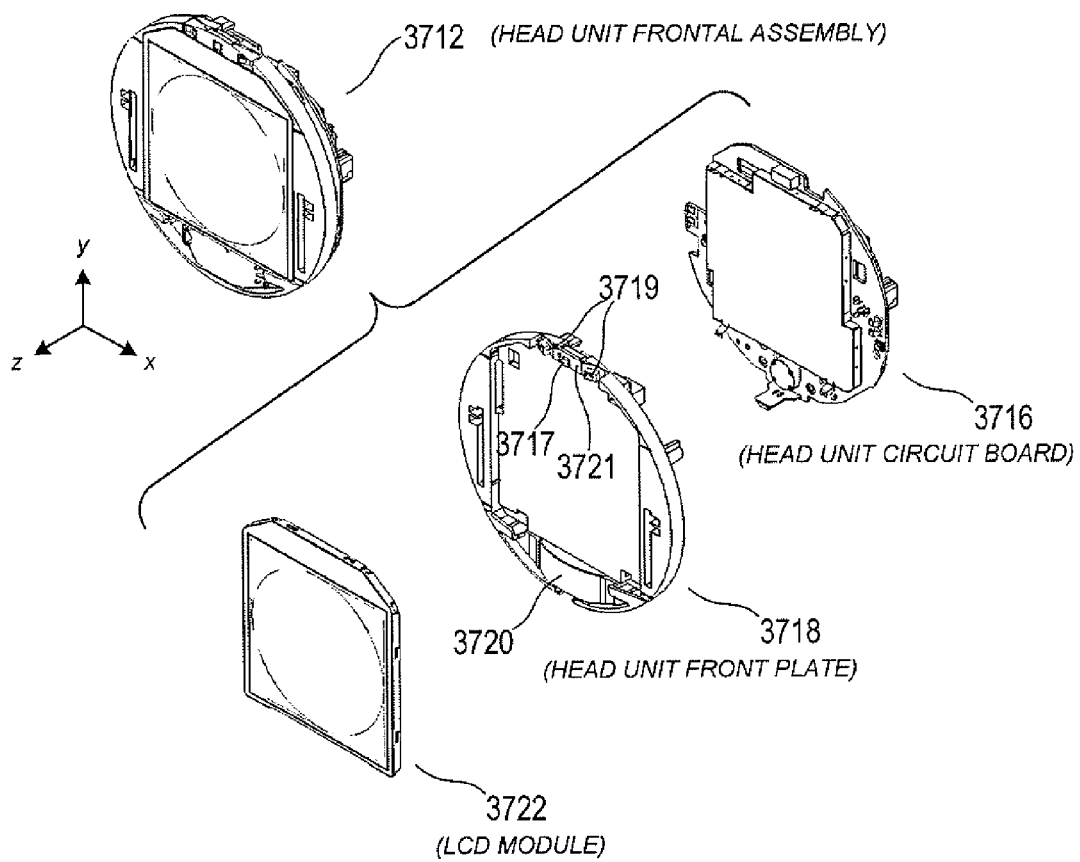
FIGS. 39A-39B illustrate exploded front and rear perspective views, respectively, of the head unit frontal assembly.
Figure 39B:
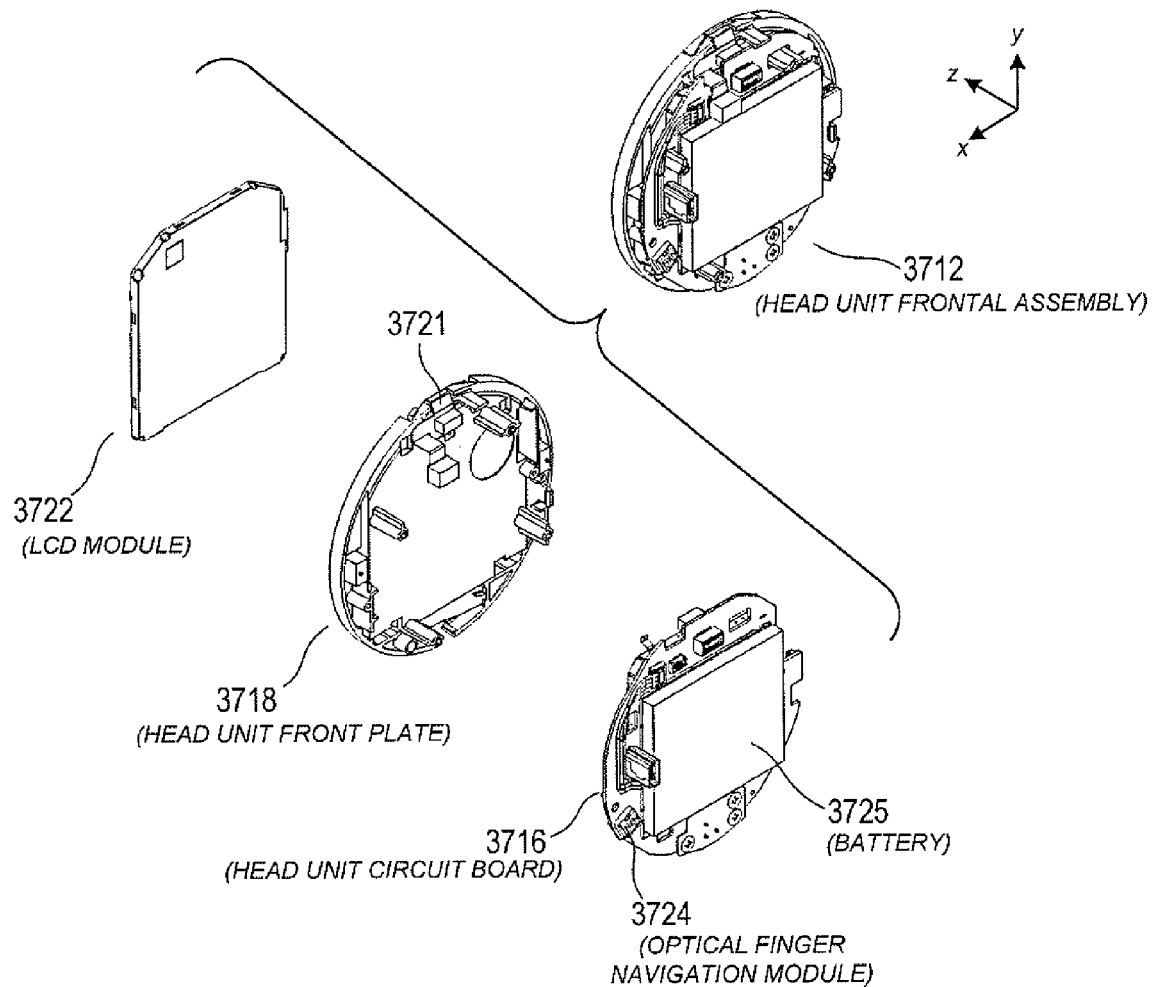

FIGS. 39A-39B illustrate exploded front and rear perspective views, respectively, of the head unit frontal assembly. Head unit frontal assembly 3712 comprises a head unit circuit board 3716, a head unit front plate 3718, and an LCD module 3722. The components of the front side of head unit circuit board 3716 are hidden behind an RF shield in FIG. 39A. A rechargeable Lithium-Ion battery 3725 is located on the back of the head unit circuit board 3716, which, in one implementation, has a nominal voltage of 3.7 volts and a nominal capacity of 560 mAh. To extend battery life, the battery 3725 is normally not charged beyond 450 mAh by the thermostat battery charging circuitry. Moreover, although the battery 3725 is rated to be capable of being charged to 4.2 volts, the intelligent thermostat battery-charging circuitry normally does not charge the intelligent thermostat beyond 3.95 volts. Also shown in FIG. 39B is an optical finger navigation module 3724 that is configured and positioned to sense rotation of the outer ring 3711. The module 3724 uses methods analogous to the operation of optical computer mice to sense the movement of a texturable surface on a facing periphery of the outer ring 3711. Notably, the module 3724 is one of the very few sensors that are controlled by the relatively power-intensive head unit microprocessor rather than the relatively low-power backplate microprocessor. This is achievable without excessive power drain because the head unit microprocessor is already awake when a user is manually turning the dial, avoiding excessive wake-up power drain. Advantageously, very fast response can also be provided by the head unit microprocessor. Also shown in FIG. 39A is a Fresnel lens 3720 that operates in conjunction with a PIR motion sensor disposes thereunderneath.

Figure 40A:
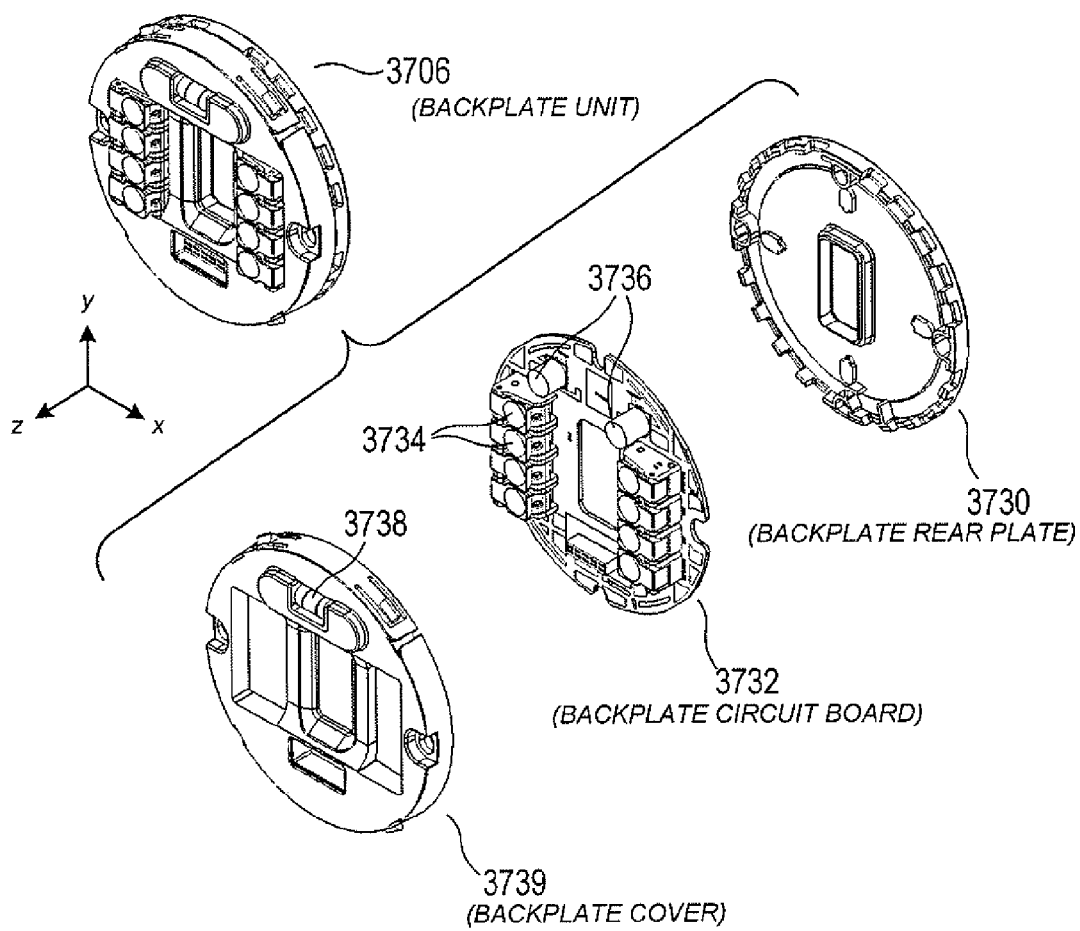
FIGS. 40A-40B illustrate exploded front and rear perspective views, respectively, of the backplate unit.
Figure 40B:
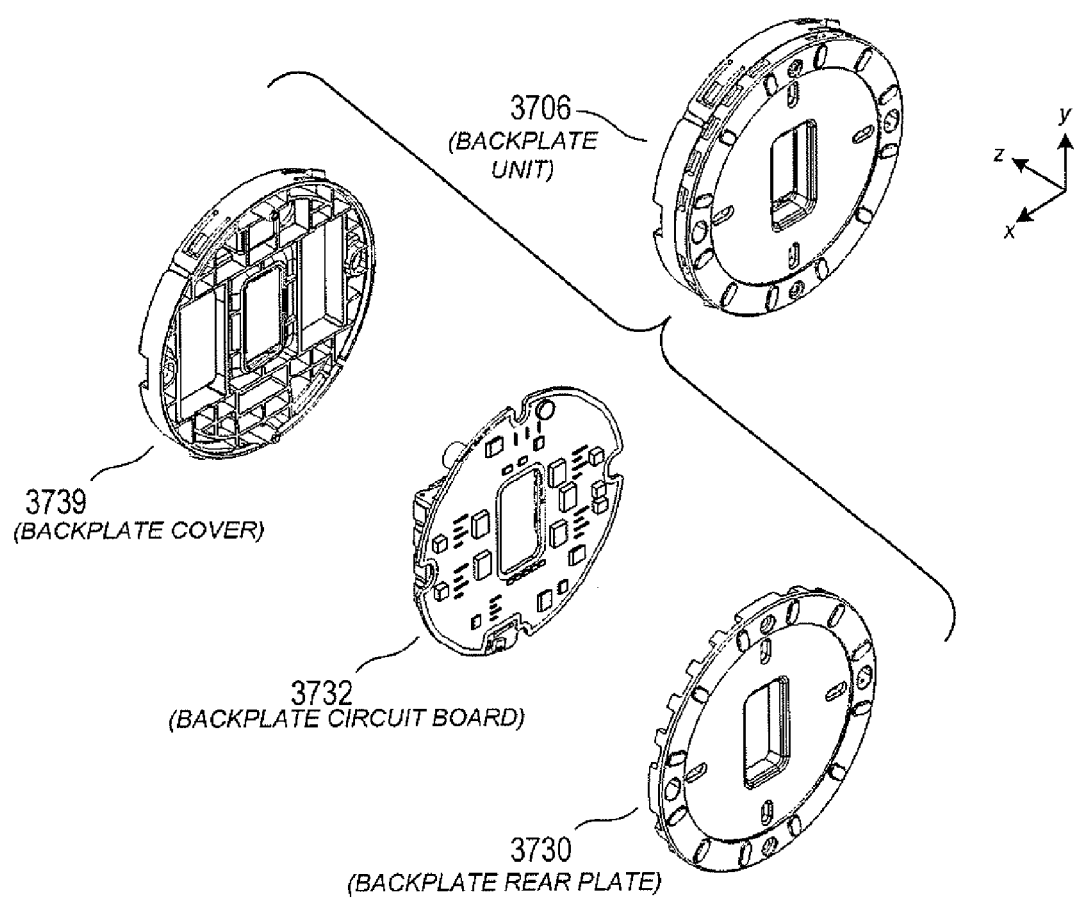

FIGS. 40A-40B illustrate exploded front and rear perspective views, respectively, of the backplate unit. Backplate unit 3706 comprises a backplate rear plate 3730, a backplate circuit board 3732, and a backplate cover 3739. FIG. 40A shows the HVAC wire connectors 3734 that include integrated wire-insertion-sensing circuitry and two relatively large capacitors 3736 that are used by the power stealing circuitry that is mounted on the back side of the backplate circuit board 3732.

Figure 41:
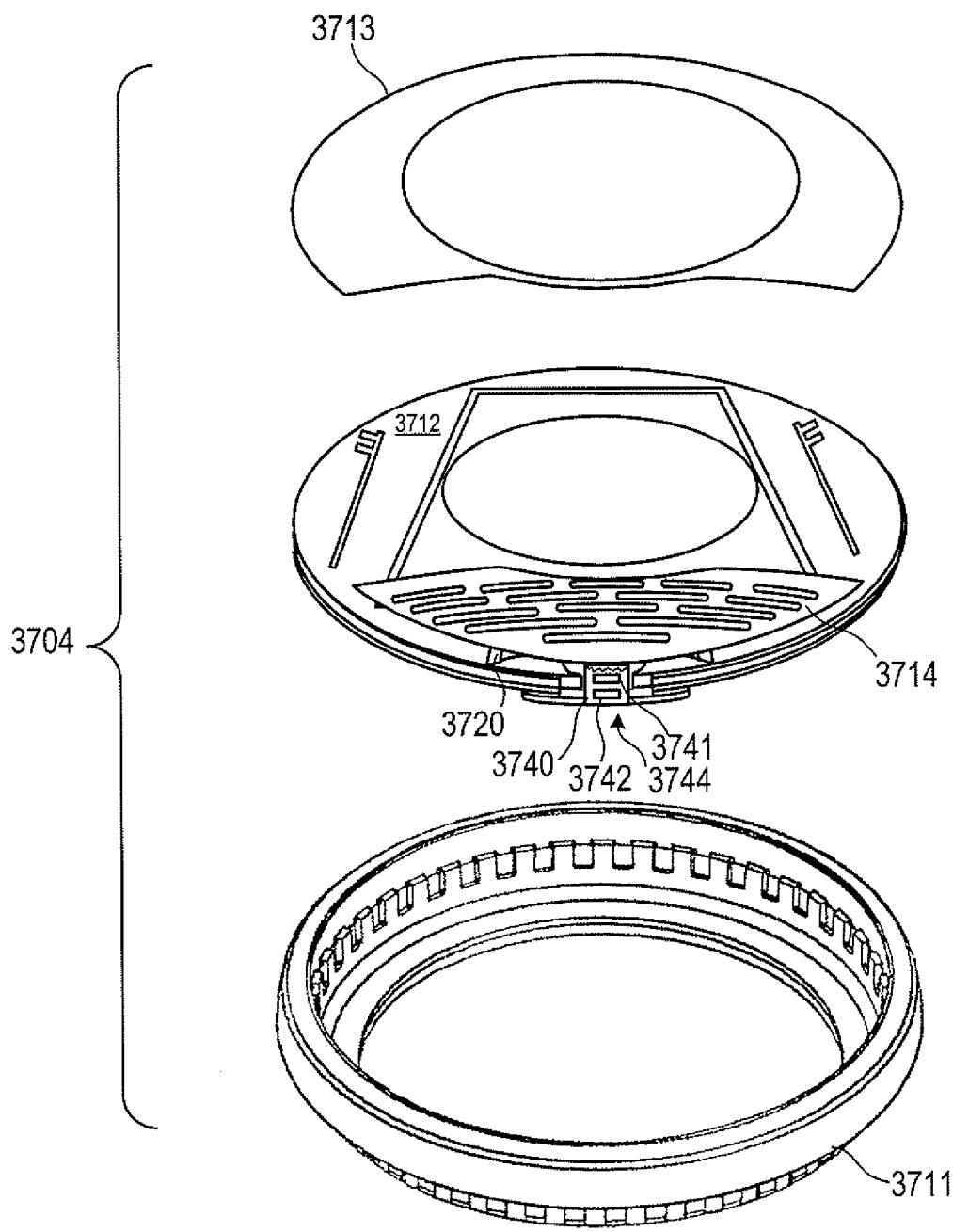
FIG. 41 shows a perspective view of a partially assembled head unit.

FIG. 41 shows a perspective view of a partially assembled head unit. In certain implementations, placement of grille member 3714 over the Fresnel lens 3720 and an associated FIR motion sensor 3744 conceals and protects these PIR sensing elements, while horizontal slots in the grille member 3714 allow the PIR motion sensing hardware, despite being concealed, to detect the lateral motion of occupants in a room or area. A temperature sensor 3740 uses a pair of thermal sensors to more accurately measure ambient temperature. A first or upper thermal sensor 3741 associated with temperature sensor 3740 gathers temperature data closer to the area outside or on the exterior of the thermostat while a second or lower thermal sensor 3742 collects temperature data more closely associated with the interior of the housing. In one implementation, each of the temperature sensors 3741 and 3742 comprises a Texas Instruments TMP 112 digital temperature sensor chip, while the PIR motion sensor 3744 comprises PerkinElmer DigiPyro PYD 1998 dual-element pyro-detector.

To more accurately determine the ambient temperature, the temperature taken from the lower thermal sensor 3742 is considered in conjunction with the temperatures measured by the upper thermal sensor 3741 and when determining the effective ambient temperature. This configuration can be used to compensate for the effects of internal heat produced in the thermostat by the microprocessor(s) and/or other electronic components, obviating or minimizing temperature measurement errors that might otherwise be suffered. In some implementations, the accuracy of the ambient temperature measurement may be further enhanced by thermally coupling upper thermal sensor 3741 of temperature sensor 3740 to grille member 3714 as the upper thermal sensor 3741 better reflects the ambient temperature than lower thermal sensor 3742.

Figure 42:
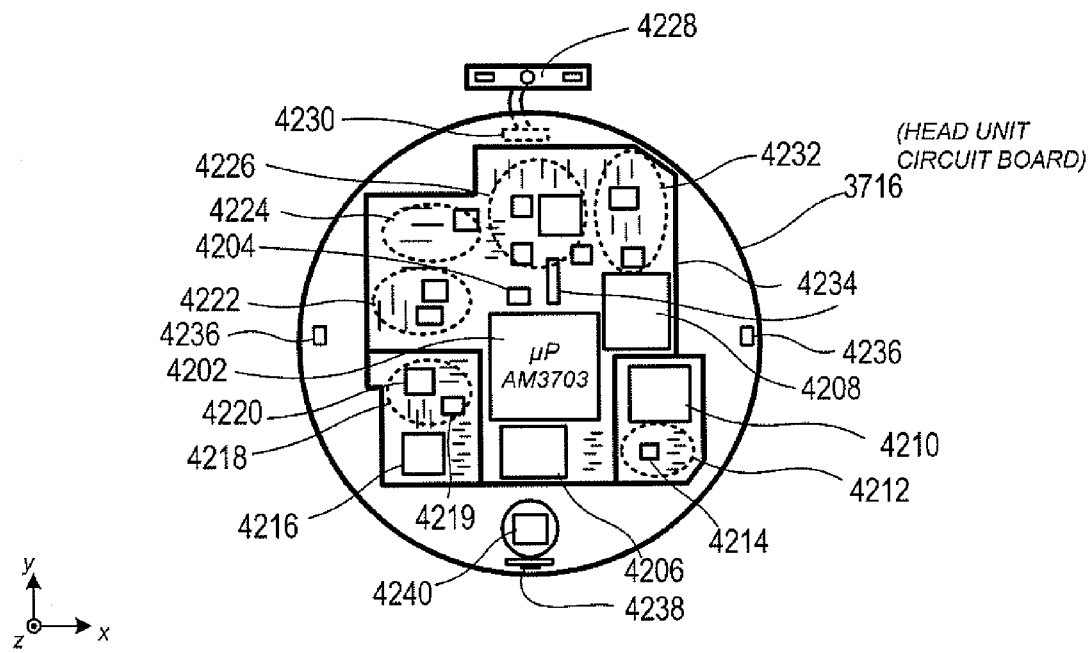
FIG. 42 illustrates the head unit circuit board.

FIG. 42 illustrates the head unit circuit board. The head unit circuit board 3716 comprises a head unit microprocessor 4202 (such as a Texas Instruments AM3703 chip) and an associated oscillator 4204, along with DDR SDRAM memory 4206, and mass NAND storage 4208. A Wi-Fi module 4210, such as a Murata Wireless Solutions LBWA19XSLZ module, which is based on the Texas Instruments WL1270 chipset supporting the 802.11 b/g/n WLAN standard, is provided in a separate compartment of RF shielding 4234 for Wi-Fi capability. Wi-Fi module 4210 is associated with supporting circuitry 4212 including an oscillator 4214. A ZigBee module 4216, which can be, for example, a C2530F256 module from Texas Instruments, is provided, also in a separately shielded RF compartment, for ZigBee capability. The ZigBee module 4216 is associated with supporting circuitry 4218, including an oscillator 4219 and a low-noise amplifier 4220. Display backlight voltage conversion circuitry 4222, piezoelectric driving circuitry 4224, and power management circuitry 4226 are additionally provided. A proximity sensor and an ambient light sensor (PROX/ALS), more particularly a Silicon Labs SI1142 Proximity/Ambient Light Sensor with an I2C Interface, is provided on a flex circuit 4228 that attaches to the back of the head unit circuit board by a flex circuit connector 4230. Battery-charging-supervision-disconnect circuitry 4232 and spring/RF antennas 4236 are additionally provided. A temperature sensor 4238 and a PIR motion sensor 4240 are additionally provided.

Figure 43:
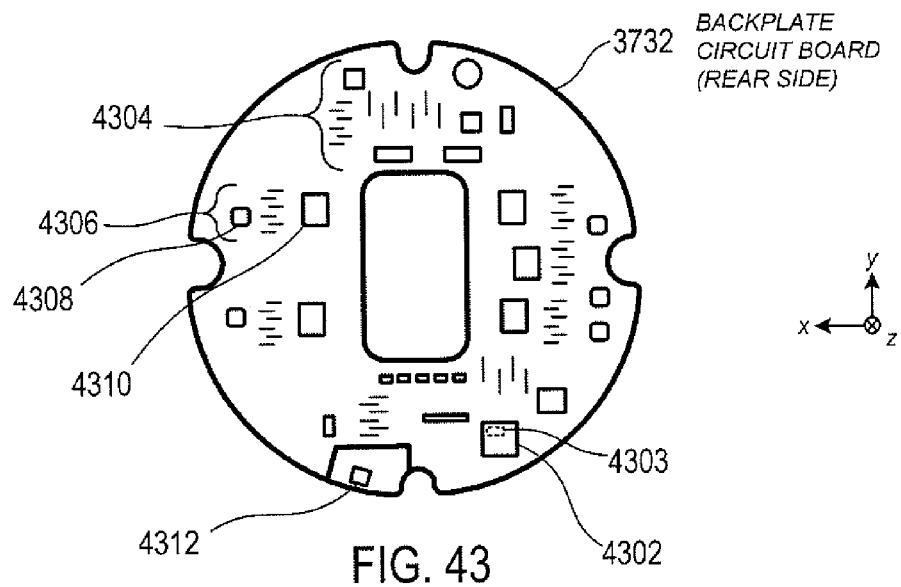
FIG. 43 illustrates a rear view of the backplate circuit board.

FIG. 43 illustrates a rear view of the backplate circuit board. The backplate circuit board 3732 comprises a backplate processor/microcontroller 4302, such as a Texas Instruments MSP430F System-on-Chip Microcontroller that includes an on-board memory 4303. The backplate circuit board 3732 further comprises power-supply circuitry 4304, which includes power-stealing circuitry, and switch circuitry 4306 for each HVAC respective HVAC function. For each such function, the switch circuitry 4306 includes an isolation transformer 4308 and a back-to-back NFET package 4310. The use of FETs in the switching circuitry allows for active power stealing, i.e., taking power during the HVAC ON cycle, by briefly diverting power from the HVAC relay circuit to the reservoir capacitors for a very small interval, such as 100 micro-seconds. This time is small enough not to trip the HVAC relay into the OFF state but is sufficient to charge up the reservoir capacitors. The use of FETs allows for this fast switching time (100 micro-seconds), which would be difficult to achieve using relays (which stay on for tens of milliseconds). Also, such relays would readily degrade with fast switching, and they would also make audible noise. In contrast, the FETS operate with essentially no audible noise. A combined temperature/humidity sensor module 4312, such as a Sensirion SHT21 module, is additionally provided. The backplate microcontroller 4302 performs polling of the various sensors, sensing for mechanical wire insertion at installation, alerting the head unit regarding current vs. setpoint temperature conditions and actuating the switches accordingly, and other functions such as looking for appropriate signal on the inserted wire at installation.

While substantial effort and attention continues toward the development of newer and more sustainable energy supplies, the conservation of energy by increased energy efficiency remains crucial to the world's energy future. According to an October 2010 report from the U.S. Department of Energy, heating and cooling account for 56% of the energy use in a typical U.S. home, making it the largest energy expense for most homes. Along with improvements in the physical plant associated with home heating and cooling (e.g., improved insulation, higher efficiency furnaces), substantial increases in energy efficiency can be achieved by better control and regulation of home heating and cooling equipment. By activating heating, ventilation, and air conditioning (HVAC) equipment for judiciously selected time intervals and carefully chosen operating levels, substantial energy can be saved while at the same time keeping the living space suitably comfortable for its occupants.

Programmable thermostats have become more prevalent in recent years in view of Energy Star (US) and TCO (Europe) standards, and which have progressed considerably in the number of different settings for an HVAC system that can be individually manipulated. Some programmable thermostats have standard default programs built in. Additionally, users are able to adjust the manufacturer defaults to optimize their own energy usage. Ideally, a schedule is used that accurately reflects the usual behavior of the occupants in terms of sleeping, waking and periods of non-occupancy. Due to difficulty in programming many thermostats, however, many schedules do not accurately reflect the usual behavior of the occupants. For example, the schedule may not account for some usual periods of non-occupancy. Additionally, even when a suitable schedule is programmed into the thermostat, inevitably there are departures from usual behavior. The user can manually set back the thermostat when leaving the house and then resume the schedule upon returning, but many users never or very seldom perform these tasks. Thus an opportunity for energy and cost savings exists if a thermostat can automatically set back the setpoint temperature during time of non-occupancy.

An intelligent thermostat generally controls a conditioned enclosure such as a dwelling to provide various temperatures desired by human occupants during different parts of each day, as specified by immediate-control inputs and one or more control schedules. An intelligent thermostat may incorporate presence and/or absence detection and absence-related schedule adjustments to lower the temperature when the intelligent thermostat determines that there are no occupants present in the environment, according to an auto-away feature. In certain implementations, the auto-away temperature adjustments are carried out as soon as the probability of human presence, or the presence probability, falls below a threshold value, while, in other implementations, auto-away temperature adjustments are carried out only following a period of time during which no occupancy is detected. This generally predetermined period of time of non-occupancy may be 30 minutes, 60 minutes, 90 minutes, or more. In certain implementations, the predetermined period of time of non-occupancy is about 120 minutes. The predetermined period of time of non-occupancy can be modified based on various types of user inputs, recorded sensor data, data obtained from remote sources, stored patterns of occupancy and non-occupancy, and other types of electronically stored data, including rules used to determine when auto-away control-schedule adjustments are made.

The intelligent thermostat may control heating, ventilation, and air-conditioning ("HVAC") systems that provide both heating and cooling, heating only, or cooling only to occupants of an environment, such as a residence or commercial building. An intelligent thermostat may also control systems that additionally or separately provide humidification, dehumidification, lighting, electric current flow to appliances and systems, and controlled flow of liquids or gasses to appliances and subsystems.

FIGS. 44A-D illustrate time plots of a normal control schedule versus an actual operating setpoint plot corresponding to operation of an auto away/auto arrival feature of an intelligent thermostat. Shown in FIG. 44A, for purposes of clarity of disclosure, is a relatively simple intelligent-thermostat schedule 4402 for a particular weekday, such as a Tuesday, for a user. The schedule 4402 consists of an awake/at home interval, between 7:00 AM and 9:00 PM, for which the desired temperature is 76 degrees and a sleeping interval, between 9:00 PM and 7:00 AM, for which the desired temperature is 66 degrees. Schedule 4402 represents a normal control schedule for residence.

In accordance with the auto-away feature, the occupancy state of a residence or other environment is continuously and automatically sensed using the intelligent thermostat's multi-sensing technology, such as using a passive infrared proximity sensor and an ambient light sensor. The one or more sensors used to determine the occupancy status of the environment is referred to, below, as the "occupancy sensor." In certain implementations, the occupancy sensor makes measurements at fairly high frequencies, such as 1-2 Hz. The measurements are then collected into buckets or interval having a fixed length of time, such as five minutes. The intelligent controller determines, for each bucket, whether or not occupancy is detected. For example, when more than two occupancy-sensor readings in a bucket show detected movement, then the bucket is regarded as being in, or representing, an occupancy-detected state. Thus, each bucket is classified into one of two states: an occupancy-detected state or a no-occupancy-detected state. In certain implementations, a bucket is classified as being in the occupancy-detected state when a threshold percentage of occupancy-sensor readings indicate occupancy. For example, it may be found that, even with relatively poor placement, around ten percent of PIR-sensor readings indicate movement when the environment is occupied. In this example, a threshold of five percent may be used to classify the bucket as being in the occupancy-detected state.

In certain implementations, based at least in part on the currently sensed states of the buckets, the intelligent thermostat classifies the environment as having one of four states: (1) Home; (2) Away-Normal; (3) Away-Vacation; and (4) Sleep. In certain implementations, when the environment has been in the no-occupancy-detected state for a predetermined minimum interval, referred to as the "away-state confidence window" ("ASCW"), the auto-away feature triggers a state change from Home to Away-Normal. As a result of the state change to Away-Normal, the actual operating setpoint temperature is changed to a predetermined energy-saving away-state temperature ("AST"), regardless of the setpoint temperature indicated by the normal intelligent thermostat schedule.

One purpose of the auto-away feature is to avoid unnecessary heating or cooling when there are no occupants present to actually experience or enjoy the comfort settings of the schedule 4402, thereby saving energy. The AST may be set, as an example, to a predetermined value of 62 degrees for winter periods or outside temperatures that would call for heating and 84 degrees for summer periods or outside temperatures that would call for cooling. The AST temperatures for heating and cooling are user-settable, in certain implementations, through the schedule interface of a separate auto-away-feature interface.

The ASCW corresponds to a time interval of sensed non-occupancy after which a reasonably reliable operating assumption can be made, with a reasonable degree of statistical accuracy, that there are indeed no occupants in the enclosure. For most typical environments, it has been found that a predetermined period in the range of 90-180 minutes is a suitable period for the ASCW to accommodate common situations in which occupancy may not be detected by the occupancy sensor even though occupants are present, such as quiet book reading, stepping out to the corner mailbox, short naps, and other such periods.

According to some implementations, the ASCW is automatically adjusted following learning events. For example, according to one implementation, the ASCW is lengthened by a predetermined amount, such as 10-30 minutes, following a manual punishing event, such as, after a transition to Away-Normal mode, the user manually sets the setpoint temperature to maintain comfort, indicating that the enclosure is occupied despite the occupancy sensor indicating otherwise. Similarly, in certain implementations, the ASCW can be shortened upon several repeated transitions to Away-Normal state in the absence of any manual punishing event. Such modification of the ASCW can be used to better adapt the algorithm to the particular tendencies of the occupants and/or the effectiveness of the occupancy sensing due to other factors, such as physical placement of the intelligent thermostat/sensor. In certain implementations, the intelligent thermostat maintains a presence-probability scalar or map, as discussed in a preceding subsection, based on many different types of stored and received data, including stored and frequently updated determinations of occupancy patterns, sensor confidences, historical occupancy determinations, and many other such types of data, and can therefore reliably detect non-occupancy of the environment and invoke auto-away control-schedule adjustments. In these implementations, an ASCW may not be used, because corrective no-presence-to-presence events, or punishing events are fed back into the calculation of the presence-probability scalar or map in order to ensure that, when the presence probability falls below a threshold value, the probability of non-occupancy is sufficient to justify auto-away schedule adjustments. Alternatively, the ASCW may be shortened, or, rather than adjusting the ASCW, the intelligent controller may adjust the probability thresholds that trigger auto-away schedule adjustments.

Figure 44A:
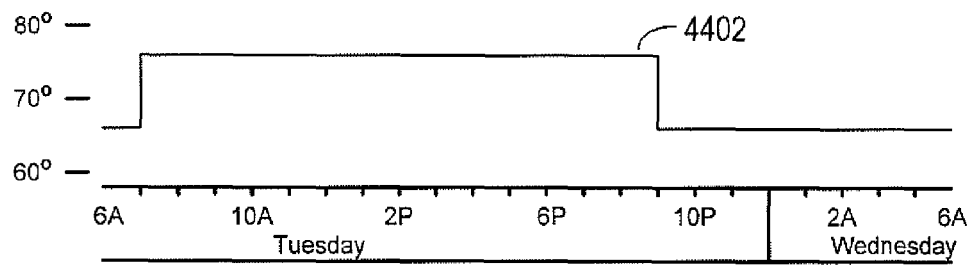
FIGS. 44A-D illustrate time plots of a normal setpoint temperature schedule versus an actual operating setpoint plot corresponding to an exemplary operation of an auto away/ auto arrival method.
Figure 44B:
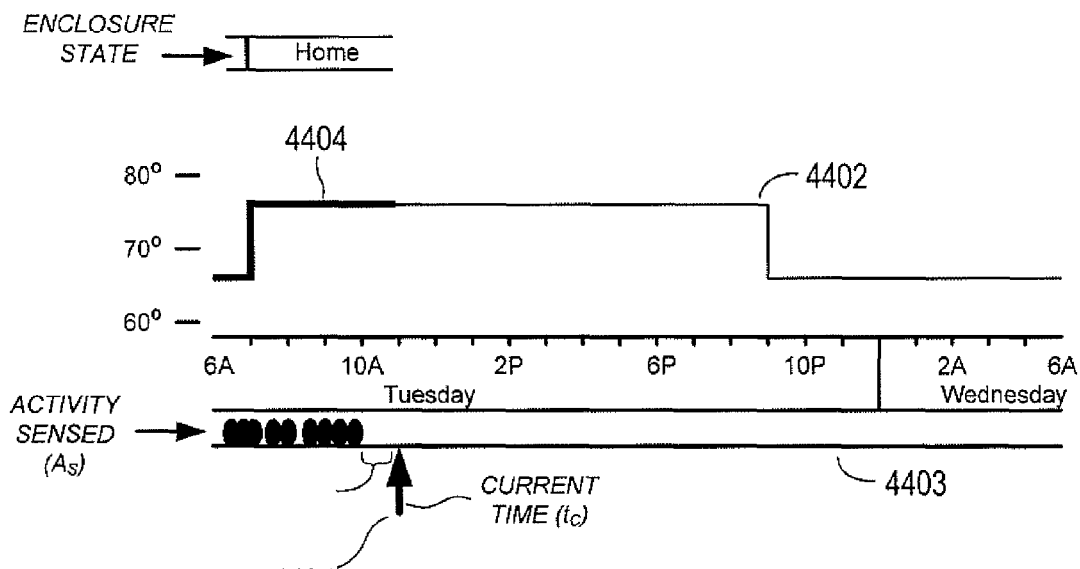

The example of FIGS. 44A-44D is provided in the context of a heating scenario with an ASCW of 120 minutes and an AST of 62 degrees. FIG. 44B shows a scheduled setpoint plot 4402 and actual operating setpoint plot 4404, along with a sensed activity timeline ("$A_S$") 4403 showing small black oval markers corresponding to sensed activity or, in other words, the buckets during which occupancy is sensed, that is current as of 11:00 AM 4405. As of 11:00 AM, there was significant user activity sensed up until 10:00 AM, followed by a one-hour interval 4406 of inactivity, without any buckets classified as being in the occupancy-detected state. Since the interval of inactivity in FIG. 44B is only about one hour, which is less than the ASCW, the auto-away feature does not yet trigger a change of state to the Away-Normal state.

Figure 44C:
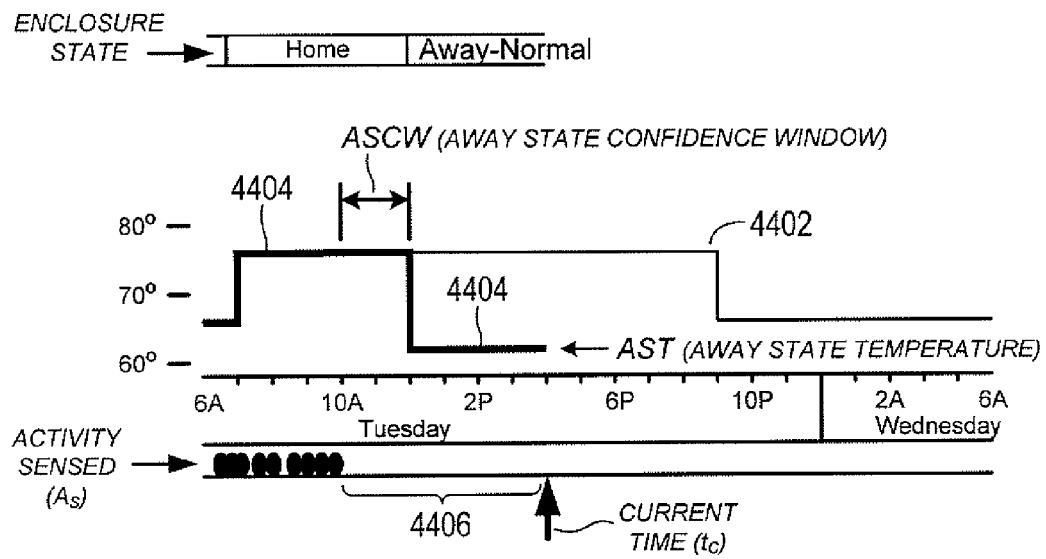

FIG. 44C shows the scheduled and actual setpoint plots as of 4:00 PM. As illustrated in FIG. 44C, an Away-Normal mode was automatically triggered at 12:00 PM after 120 minutes of inactivity, the actual operating setpoint 4404 adjusted from the normal scheduled setpoint 4402 to the AST temperature of 62 degrees. As of 4:00 PM, no activity has yet been sensed subsequent to the triggering of the Away-Normal mode, and therefore the Away-Normal mode remains in effect.

Figure 44D:
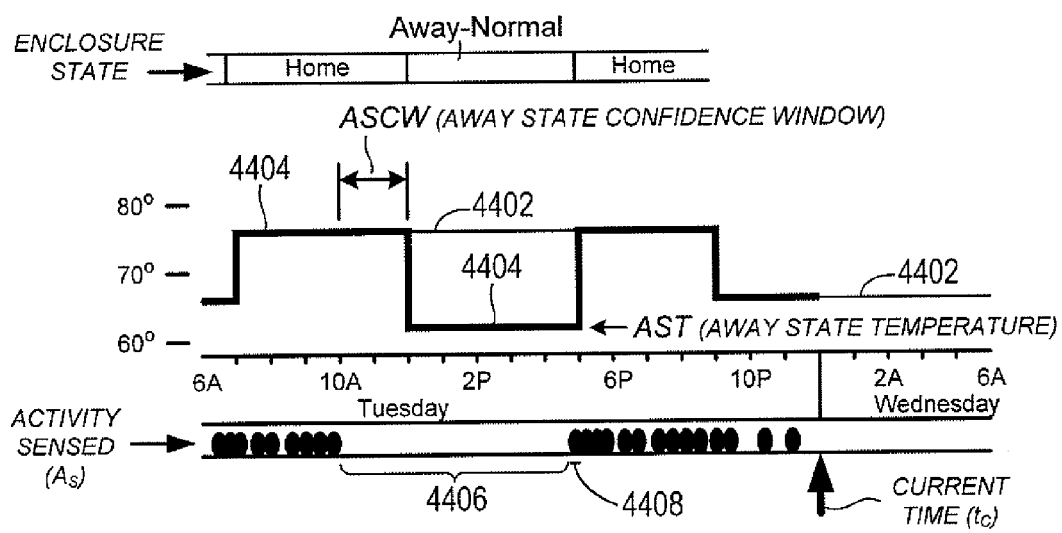

Referring to FIG. 44D, the scheduled and actual setpoint plots as of 12:00 AM are shown following the example shown in FIGS. 44A-C. As illustrated in FIG. 44D, occupancy activity began to be sensed, for a brief time interval 440,8 at about 5:00 PM, which triggered an auto-return or auto-arrival transition to the Home state, at which point the actual operating setpoint 4404 was adjusted back to the normal control schedule 4402

The example of FIGS. 44A-D illustrates an ASCW-based approach to implementing an auto-away feature. However, as discussed in the preceding subsection, in alternative implementations, auto-away schedule adjustments are triggered when the presence probability, or the probability of occupancy, falls below a threshold value. The presence probability is continuously updated, or updated intermittently, according to many different types of data and considerations, including multiple sets of recorded sensor output, determined and electronically stored patterns of occupancy determined over time, relative confidence in particular sensors, user mobile devices reporting user locations external to the controlled environment, and other such data. In such implementations, auto-away schedule adjustments are generally triggered more aggressively, depending, of course, on threshold settings, to avoid wasting energy maintaining occupancy-related control-schedule settings when the intelligent controller has determined, with high confidence and reliability, that no occupants are present. In certain implementations, a short ASCW may be retained, while, in other implementations, the ASCW may be entirely eliminated, with auto-away schedule adjustments triggered entirely by calculated occupancy probabilities, such as a presence-probability scalar or map, discussed in the preceding subsection.

In certain implementations, the ASCW-based approach may be used initially, until sufficient data is accumulated to provide for generation of an accurate presence-probability scalar or map, and may, as well, be used after intelligent-thermostat resets or large, disruptive changes in the controlled environment, in the system controlled by the intelligent thermostat, or in intelligent-thermostat settings and parameters. Once sensor confidence levels and the accuracy of a generated presence-probability scalar or map rises to an acceptable level, the intelligent thermostat may either greatly shorten the ACSW or eliminate the ASCW and rely only on presence probabilities. In these implementations, the initial period may alternatively be viewed as an auto-away-feature qualification period, with the auto-away feature not triggered or triggered only after a very long initial ASCW until the sensor confidence rises above a threshold value. For example, due to faulty or poorly positioned sensors, it may not be possible for the intelligent thermostat to determine occupancy and non-occupancy states with sufficient reliability to risk auto-away schedule adjustments.

Figure 45:
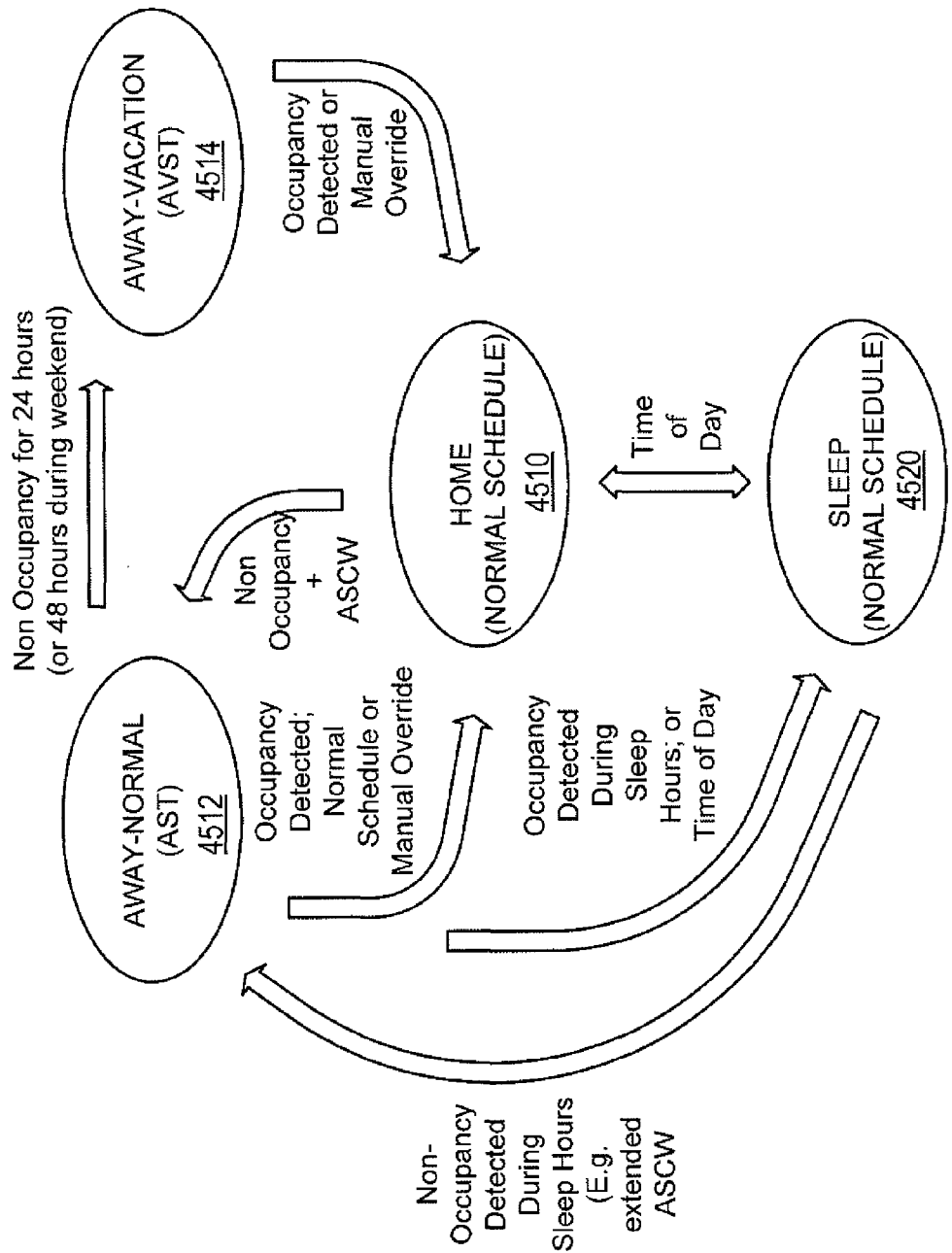
FIG. 45 is a diagram illustrating various states into which a conditioned enclosure may be classified.

FIG. 45 is a diagram illustrating various states into which a controlled environment may be classified. The intelligent thermostat classifies the controlled environment into one of the four previously described states: Home 4510; Away-Normal 4512; Away-Vacation 4514; and Sleep (4520). During normal operation, the controlled environment is classified as either being in the Home state 4510 or the Sleep state 4520 according to the time of day and a normal schedule. The Sleep state 4520 can be determined by predetermined hours, such as from 12:00 PM to 6:00 AM, may be set by the user according to the user's preferences, may be set according to the current schedule, such as schedule 4402 in FIG. 44A, which reflects a Sleep state between the hours of 9:00 PM and 7:00 AM, and may be set by a combination of these considerations and additional considerations based on additional types of data.

The normal schedule is intended to account for the usual or expected behavior of the occupants. As described, a controlled environment in the Home state 4510 can be automatically transitioned to the Away-Normal state 4512 when an unexpected absence is detected in order to save resources and costs. As described, the change from Home state 4510 to Away-Normal state 4512 can occur when non-occupancy is detected either for the ASCW time period, in those implementations that employ an ASCW, or when the presence probability falls below a threshold value. In certain implementations, the Away-Normal state 4512 mode can be changed based on sensed events, the passage of time, and/or other triggers that are consistent with saving energy when no occupants are present in the enclosure. For some implementations, the Away-Normal state 4512 maintains the setpoint temperature at the energy-saving AST temperature until one of the following occurs: (1) a manual immediate-control input is received from a user, transitioning the state back to the Home state 4510; (2) an auto-arrival mode of operation is triggered based on sensed occupancy activity, transitioning the state back to the Home state 4510; (3) the current time falls into normal occupant sleeping hours, and the current state is not the Away-Vacation state; or (4) the current time corresponds to that of a scheduled setpoint and the current state is not the Away-Vacation state.

In certain implementations, a controlled environment in the Away-Normal state 4512 is transitioned to the Away-Vacation state 4514 when the no-occupancy condition has been sensed for an extended predetermined minimum interval, referred to as the "vacation-state confidence window" ("VSCW"). In the Away-Vacation state 4514, the setpoint temperature is set to the away-vacation setpoint temperature ("AVST"), which represents an aggressive energy-conserving temperature level. For example, in one implementation, the AVST is, by default, 45 degrees F. during time when heating is called for and 95 degrees F. during times when cooling is called for. The VSCW is normally set to be much longer than the ASCW. For example, in many cases a VSCW of 24 hours is appropriate. In certain implementations, the VSCW is variable, for example ranging from 48 hours to 60 hours during weekend periods from Friday afternoon to Sunday night. A longer VSCW during weekend periods reduces mistakenly changing the setpoint temperature to the harsh AVST during shorter periods of non-occupancy, such as a short weekend trip. In certain implementations, a setpoint preconditioning feature cannot be employed while in the Away-Vacation state.

In certain implementations, during the Sleep state 4520, the auto-away feature becomes inactive. In these implementations, the state does not transition directly from Sleep to Away-Normal. Inactivating the auto-away feature avoids mistakenly changing the setpoint temperature to AST from the scheduled nighttime setpoint temperature when occupancy is not sensed. According to other implementations, occupancy sensing is altered during the Sleep state 4520 to be less sensitive to inactivity when detecting non-occupancy due to the much lower expected activity level and different activity patterns and locations during the time when the occupants are sleeping. In one example, the ASCW is extended during the Sleep state to four hours or six hours. According to other implementations, the threshold percentage of readings in each bucket of sensor readings is lowered in order to lower the probability of an erroneous classification of non-occupancy when the occupants are, in fact, asleep. In implementations that generate presence-probability scalars and/or maps based on various types of data, including historical occupancy patterns, the presence-probability-threshold-based methods for triggering the auto-away feature automatically take into account sleeping schedules in the various presence-probability-adjusting rules applied following generation of a cumulative presence probability, as discussed in the preceding subsection, preventing or significantly decreasing the likelihood of the auto-away feature being triggered while occupants are asleep.

Figure 46A:
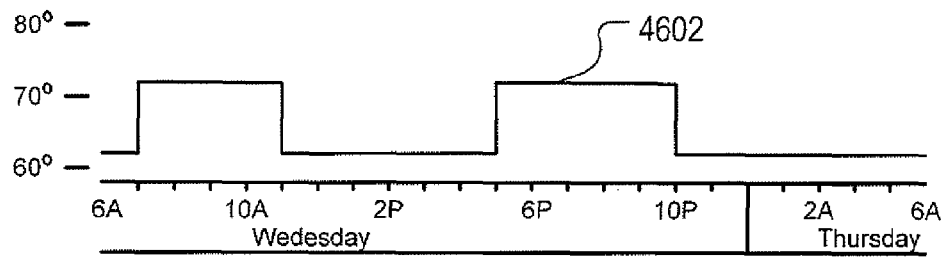

FIGS. 46A-F illustrate time plots of a normal control schedule versus an actual operating setpoint plot corresponding to operation of an auto-away/auto-arrival method. FIG. 46A shows an intelligent-thermostat schedule 4602 for a particular weekday, such as a Wednesday, for a user who is not normally home between the hours of 11:00 AM and 5:00 PM. The schedule 4602 consists of an awake/at home interval from 7:00 AM to 11:00 AM, and again from 5:00 PM to 10:00 PM during which time the setpoint temperature is 72 degrees F. The sleep temperature and the mid-day temperature are both set to 62 degrees F. In this example, the ASCW is 90 minutes and the AST is 60 degrees.

Figure 46B:
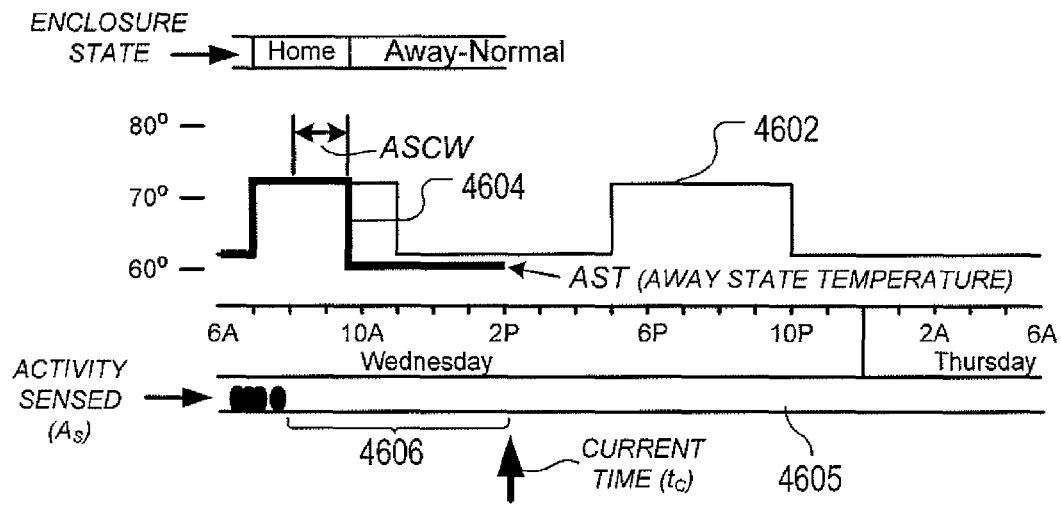

In FIG. 46B, the scheduled setpoint plot 4602 is shown along with the actual operating setpoint plot 4604. A sensed activity timeline ("$A_S$") 4605 includes small black oval markers corresponding to sensed activity and is current as of 2:00 PM. As of 2:00 PM, there was significant user activity sensed up until 8:00 AM, followed by an interval 4606 of inactivity. Upon failure to detect occupancy within the ASCW of 90 minutes, the auto-away feature is triggered at 9:30 AM and the state of the controlled environment transitions to Away-Normal state, with an auto-away control-schedule adjustment to the AST of 60 degrees F.

Figure 46C:
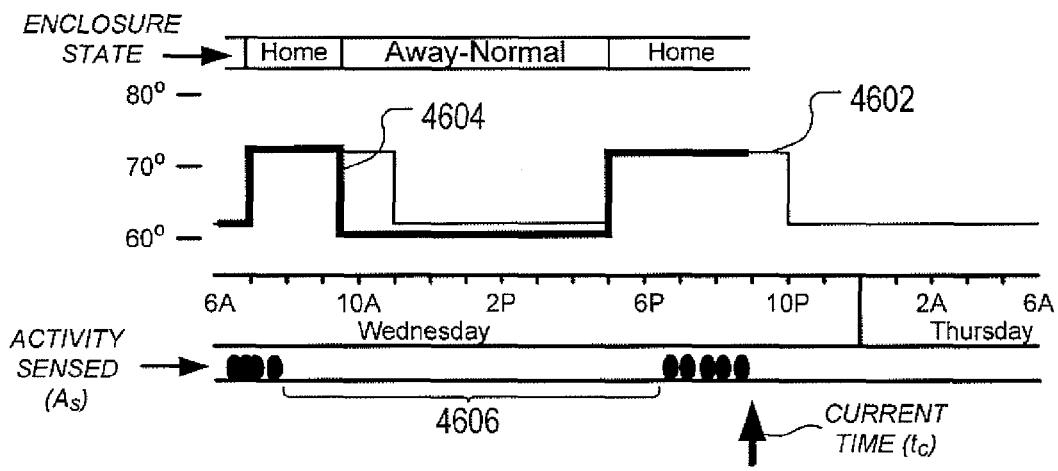

FIG. 46C shows the scheduled and actual setpoint plots 602 and 604, respectively, and sensed activity, that is current as of 9:00 PM. Note that, even though no activity was sensed at 5:00 PM, the state was changed to Home and the setpoint was changed to match the scheduled setpoint of 72 degrees. This state transition to the Home state without sensing occupancy occurs due to an expectation that, since the occupants normally arrive home by 5:00 PM, as reflected by the schedule 602, they will return at this time on the current. Note that, in the example shown in FIG. 46C, activity was sensed again beginning at about 6:15 PM.

FIG. 46D shows the scheduled and actual setpoint plots 4602 and 4604, respectively, and sensed activity, that is current as of 9:00 PM, according to a different example. In the example shown in FIG. 46D, no occupancy is detected in the evening through the current time of 9:00 PM. Accordingly, after the passage of the ASCW at 6:30 PM, the state of the controlled environment is changed to Away-Normal and the setpoint is changed to the AST of 60 degrees.

FIG. 46E shows the scheduled and actual setpoint plots 4602 and 4604, respectively, and sensed activity that is current as of 12:00 PM, according to the example shown in FIG. 46D. In this example, no occupancy is detected in the evening through the current time of 12:00 PM. At 10:00 PM, a scheduled setpoint causes the setpoint temperature maintained by the intelligent thermostat to change to the sleep setpoint temperature of 62 degrees. Since 10:00 PM is the start of the Sleep state, according to this example, the auto-away feature becomes inactive.

FIG. 46F shows the scheduled and actual setpoint plots 4602 and 4604, respectively, and sensed activity that is current as of 11:00 PM on the next day, Thursday, according to the example shown in FIGS. 46D-E. In this example, no occupancy has been detected during the entire period 4606 between 8:00 AM Wednesday and 11:00 PM Thursday. In this example, the auto-away feature is inactive during the Sleep state between 10:00 PM and 7:00 AM, and the setpoint is increased according to the schedule on Thursday morning at 7:00 AM. However, since no occupancy is detected, the auto-away feature triggers a state change back to the Away-Normal state following the ASCW interval at 8:30 AM and the setpoint is changed to the AST. Then, at 9:30 AM, the state of the controlled environment is changed to Away-Vacation, since a 24-hour VSCW has passed since the initial transition to the Away-Normal state and no occupancy has been detected in the interim. At 9:30 AM, the setpoint temperature is lowered to the AVST, which is 45 degrees F. in the current example. Note that, in certain implementations, the VSCW is measured from the time of the last detected occupancy rather than from the time of state transition to Away-Normal, which would result in a transition to the Away-Vacation state at 8:00 AM on Thursday.

In certain implementations the user is provided with an ability to vary the ASCW according to a desired energy saving aggressiveness. For example, a user who selects a highly aggressive energy-saving option can be provided with an ASCW of 45 minutes, with the result being that the system's auto-away determination will be made after only 45 minutes of inactivity. Various methods for subwindowing of the ASCW time period and filtering of sensed activity can be used to improve the reliability of the triggering of the auto-away feature and transitions to the Away-Normal state. Various learning methods for understanding whether sensed activity is associated with human presence or with other phenomena can also be used to improve the reliability of the triggering by the auto-away feature. In certain implementations, a background level of sensed activity corresponding to sensed events that are not the result of human occupancy can be interactively learned and/or confirmed based on the absence of corrective manual setpoint inputs during an Away-Normal period. For example, when there are no corrective manual setpoint changes for a period of time following triggering of the auto-away feature, and such absence of corrective input repeats itself on several different occasions, then it can be concluded that the type and/or degree of sensed activity associated with those intervals is confirmed as being background levels not associated with human presence, since otherwise some type of corrective activity on one or more of such occasions would have been expected.

In a manner similar to the auto-away occupancy evaluation, the triggering by the auto-arrival feature to the Home state may likewise be based on subwindowed time windows and/or filtering of the sensed activity, such that spurious events or other events not associated with actual human presence do not unnecessarily trigger the auto-return mode. As described above, in certain implementations, the sensing process involves separately evaluating five-minute subwindow buckets, or subwindows of other suitable time duration, for the presence or absence of sensed activity during those subwindows. When it is found that a threshold amount of activity is sensed in two adjacent subwindows, the auto-arrival feature triggers a state transition to the Home state or the Sleep state, depending on the time of day. See, for example, time 4408 of FIG. 44D. Upon triggering, the auto-return mode operates by returning the setpoint temperature to that of the normal control schedule 4402.

Certain implementations of intelligent thermostats provide for control-schedule modification based on occupancy patterns and/or corrective manual input patterns associated with repeated instances of auto-away triggering and/or auto-arrival triggering. Occupancy and/or corrective manual input behaviors associated with auto-away/auto-arrival features are continuously monitored and filtered at multiple time periodicities in order to detect patterns in user occupancy that can, in turn, be leveraged to trim or otherwise tune the control schedule to better match actual occupancy patterns. The multiple levels of time periodicity may include daily, weekly, monthly, yearly, and other periodicities logically linked to user behavior an occupancy patterns. Thus, for example, when a particular occupancy and/or corrective manual input behavior associated with auto-away/auto-arrival is observed for a series of successive Fridays, the control schedule for Fridays is adjusted to better match the indicated occupancy pattern. As another example, when a particular occupancy and/or corrective manual input behavior associated with auto-away/auto-arrival is observed for a series of Saturdays and Sundays, the control schedule for Saturdays and Sundays may be adjusted to better match weekend occupancy patterns.

Figure 47A:
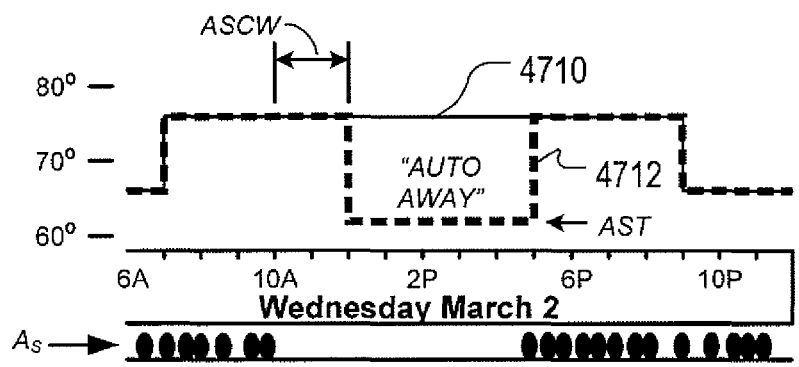
FIGS. 47A-D illustrate one example of control-schedule modification based on occupancy patterns and/or corrective manual input patterns associated with repeated instances of auto-away and/or auto-arrival triggering.
Figure 47B:
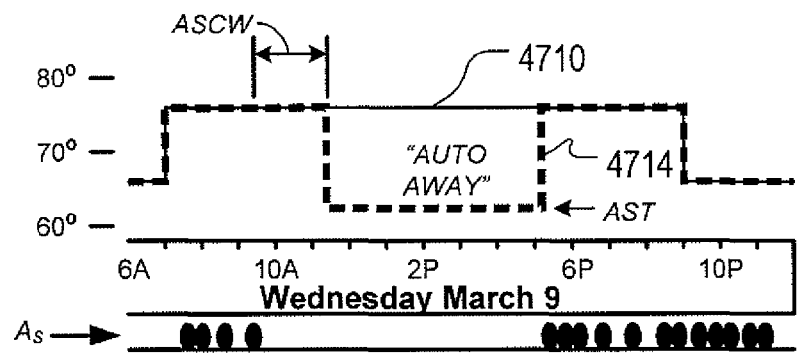
Figure 47C:
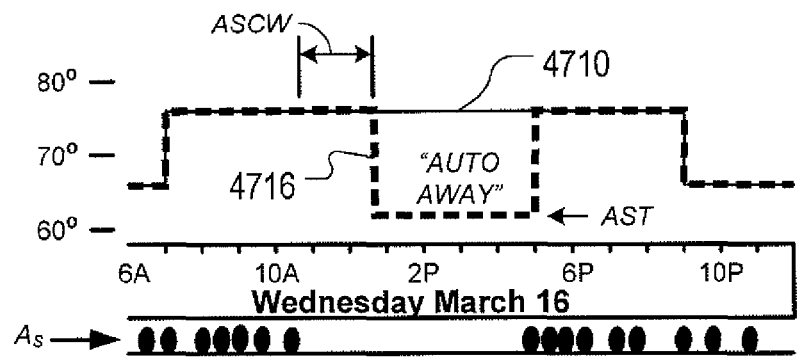
Figure 47D:
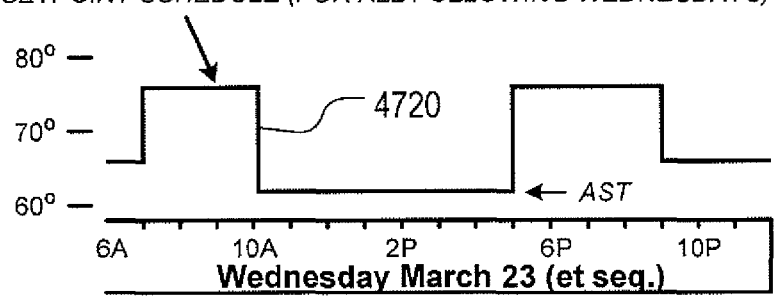

FIGS. 47A-D illustrate one example of control-schedule modification based on occupancy patterns and/or corrective manual input patterns associated with repeated instances of auto-away and/or auto-arrival triggering. Plot 4710 is the normal control schedule for FIGS. 47A-C, and plots 4712, 4714 and 4716 show the actual operating setpoint in FIGS. 47A, 47B, and 47C, respectively. Finally, plot 4720 shows the tuned or modified control schedule in FIG. 47D. For this example, it is observed over time that, for a user whose normal setpoint temperature indicates they are home all day on weekdays, that the auto-away feature triggers a transition to the state Away-Normal around noon on Wednesday over multiple weeks, as shown in FIGS. 47A-C, without any corrective manual user inputs, and that the auto-arrival mode is triggered around 5:00 PM for those days. This pattern may correspond, for example, to a retiree who has decided to volunteer at the local library on Wednesdays. Once this pattern has been reliably established, for example, after three successive Wednesdays, then, as illustrated in FIG. 47D, the normal control schedule is automatically tuned or trimmed so that, for the following Wednesday and all Wednesdays thereafter, there is an away period scheduled for the interval between 10:00 AM and 5:00 PM.

In certain implementations, a pattern is reliably established by two consecutive events, as, for example, based only two of the three Wednesdays in FIGS. 47A-C, rather than all three Wednesdays. Further, in certain implementations, the tuned or modified schedule 4720 is not automatically adapted, but is instead first proposed to a user for user approval. User acceptance may be solicited, for example, in cases where the user has indicated a preference to be asked about schedule updates, rather than schedule updates being automatically adopted. According to some other implementations, the new schedule 4720 is only adopted automatically or proposed to a user in cases where an estimated cost and/or energy saving is above a predetermined threshold or percentage.

Had a corrective immediate-control input occurred on one of the days illustrated in FIGS. 47A-C, referred to as a "corrective input" or a "punishing input," the control schedule may not have been automatically adjusted, as shown in FIG. 47D. Such corrective or punishing input could occur for circumstances in which (1) the auto-away mode has been triggered; (2) there is not enough sensed occupancy activity (after filtering for background events) for the auto-arrival feature to trigger a state change; and (3) the user becomes uncomfortable and has walked up to the intelligent thermostat to turn up the temperature. It may be the case that, instead of going to the library on Wednesday at 10:00 AM, the user went upstairs to read a book, with a sole first-floor intelligent thermostat not sensing the user's presence and triggering auto-away at 12:00 PM, after which the user becomes uncomfortable at about 12:45 PM, and then goes downstairs to manually turn up the temperature. Because the user's punishing input indicates that a potential occupancy pattern may be invalid or need further qualification, the control schedule is not automatically tuned to plot 4720, as shown in FIG. 47D, and, in one implementation, the potential pattern is at least partially weighted in a negative direction so that an even higher degree of correlation may be subsequently needed in order to establish the pattern as valid or reasonably predictive. For the more general case, the user's punishing inputs may also be used to adjust the type and/or degree of filtering that is applied to occupancy sensing because there has clearly been an incorrect conclusion made based on inactivity sensed for the time interval leading up to the punishing corrective input.

The auto-away/auto-arrival features in the above-described implementations are triggered by currently sensed occupancy information. In other implementations, automated self-triggering of the auto-away/auto-arrival features are based on an occupancy probability time profile generated by the intelligent thermostat over an extended period of time. For one implementation, the occupancy probability time profile is expressed as a time plot of a scalar value representative of the probability that one or more humans is occupying the enclosure at each particular point in time. Any of a variety of other expressions, including probability distribution functions and random variable representations that reflect occupancy statistics and/or probabilities can alternatively be used.

For one implementation, the intelligent thermostat is configured to self-trigger and transition to the Away-Normal state at one or more times during the day that meet the following criteria: (1) the normal control schedule is indicative of a scheduled at-home time interval; (2) the occupancy probability is below a predetermined threshold value; (3) the occupancy sensors do not sense a large amount of activity that would unambiguously indicate that human occupants are indeed present in the enclosure; and (4) the occupancy sensors have not yet sensed a low enough level of activity for a sufficiently long interval to transition to the auto-away mode in the manner previously described. Once these conditions are met and the auto-away mode has been self-triggered, transition out of the auto-away mode can proceed in similarly to that performed by the conventional auto-away mode. Automated tuning of the control schedule based on the lessons learned can be based on the combined observations from the conventionally triggered auto-away-mode and the self-triggered auto-away-mode methods.

The above-described self-triggering of the auto-away mode, which is based at least in part on occupancy probability, has been found to provide for more complete and more statistically precise tuning of the control schedule when compared to tuning that is based only on the conventional auto-away triggering method in which only current, instantaneous occupancy information is considered. One reason relates to the large number of activity-sensing data samples used in generating the occupancy probabilities. From one perspective, the auto-away process can be thought of as a way to automatically test a user's environment to learn more detail about the user's occupancy patterns without needing to ask the user detailed questions, without needing to rely on the correctness of user responses, and without needing to rely exclusively on the instantaneous accuracy of the occupancy sensing hardware.

Figure 48:
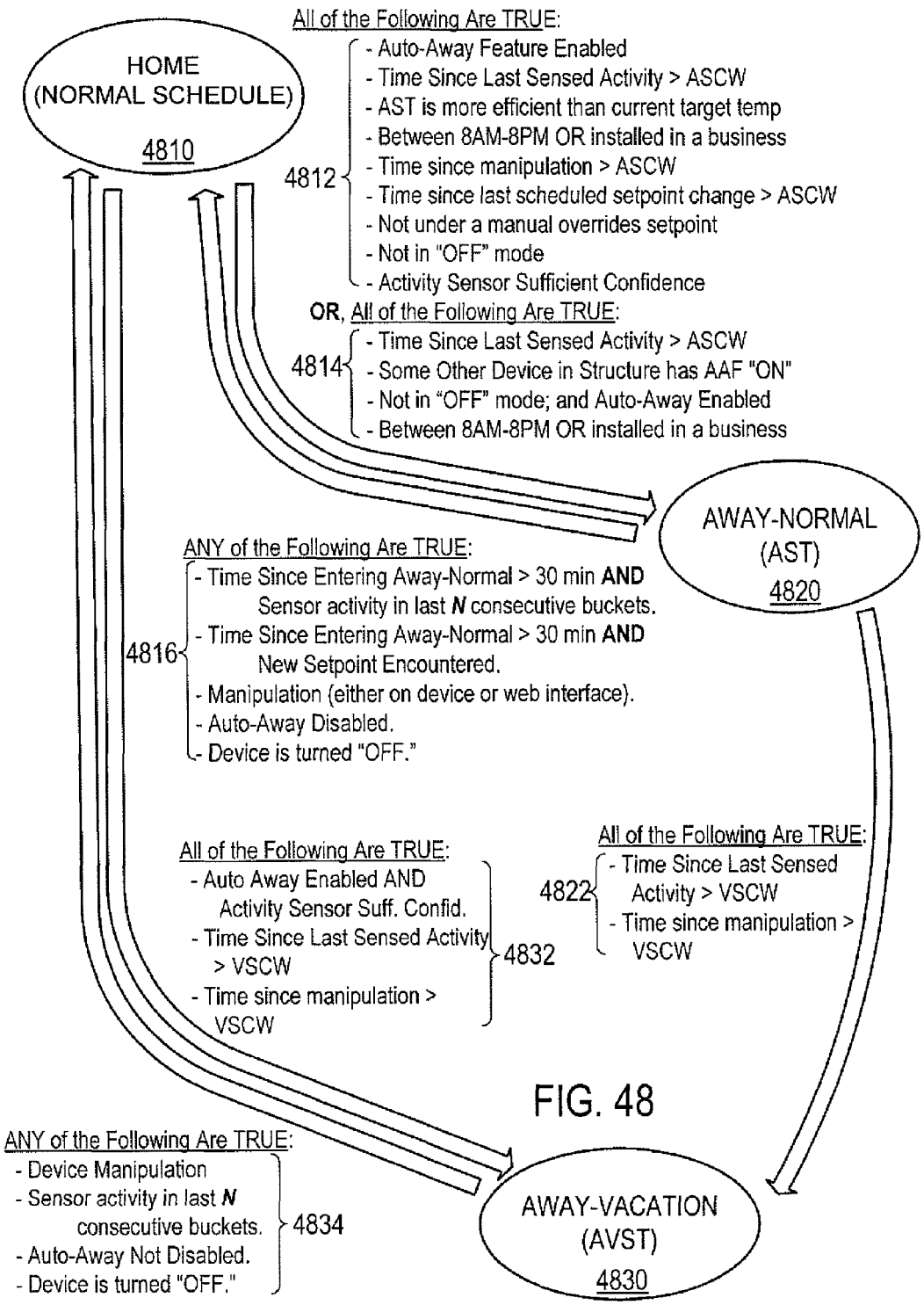
FIG. 48 is a diagram illustrating various states into which a conditioned enclosure may be classified.

FIG. 48 is a diagram illustrating various states into which a controlled environment may be classified. The implementations of FIG. 48 represent one or more features of an auto-away/auto-arrival method that can be used as an alternative to or, in some cases, in conjunction with the implementations described with reference to FIG. 45. Notably, there is no separate Sleep state for the implementation shown in FIG. 48. Rather than including a separate Sleep state, a condition is provided for entering into an Away-Normal state 4820 that specifies that the time of day is not between 8:00 PM and 8:00 AM when the controlled environment is not a business. The state will transition from Away-Normal state 4820 to Home state 4810 for non-businesses during the hours of 8:00 PM and 8:00 AM Shown in FIG. 48 are three states: Home state 4810, in which the intelligent thermostat generally follows a control schedule; Away-Normal state 4820, during which the setpoint temperature is set to an energy saving level, such as the AST; and Away-Vacation state 4830 during which the setpoint temperature is set to an energy saving level such as the AVST. In certain implementations, the AST and the AVST are set to the same temperature. Depending on the particular manner in which state of the controlled environment has transitioned to the Home state 4810, the Home state 4810 can alternatively be considered an arrival state, an auto-arrival state, or a manual-arrival state.

In certain implementations, transitioning from the Home state 4810 to the Away-Normal state 4820 may occur when either (1) all of a first set of conditions 4812 are met; or (2) all of a second set of conditions 4814 are met. The conditions 4812 include the auto-away feature being enabled and the time since the last sensed activity being greater than an ASCW, which, in certain implementations, is initially set to 120 minutes. In certain implementations, the activity sensor data is collected into time buckets, and the method looks for a number of consecutive empty buckets to make a determination that that there is no sensed occupant activity. According to certain implementations, the buckets are five minutes in duration, and the ASCW is initially implemented as being equal to 24 buckets. However, according to some implementations, other sizes of buckets and numbers of buckets can be used, or other schemes of detecting occupancy (or non-occupancy) can be implemented.

The conditions 4812 also include the away setpoint temperature being at least as efficient as the setpoint temperature currently in effect, since, otherwise, moving to an Away-Normal state would not conserve energy. As stated previously, the conditions for entering the Away-Normal state from a Home state further include that the time of day be between 8:00 AM and 8:00 PM (or other suitable non-sleep time interval) for a residential installation. Such limitations may not be used for business installations, since occupants generally do not sleep in business environments and transition to the energy-saving Away-Normal state for those hours is likely to save significant amounts of energy. Conditions 4812 further include a condition that the time since a most recent manipulation should be less than the ASCW, where manipulation refers to either a manual immediate-control input to the intelligent or an interaction via a remote web and/or PC interface that transitions the intelligent thermostat out of the Away-Normal state. For example, consider a scenario in which an occupant leaves his or her dwelling at 9:00 AM and goes to work in an office. At the office, the user logs in remotely, either directly to the intelligent thermostat or via a cloud-based server, and makes a change to one or more intelligent-thermostat settings at 10:00 AM. Assuming that the other of conditions 4812 have been satisfied starting at 11:00 AM, the Away-Normal state 4820 is not be entered until noon (10:00 AM plus the two-hour ASCW) rather than at 11:00 AM, due to the manipulation at 10:00 AM.

The conditions 4812 also include that the time since the last scheduled setpoint change is greater than the ASCW. For example, when the occupants leave a dwelling at 5:00 PM, there is a scheduled setpoint change at 6:00 PM, and the ASCW has a duration of two hours, the Away-Normal state is not entered until at least 8:00 PM, rather than at 7:00 PM. The conditions 4812 also include a condition that, when the intelligent thermostat is operating according to a manual override or a user has performed an equivalent action over the remote network interface, the Away-Normal state is not entered as long as the manual-override setpoint is in effect. Notably, in certain implementations, a manual override remains in effect until a next scheduled setpoint is encountered. As one example, when a user is at home during normal work hours and manually raises the setpoint temperature from the usual scheduled setpoint temperature, assuming there are no scheduled setpoints that take effect during the day, the manual override remains in effect until the end of the working day, when a scheduled setpoint raises the temperature. Due to this no-manual-override condition, the Auto-Away mode will not take effect during a day when the user is at home sick and has manually turned up the dial before going back to bed. The conditions 4812 also include a condition that the intelligent thermostat should not be in the OFF mode. Another of the conditions 4812 is that, when the intelligent thermostat does not yet have enough confidence that its occupancy sensors are producing sufficiently reliable occupancy data, the Away-Normal state 4820 is not entered. This can be the case, for example, when the intelligent thermostat has been installed in a place in a home that cannot detect occupant activity reliably, such as behind a bookshelf or at the end of a dead-end hallway. By automatically processing sensor data over a period of time after installation and comparing this data to other information, such as times of day and manual walk-up user dial interactions, the intelligent thermostat may disqualifying the auto-away feature due to low sensor confidence.

The conditions 4814 pertain to situations in which there are multiple intelligent thermostats installed in the same structure, described, in further detail, below. As will be discussed in further detail, greater than a threshold number of installed intelligent thermostats need to agree before cooperatively transitioning to an Away-Normal state. When there is another remote intelligent thermostat in a controlled environment which has an auto-away flag ("AAF") set to ON, an intelligent thermostat may set its AAF to ON providing the intelligent thermostat has not sensed any activity within the ASCW, is not turned OFF, auto-away is enabled, and the time is not between 8:00 PM and 8:00 AM for a non-business structure. In certain implementations, an intelligent thermostat does not interfere with another intelligent thermostat's decision to transition to an Away-Normal state even when the intelligent thermostat has low sensor confidence.

Referring again to FIG. 48, once an intelligent thermostat has transitioned to the Away Normal state 4820, the intelligent thermostat remains in that state until either (1) a first set of conditions 4816 are met, in which case the intelligent thermostat transitions back to the Home state 4810, or (2) a second set of conditions 4822 are met, in which case the intelligent thermostat transitions to an Away-Vacation state 4830. For transitioning back to Home from Away-Normal, the conditions 4816 include an auto-arrival determination. One condition that has been found particularly useful implements a latch mechanism for Away-Normal state, so that when the intelligent thermostat transitions to the Away-Normal state, that state is latched for a certain period of time and will not return to the Home state even when there would otherwise be an auto-arrival determination, the period of time referred to as an "auto-arrival inhibition window" ("AAIW"). When the time since entering the Away-Normal state 4820 is within the AAIW, as will be described in further detail with respect to FIG. 49, the intelligent thermostat remains in the Away-Normal state 4820 even though activity is sensed and/or a scheduled setpoint is encountered. The AAIW, in certain implementations, is set to 30 minutes. When the AAIW has passed, sensor activity in N consecutive buckets causes a return to the Home state 4810. The value of N, in certain implementations, can be adjusted to make the auto-arrival function more or less sensitive to detected activity. In certain implementations, the value of N is initially set to two, so that when there is sensed activity for two consecutive buckets, an auto-arrival occurs. When the AAIW has passed, an encountered scheduled setpoint also causes an auto-arrival. A walk-up manual interaction with the intelligent thermostat and/or a remote-access manual interaction can also transition the intelligent thermostat out of the Away-Normal state 4820 and back to Home state 4810. Finally, the intelligent thermostat returns to the Home state 4810 when either the auto-away feature is disabled or the intelligent thermostat is turned OFF. The described auto-away and auto-arrival functionalities of FIGS. 44A-50B are often provided in conjunction with independent manual away and arrival functionality. In some implementations, an ability is provided to a user to directly and instantly invoke an Away mode, either by walking up to the intelligent thermostat dial and selecting Away on a menu or by selecting an Away button or menu choice using the remote-access facility. For such a case, which can be termed a manual away mode, the intelligent thermostat operates continuously at the energy-saving AST, regardless of what the schedule would otherwise dictate and regardless of any sensed occupant activity until the user manually transitions the intelligent thermostat out of the manual away mode via a manual arrival. For some implementations, a manual arrival is achieved by walking up to the dial and providing any type of input or by carrying out any kind of interaction upon logging into the remote network access facility.

Referring now again to FIG. 48, the intelligent thermostat can transition from the Away Normal state 4820 to the Away-Vacation state 4830 when all of the conditions 4822 are met. To move to the Away-Vacation state 4830, the time since the last sensed activity needs to be greater than the VSCW, which, according to certain implementations, is 48 hours. Also, the time since the last manipulation needs also to be greater than the VSCW.

In certain implementations, transitioning from the Home state 4810 directly to the Away-Vacation state 4830 occurs when all of the conditions 4832 are met. Note that, in many cases the Away-Vacation state 4830 is entered from the Away-Normal state 4820 rather than from the Home state 4810. In other cases, however, the intelligent thermostat state can transition directly to the Away-Vacation state from the Home state. Thus, for example, in a typical situation in which there are four scheduled setpoints per day, representing wake, work, evening, and sleep, for example, but the user has left on vacation, the intelligent thermostat will transition between Away-Normal and Home for the first day or two, transitioning from Away-Normal back to Home for each scheduled setpoint, and then returning to Away-Normal after each ASCW has expired until the VSCW is reached. When the intelligent thermostat is in Home mode at the time the VSCW is reached, then the state transitions directly from Home to Away-Vacation, whereas, when the intelligent thermostat is in Away-Normal mode at the time the VSCW is reached, the state transitions directly from Away-Normal to Away-Vacation. When there are very frequently scheduled setpoint changes, the Away-Normal state may never be entered and the intelligent thermostat will go directly from Home to Away-Vacation when the VSCW is reached. Conditions 4832 dictate that, to move from Home state 4810 to the Away-Vacation state 4830, the auto-away function needs to be enabled and the activity sensors should have sufficient confidence. Additionally, as in the case of conditions 4822, the time since the last sensed activity and the time since the last manipulation should be greater than the VSCW.

In certain implementations, transitioning from the Away-Vacation state 4830 back to the Home state 4820 can happen when any of the conditions 4834 are met. The conditions 4834 include any manual manipulation of the intelligent thermostat, sensing of activity in N consecutive, or when auto-away is disabled or the intelligent thermostat is turned off.

In certain implementations, different types of corrective no-presence-to-presence events are recognized. A first type of corrective no-presence-to-presence event involves detection of occupancy within a first threshold amount of time following transition to an AWAY state, in which case the threshold presence probability for triggering a transition to an Away state may be increased by a first fixed amount or by an amount relative to the current threshold value, do decrease the likelihood of subsequent erroneous transitions to the Away state. The increase may expire after a fixed or user-established period of time, or may gradually expire. A second type of corrective no-presence-to-presence event involves an immediate-control input through the local intelligent-thermostat immediate-control interface within a second threshold amount of time following transition to an AWAY state, in which case the threshold presence probability for triggering a transition to an Away state may be increased by a second amount, generally greater than the first amount used for the first type of corrective no-presence-to-presence event.

Further detail is now provided regarding the ASCW and the AAIW. FIG. 49 illustrates plots 4910 and 4920 that relate to the determination of optimal time thresholds for (1) triggering an auto-away state; and (2) temporarily inhibiting an auto-arrival state upon entry into an auto-away state, based on empirical data from a population of actual households. In the example of FIG. 49, the experiment is performed for a single household, but the method is readily generalized for multiple households by suitable statistical combinations of individual results. The experiment can proceed as follows: for a time period of NDAYS (which may be, for example, a 30-day period although other durations are readily applicable), occupancy-sensor activity is tracked for the household and characterized in terms of time buckets of a predetermined duration, such as five minutes. The occupancy pattern is characterized by a binary function $E(k)$ that, for any particular time bucket, is equal to 0 when there is no sensed activity in that interval and is equal to I when activity is sensed in that interval. FIG. 49 shows a plot 4910 of the function $E(k)$ that characterizes 288 time buckets for each day for a period of NDAYS, where there is a mark 4912 representative of each occupancy event. According to one implementation, the predictive value that any particular occupancy event may have with respect to subsequent occupancy events occurring is characterized and the characterizations are processed to determine optimal auto-away thresholds. Such characterizations may be generated by forming a plot of subsequent occupancy event arrival times for each occupancy event and then summing those plots over all occupancy events to form a histogram. These steps are equivalent to computing an auto-correlation of the function $E(k)$, which is shown at plot 4920. It has been found that, for practical experimental data taken over a population of households, the autocorrelation function, or a suitable smoothed version of the autocorrelation function, has a central lobe that falls to a valley somewhere near a first time value T1 and a first side lobe that begins rising out of that valley at a subsequent time T2. In one implementation, the value T1 is used as a time threshold for triggering an auto-away state while the difference (T2–T1) is used as the time interval for temporarily inhibiting an auto-arrival state upon entry into an auto-away state. In one series of experiments, it was found that T1 is approximately 120 minutes while T2 is approximately 150 minutes. In one implementation, there is a single set of thresholds T1 and T2 used in all intelligent thermostats that are provisioned to customers, these numbers being computed previously during product development based on large statistical samples. For other implementations, the process shown in FIG. 49, including occupancy-event tracking, autocorrelation, and determination of T1 and T2 from the lobes of the autocorrelation plot, is automatically performed by the intelligent thermostat for each individual installation, thereby providing a custom set of thresholds T1 and T2 that are optimal for each particular household. For still other implementations, the occupancy-event tracking is performed by each intelligent thermostat, while the plots E(k) are communicated up to a cloud server for performing the described autocorrelation and/or any of a variety of other statistical algorithms to determine optimal values for T1 and T2. The cloud server then downloads values for T1 and T2 to the individual intelligent thermostats.

In certain implementations, adjustments or adaptations can be made to improve the auto-away auto-arrival behavior. When a user manually enters an away mode, it may be assumed that the residence is unoccupied and, when the occupancy sensors detect activity, then it may be assumed that the activity detection is erroneous. Accordingly, in certain implementations, during an Away-Manual state, a check is made to see whether or not an auto-arrival had been detected by the activity sensors. When such activity is detected, then the occupancy detection is adjusted to render auto-arrival less sensitive). According to one implementation, when sensor activity is detected in the last N consecutive buckets within the previous 30 minutes of an Away-Manual state, the number N is incremented by one.

According to another example, when a user manually inputs a temperature setting to a temperature below the least energetic setpoint, then it can be assumed that the user expects the structure to become non-occupied. This can be interpreted as entering a Manual Away state and, accordingly, when sensor activity is detected in the last N consecutive buckets within the previous 30 minutes, the number N is incremented by one to make the auto-arrival less sensitive.

In certain implementations the ASCW is adjusted based on a punishing behavior. For example, when the user manually brings the device from Away-Normal state 4820 back to Home state 4810 within the first 30 minutes of entering the Away-Normal state 4820, then the ASCW is increased. It has been found that increasing the ASCS by 30 minutes upon such occurrence is enhances the operation of the auto-away functionality in many cases. The intelligent thermostat may automatically operate to ratchet the ASCW back down when it reaches a time length at which the Away-Normal state becomes rarely invoked. In certain implementations, the ASCW is increased to a maximum ASCW, beyond which no further increases are carried out despite the occurrence of additional punishing events.

In certain implementations, the above-described auto-away functionality is integrated with other aspects of the operation of intelligent-thermostat hardware in a manner that achieves other desirable results. In one implementation, the existence and circumstances of the AAIW are advantageously leveraged to conserve electrical power consumption that would otherwise be used by and/or triggered by the occupancy-detection hardware. Thus, in one implementation, the occupancy-sensing hardware in the intelligent thermostat is disabled during the AAIW since there is no need to sense something when no action can be taken. For other implementations, the occupancy-sensing hardware can be disabled during Manual-Away mode and/or Away-Vacation mode, for similar reasons.

In some implementations, the intelligent thermostat is an advanced, multi-sensing, microprocessor-controlled intelligent or learning intelligent thermostat that provides a rich combination of processing capabilities, intuitive and visually pleasing user interfaces, network connectivity, and energy-saving capabilities, including the presently described auto-away/auto-arrival features, while, at the same time, not requiring a so-called C-wire from the HVAC system or line power from a household wall plug, even though such advanced functionalities may draw more power than a power-stealing feature, which extracts small amounts of electrical power from one or more HVAC call relays, can safely provide. The intelligent thermostat achieves these goals at least by virtue of the use of a rechargeable battery or equivalently capable onboard power-storage medium that recharges during time intervals in which the hardware power usage is less than what power stealing can safely provide, and that will discharge to provide the needed extra electrical power during time intervals in which the hardware power usage is greater than what power stealing can safely provide.

In order to operate in a battery-conscious manner that promotes reduced power usage and extended service life of the rechargeable battery, the intelligent thermostat is provided with both (1) a relatively powerful and relatively power-intensive first processor that is capable of quickly performing more complex functions, including as driving a visually pleasing user-interface display and performing various automated learning computations; and (2) a relatively less powerful and less-power-intensive second processor for performing less computationally-intensive tasks, including driving and controlling the occupancy sensors. To conserve valuable power, the first processor is maintained in a sleep state for extended periods of time and is activated only for occasions when first-processor capabilities are needed, whereas the second processor is more or less continuously activated to perform relatively low-power tasks. The first and second processors are mutually configured so that the second processor can wake the first processor on the occurrence of certain events, which can be termed wake-on facilities. These wake-on facilities can be turned on and turned off as needed to achieve various functional and/or power-saving goals. For example, a wake-on-PROX facility can be provided to allow the second processor, when detecting a user's hand approaching the intelligent thermostat dial via an active proximity sensor, to wake up the first processor so that it can provide a visual display to the approaching user and be ready to respond more rapidly when the user's hand touches a thermostat dial. As another example, a wake-on-PIR facility can be provided to allow the second processor to wake up the first processor when detecting motion somewhere in the general vicinity of the intelligent thermostat via a passive infrared motion sensor. Notably, wake-on-PIR is not synonymous with auto-arrival, as there would need to be N consecutive buckets of sensed PIR activity to invoke auto-arrival, whereas only a single sufficient motion event can trigger a wake-on-PIR wake-up.

The wake-on-PROX facility is most often continuously enabled, since the PROX sensor is preferably configured to detect meaningful user motion very near the intelligent thermostat. In one implementation, the wake-on-PIR facility is not activated in a Home state so that electrical power for the intelligent thermostat is conserved by avoiding unnecessary wake-ups of the first processor, while the wake-on-PIR facility is activated during an AwayNormal state, so that the first processor is able to assess the meaning of detected motion activity. In one implementation, however, the wake-on-PIR facility is kept inactive during the AAIW to further save power, since the intelligent thermostat does not transition to auto-arrival mode during the AAIW.

In one implementation, the following wake-on and first-processor wake-up rules are applicable. As discussed above, the wake-on-PIR facility is disabled during the Home state.

During the Away-Normal state, when the time since entering that state is less than the AAIW, the wake-on-PIR facility is disabled but a timer is set to wake up the first processor at the end of that 30 minute interval. During the Away-Normal state, when the time since entering that state is more than the AAIW, the wake-on-PIR facility is enabled, and a timer is set to wake up the first processor at the effective time of the next setpoint in the intelligent thermostat schedule. During the Away-Normal state, when there has been a wake-on-PIR event, the wake-on-PIR facility is disabled for the remaining duration of the time bucket interval used for auto-arrival determination, and a timer is set to wake up the first processor at the beginning of the next bucket interval. This saves power for the remainder of that bucket interval, because the wake-on-PIR event has already filled that bucket and any additionally sensed wake-on-PIR events during that bucket would be superfluous. The wake-on-PIR facility is then re-activated at the beginning of the next bucket interval. Electrical power is conserved while, at the same time, enabling the detection of N contiguous buckets of sensed activity.

An analogous power-preserving scheme can also be employed for the Away-Vacation state. In the Away-Vacation state, when the time since entering that state is less than some threshold time period, the wake-on-PIR facility is disabled but a timer is set to wake up the first processor at the end of that interval. In the Away-Vacation state, when the time since entering that state is more than that threshold time period, the wake-on-PIR facility is enabled and a timer is set to wake up the first processor in 24 hours. During the Away-Vacation state, when there has been a wake-on-PIR event, the wake-on-PIR facility is disabled for the remaining duration of the time bucket interval used for auto-arrival determination and a timer is set to wake up the first processor at the beginning of the next bucket interval, thereby conserving electrical power for the remainder of the current bucket interval.

Figure 50A:
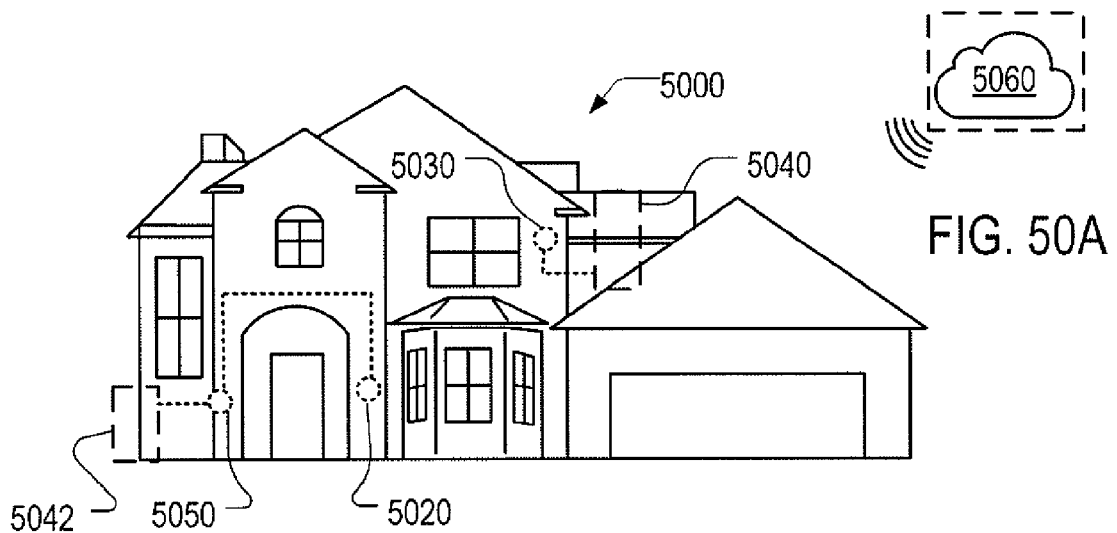
FIG. 50A illustrates a particular enclosure, such as a family home, which has three thermostats connected to two different HVAC systems.

Further detail is provided below with respect to operation when multiple intelligent thermostats are installed, in certain implementations. FIG. 50A illustrates a particular controlled environment, such as a family home, which has three intelligent thermostats connected to two different HVAC systems. The controlled environment 5000 includes intelligent thermostats 5010 and 5020, which control a downstairs HVAC system 5042 located on a downstairs floor, and intelligent thermostat 5030, which controls an upstairs HVAC system 5040 located on an upstairs floor. Where the intelligent thermostats have become logically associated with a same user account at a cloud-based management server 5060, the three intelligent thermostats cooperate with one another in providing optimal HVAC control of the controlled environment. Such cooperation between the three intelligent thermostats can be direct peer-to-peer cooperation or can be supervised cooperation in which the central cloud-based management server supervises them as one or more of a master, referee, mediator, arbitrator, and/or messenger on behalf of the two intelligent thermostats. In one example, an enhanced auto-away capability is provided an Away operational mode is invoked only when both of the intelligent thermostats have sensed a lack of activity for a requisite period of time. For one implementation, each intelligent thermostat sends an away-state vote to the management server 5060 when it has detected inactivity for the requisite period, but does not transition to an away state until permission is received from the management server. In the meantime, each intelligent thermostat sends a revocation of the intelligent thermostat's away-state vote when it detects occupancy activity in the controlled environment. The central management server 5060 sends away-state permission to all three intelligent thermostats only when there are current away-state votes from each. Once in the collective away-state, when any of the intelligent thermostats sense occupancy activity, the intelligent thermostat sends a revocation to the cloud-based management server 5060, which, in turn, sends away-state permission revocation, or an arrival command, to all three of the intelligent thermostats. Many other types of cooperation among the commonly paired intelligent thermostats can be implemented, as discussed in the preceding subsection.

Figure 50B:
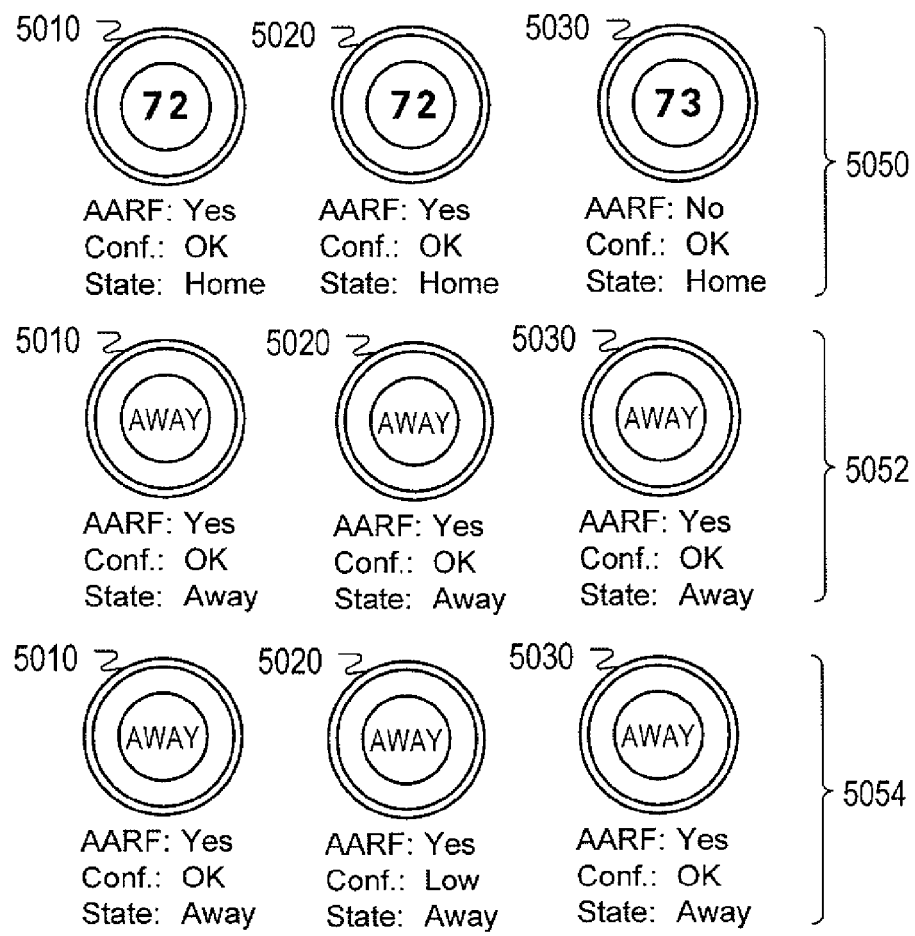
FIG. 50B illustrates examples of implementation of auto-away functionality for multi-thermostat installation settings.

FIG. 50B illustrates examples of implementation of auto-away functionality for multi-intelligent-thermostat installation settings. One method by which the group of intelligent thermostats, including intelligent thermostats 5010, 5020 and 5030, can cooperate to provide enhanced auto-away functionality is by each intelligent thermostat maintaining a group state information object that includes: (1) a local auto-away-ready ("AAR") flag that reflects whether that individual intelligent thermostat is auto-away ready, and (2) one or more peer AAR flags that reflect whether each of the other intelligent thermostats in the group considers itself to be auto-away ready. The local AAR flag for each intelligent thermostat appears as a peer AAR flag in the group-state-information object of each of the other intelligent thermostats in the group. Each intelligent thermostat is permitted to change its own local AAR flag but is permitted only to read peer AAR flags. It is a collective function of the central cloud-based management server and the intelligent thermostats to ensure that the group-state-information object in each intelligent thermostat is maintained with fresh information and, in particular, that the peer AAR flags are kept current. This can be achieved, for example, by programming each intelligent thermostat to immediately communicate any change in the intelligent thermostat's local AAR flag to the management server, at which time the management server can communicate the change immediately to each other intelligent thermostat in the group to update the corresponding peer AAR flag. Other methods of direct peer-to-peer communication among the intelligent thermostats can also be used.

In one implementation, the intelligent thermostats operate in a consensus mode so that each intelligent thermostat only enters into an actual away state when all of the AAR flags for the group are set to YES or READY. Therefore, at any particular point in time, either all of the intelligent thermostats in the group are in an away state or none of the intelligent thermostats are in the away state. In turn, each intelligent thermostat is configured and programmed to set the intelligent thermostat's AAR flag to YES when either or both of two sets of criteria are met. The first set of criteria is met when the following are true: (1) there has been a period of sensed inactivity for a requisite inactivity interval according to the intelligent thermostat's occupancy sensor; (2) the intelligent thermostat has determined that the occupancy-sensing features are sufficiently reliable and accurate for activation of the auto-away feature; and (3) other basic reasonableness criteria for entering an auto-away mode are met, such as (a) the auto-away function was not previously disabled by the user; (b) the time is between 8:00 AM and 8:00 PM when the controlled environment is not a business; (c) the intelligent thermostat is not in OFF mode; (d) the away state temperature is more energy-efficient than the current setpoint temperature; and (e) the user is not interacting with the intelligent thermostat remotely through the cloud-based management server. The second set of criteria is met when the following are true: (1) there has been a period of sensed inactivity for a requisite inactivity interval according to that intelligent thermostat's sensors; (2) the AAR flag of at least one other intelligent thermostat in the group has the value YES; and (3) the above-described reasonableness criteria are all met. It can be the case that all of the intelligent thermostats in the group can contribute the benefits of their occupancy sensor data to the group auto-away determination, even when one or more of them have not activated the auto-away feature, as long as there is at least one member that has activated the auto-away feature. This method has been found to increase both the reliability and scalability of the energy-saving auto-away feature, with reliability being enhanced by virtue of multiple sensor locations within the controlled environment and with scalability being enhanced in that the misplacement of one intelligent thermostat does not jeopardize the effectiveness or applicability of the group consensus as a whole.

The above-described method is readily extended to the case in which there are multiple primary intelligent thermostats and/or multiple auxiliary intelligent thermostats. It is not required that there be a one-to-one correspondence between primary intelligent thermostats and distinct HVAC systems in the controlled environment. For example, there are many installations in which plural zones in the controlled environment may be served by a single HVAC system via controllable dampers that can stop and/or redirect airflow to and among the different zones from the HVAC system. In such cases, there may be a primary intelligent thermostat for each zone, each of the primary intelligent thermostats being wired to the HVAC system as well as to the appropriate dampers to regulate the climate of its respective zone.

In case 5050 shown in FIG. 50B, two of the three intelligent thermostats 5010 and 5020 have AAR flags set to YES, indicating they have not sensed activity within the ASCW and other criteria are met. However, the third intelligent thermostat 5030 has the AAR flag set to NO, for example, because it has sensed activity recently. Since not all of the intelligent thermostats have AAR flags set to YES, the decision is not unanimous, and therefore the Away state is not entered by any of the intelligent thermostats. An example of case 5050 might be that the sole occupant of the dwelling 5000 is upstairs for an extended period of time and therefore only intelligent thermostat 5030 is detecting occupancy.

In the case 5052, all of the intelligent thermostats 5010, 5020 and 5030 are sufficiently confident, have not sensed activity within the ASCW, and have set their AAR flags to YES. Accordingly, the decision to enter an Away state is unanimous, and the Away state is implemented in all three intelligent thermostats.

In case 5052, one of the intelligent thermostats 5020 has insufficient confidence in its activity sensor data. This could be, for example, as a result of the fact that intelligent thermostat has been newly installed, or it could be due to poor placement for occupancy sensing. The other two intelligent thermostats 5010 and 5030 have sufficient confidence, have not detected activity within the ASCW, and have set their AAR flags to YES. In this case the intelligent thermostat 5020 sees the other YES flags and changes its flag to YES. The decision is unanimous and the Away state is implemented. In this case, the intelligent thermostat 5020 that had low confidence was not allowed to veto the decision of the two confident intelligent thermostats 5010 and 5030.

Although the present invention has been described in terms of particular examples, it is not intended that the invention be limited to these examples. Modifications within the spirit of the invention will be apparent to those skilled in the art. For example, as discussed above, methods for adjusting intelligent control by intelligent controllers based on presence and/or absence determinations may be employed in a wide variety of different types of intelligent controllers in order to optimize intelligent control with respect to the presence and/or absence of various types of entities in a controlled environment or subregion of a controlled environment. Intelligent-controller logic may include logic-circuit implementations, firmware, and computer-instruction-based routine and program implementations, all of which may vary depending on the selected values of a wide variety of different implementation and design parameters, including programming language, modular organization, hardware platform, data structures, control structures, and many other such design and implementation parameters. As discussed above, an intelligent controller may use presence and/or absence determinations to set one or more state variables to reflect two or more presence-related states. A number of presence-related states may vary in different implementations and contexts in which presence determination is applied. As mentioned above, while the preceding discussion is generally focused on the determination of the presence and absence of human beings, intelligent controllers may employ sensor data and electronically stored information to determine the presence and absence of any of many different types of entities. These may be living creatures, inanimate objects, various classes of environmental conditions, and various other types of entities. The schedule adjustments made with respect to presence-related events may also vary depending on the implementation and context in which the schedule adjustments are applied. Parameter values that specify control outputs may be adjusted, setpoints correspondingly adjusted, setpoints may be moved in time, new setpoints may be introduced, scheduled setpoints may be deleted, and many other such types of adjustments may occur. A wide variety of different types of data and considerations may be employed in order in presence-probability determinations, as discussed above. Intelligent controllers may feature automated learning and adaptation in order to optimize presence and/or absence determinations to, in turn, optimize intelligent control. Rules may be added or deleted, threshold values changed, schedule-adjustment lag times may be shortened or lengthened, and many other adjustments and adaptations may be made in order to optimize presence-probability computations. The intelligent controllers to which the current application is directed may control HVAC units, air conditioners, furnaces, lighting, music appliances, water boilers, hot-water appliances, smart appliances, manufacturing and processing equipment, vehicles, and a wide variety of different types of devices, machines, systems, and even various types of organizations.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

The invention claimed is:

1. An intelligent controller comprising:
   a processor;
   a memory that stores a control schedule and an indication of a presence state,
   one or more sensors; and
   instructions stored within the memory that, when executed by the processor, controls the intelligent controller to
      record output from the one or more sensors in memory, and
      at intervals, determine a probability of presence of one or more entities within a region of a controlled environment using the recorded sensor output in memory,
update the indication of the presence state, and
upon a change of the indication of the presence state, accordingly adjust the control schedule;

wherein determining a probability of presence of one or more entities within a region further includes determining, for one or more regions and volumes within the controlled environment, one or more of
one or more presence-probability maps, and
one or more presence-probability scalar values; and wherein the intelligent controller determines the probability of presence of one or more entities within one or more regions and volumes within the controlled environment by
for each of the one or more regions and volumes,
determining a cumulative presence-probability scalar or cumulative presence-probability-map values from a presence-probability scalar or from presence-probability-map values determined from output of each of the one or more sensors, and
applying rules to the cumulative presence-probability scalar or cumulative presence-probability-map values in order to adjust the cumulative presence-probability scalar or cumulative presence-probability-map values for one or more additional considerations based on the additional electronically accessible information.

2. An intelligent controller comprising:
a processor;
a memory that stores a control schedule and an indication of a presence state,
one or more sensors; and
instructions stored within the memory that, when executed by the processor, controls the intelligent controller to
record output from the one or more sensors in memory, and
at intervals,
determine a probability of presence of one or more entities within a region of a controlled environment using the recorded sensor output in memory,
update the indication of the presence state, and
upon a change of the indication of the presence state, accordingly adjust the control schedule;
wherein the intelligent controller updates the indication of the presence state by
when a probability of presence for a region rises above a first threshold, setting the indication of the presence state for the region to indicate the presence of an entity in the region, and
when a probability of presence for a region falls below a second threshold, setting the indication of the presence state for the region to indicate the absence of an entity in the region.

3. An intelligent thermostat comprising:
a processor;
a memory that stores a control schedule and an indication of a presence state,
one or more sensors; and
instructions stored within the memory that, when executed by the processor, controls the intelligent controller to
record output from the one or more sensors in memory, and
at intervals,
determine a probability of presence of one or more people within a region of a controlled environment using the recorded sensor output in memory,
update the indication of the presence state, and
upon a change of the indication of the presence state, accordingly adjust the control schedule;
wherein the indication of a presence state indicates one of
a home state,
an away-normal state,
an away-vacation state, and
a sleep state; and
wherein the intelligent thermostat determines the probability of presence of one or more people within one or more regions and volumes within the controlled environment by
for each of the one or more regions and volumes,
determining a cumulative presence-probability value, and
applying rules to the cumulative presence-probability value in order to adjust the cumulative presence-probability value for one or more additional considerations based on the additional electronically accessible information.

4. The intelligent thermostat of claim 3 wherein the intelligent thermostat updates the indication of the presence state by:
when a probability of presence for a region rises above a first threshold, setting the indication of the presence state for the region to indicate the presence of an entity in the region; and
when a probability of presence for a region falls below a second threshold, setting the indication of the presence state for the region to indicate the absence of an entity in the region.

* * * * *